United States Patent [19]
Ide

[11] Patent Number: 5,556,208
[45] Date of Patent: Sep. 17, 1996

[54] LOW PROFILE THRUST BEARINGS HAVING SPACED PADS AND METHODS OF MAKING THE SAME

[76] Inventor: Russell D. Ide, 122 Ridge Dr., Exeter, R.I. 02822

[21] Appl. No.: 458,712

[22] Filed: Jun. 2, 1995

Related U.S. Application Data

[60] Division of Ser. No. 166,020, Dec. 14, 1993, Pat. No. 5,503,479, which is a continuation-in-part of Ser. No. 956,038, Oct. 2, 1992, Pat. No. 5,284,392, which is a continuation-in-part of Ser. No. 685,148, Apr. 15, 1991, abandoned, which is a continuation-in-part of Ser. No. 309,081, filed as PCT/US88/01841, May 27, 1988, published as WO88/09443, Dec. 1, 1988, Pat. No. 5,137,373, which is a continuation-in-part of Ser. No. 283,529, Oct. 19, 1988, Pat. No. 5,112,143, which is a continuation-in-part of Ser. No. 55,340, May 29, 1987, abandoned.

[51] Int. Cl.$^6$ ............................................. F16C 17/03
[52] U.S. Cl. ........................... 384/117; 384/119; 384/311
[58] Field of Search .......................................... 384/117, 119, 384/114, 311, 312, 307

[56] References Cited

U.S. PATENT DOCUMENTS

| | | |
|---|---|---|
| 1,664,878 | 4/1928 | Flintermann . |
| 1,991,461 | 2/1935 | Howarth . |
| 2,110,464 | 3/1938 | Kingsbury . |
| 2,250,546 | 7/1941 | Michell et al. . |
| 2,314,703 | 3/1943 | Howarth . |
| 2,347,663 | 5/1944 | Carnahan . |

(List continued on next page.)

FOREIGN PATENT DOCUMENTS

| | | |
|---|---|---|
| 7890275 | 3/1975 | Australia . |
| 0206686 | 12/1986 | European Pat. Off. . |
| 0324188 | 7/1989 | European Pat. Off. . |
| 0343620 | 11/1989 | European Pat. Off. . |
| 1010959 | 6/1952 | France . |
| 1425086 | 3/1969 | Germany . |
| 53-56448 | 5/1978 | Japan ............................ F16C 17/02 |
| 222818 | 1/1966 | U.S.S.R. . |
| 879116 | 10/1961 | United Kingdom . |
| 8809443 | 12/1988 | WIPO . |

OTHER PUBLICATIONS

Article entitled: "Lubrication, Its Principles and Practice", A. G. M. Michell, pub. 1950, Blackie & Son Ltd., London.
Article entitled "Fem for Thermo–Fluid Bearing Dynamic Characteristics" from An International Journal of Computers & Structures, vol. 31, No. 1, 1989, Oxford, U. K., pp. 93–102 by Z. A. Parszewski, X. Nan & D.–X Li.
Article entitled "Prediction of Dynamic Properties of Rotor Supported by Hydrodynamic Bearings Using the Finite Element Method" from An International Journal of Computers & Structures, vol. 12, No. 1, Oct. 1980, Oxford, UK, pp. 483–496 by Y. Birembaut & J. Peigney.
Article entitled "Application of Finite–Element Method to Hydrodynamic Lubrication Problems—Part 2: Finite–Width Bearing" from the Bulletin of the Japan Society of Mechanical Engineers, vol. 14, No. 77, Nov. 1971, Japan, pp. 1234–1244, Sanae Wada & Hirotsugu Hayashi.
IEEE Transactions on Magnetics, vol., 27, No. 6, issued Nov. 1991, E. Cha et al., "Numerical Simulation and Animation of Head–Disk–Assembly Dynamics", pp. 5136–5138.
IEEE Transactions on Ultrasonics Ferroelectrics and Frequency Control, vol. 39, No. 6, issued Nov. 1992, Maeno et al., "Effect of the Hydro–dynamic Bearing on Rotor/Stator Contact in a Ring–Type Ultrasonic Motor," pp. 675–682.
IEEE Tokyo, 1986, Konno et al., "Advanced Implicit Solution Function of DEQSOL and Its Evaluation", pp. 1026–1033.

Primary Examiner—Lenard A. Footland
Attorney, Agent, or Firm—Michael D. Bednarek; Kilpatrick & Cody

[57] ABSTRACT

A hydrodynamic thrust bearing and method of manufacturing the same. The bearing includes spaced planar pads supported on radially extending beams. The beams are connected to a base ring which is preferably circular. The radial beams support a circumferentially central region of the pads, but permit deflection of the circumferential edges of the pads for wedge formation.

8 Claims, 44 Drawing Sheets

U.S. PATENT DOCUMENTS

| | | |
|---|---|---|
| 2,424,028 | 7/1947 | Haeberlein . |
| 3,001,136 | 9/1961 | Rumpelein . |
| 3,107,955 | 10/1963 | Trumpler . |
| 3,132,908 | 5/1964 | Grotzinger . |
| 3,142,519 | 7/1964 | Abramovitz . |
| 3,160,450 | 12/1964 | Gentiluomo . |
| 3,298,751 | 1/1967 | Elwell . |
| 3,384,425 | 5/1968 | Brown . |
| 3,578,827 | 5/1971 | Smith . |
| 3,586,401 | 6/1971 | Gravelle . |
| 3,604,765 | 9/1971 | Babcock . |
| 3,639,014 | 2/1972 | Sixsmith . |
| 3,677,612 | 7/1972 | Barnett et al. . |
| 3,829,180 | 8/1974 | Gardner . |
| 3,899,224 | 8/1975 | Schuller et al. . |
| 3,930,691 | 1/1976 | Greene . |
| 3,944,304 | 3/1976 | Purtschert . |
| 3,951,475 | 4/1976 | Okano et al. . |
| 3,971,602 | 7/1976 | Anderson . |
| 4,005,914 | 2/1977 | Newman . |
| 4,099,799 | 7/1978 | Etsion . |
| 4,178,046 | 12/1979 | Silver et al. . |
| 4,227,752 | 10/1980 | Wilcock . |
| 4,335,925 | 6/1982 | Stopp . |
| 4,348,065 | 9/1982 | Yoshioka et al. . |
| 4,496,251 | 1/1985 | Ide . |
| 4,657,411 | 4/1987 | Bath . |
| 4,668,106 | 5/1987 | Gu . |
| 4,671,677 | 6/1987 | Heshmat et al. . |
| 4,676,668 | 6/1987 | Ide . |
| 4,699,525 | 10/1987 | Mizobuchi et al. . |
| 4,726,695 | 2/1988 | Showalter . |
| 4,738,453 | 4/1988 | Ide . |
| 4,738,550 | 4/1988 | Gardner . |
| 4,742,473 | 5/1988 | Shugar et al. . |
| 5,102,236 | 4/1992 | Ide . |
| 5,112,143 | 5/1992 | Ide . |
| 5,125,754 | 6/1992 | Ide . |
| 5,137,373 | 8/1992 | Ide . |
| 5,209,579 | 5/1993 | Matake . |
| 5,222,815 | 6/1993 | Ide . |
| 5,255,984 | 10/1993 | Ide . |
| 5,372,431 | 12/1994 | Ide . |
| 5,382,097 | 1/1995 | Ide . |
| 5,393,145 | 2/1995 | Ide . |

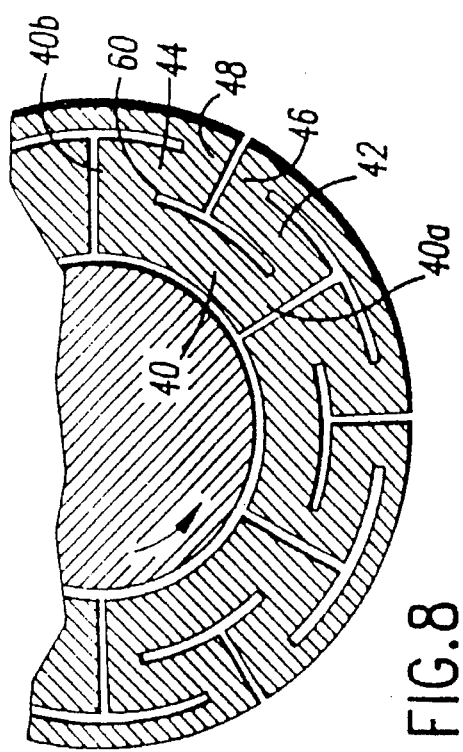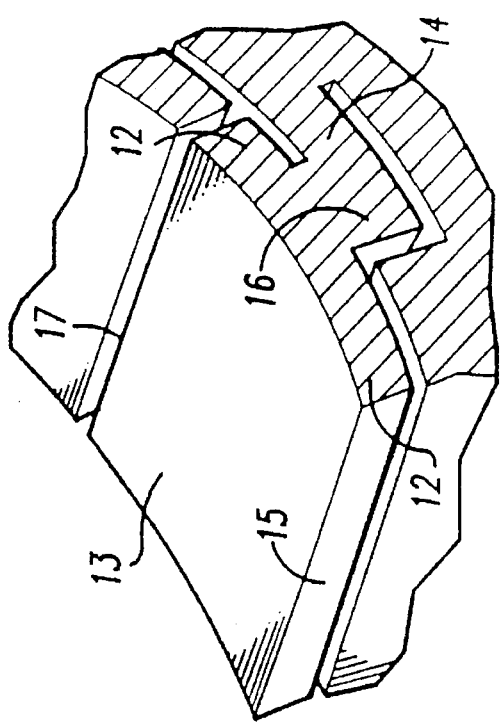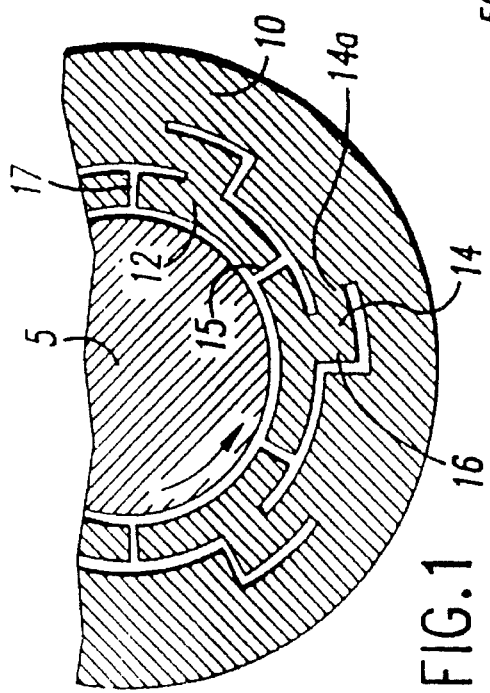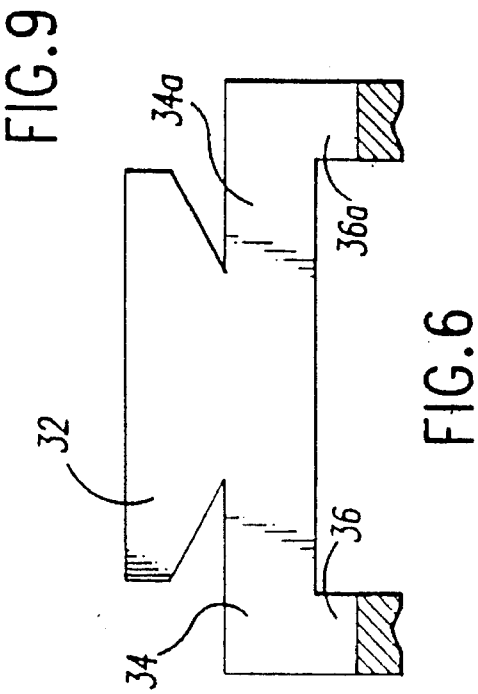

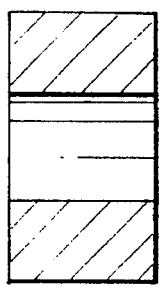 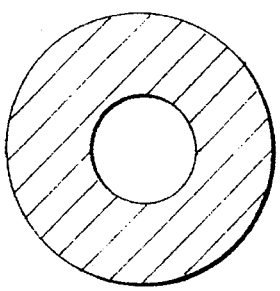 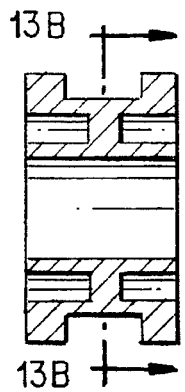 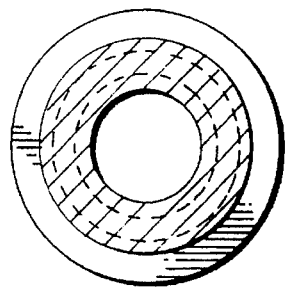
FIG.11A  FIG.11B  FIG.13A  FIG.13B
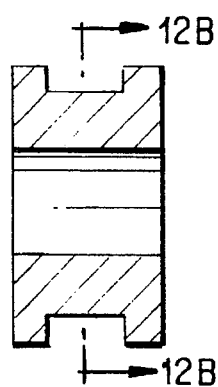 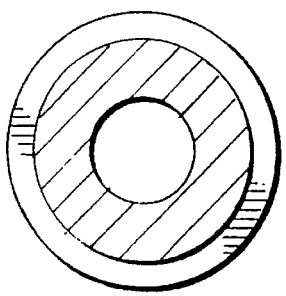 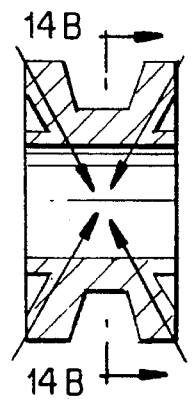 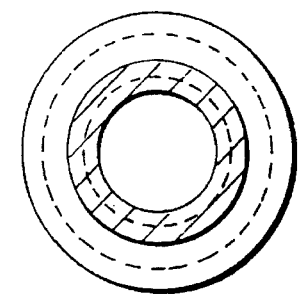
FIG.12A  FIG.12B  FIG.14A  FIG.14B
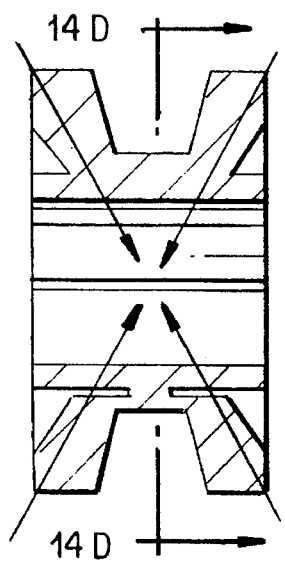 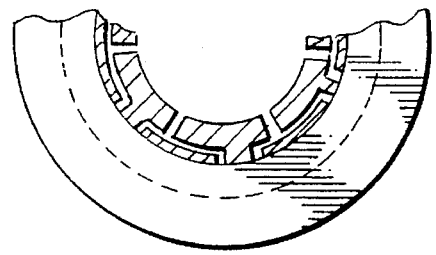
FIG.14C  FIG.14D

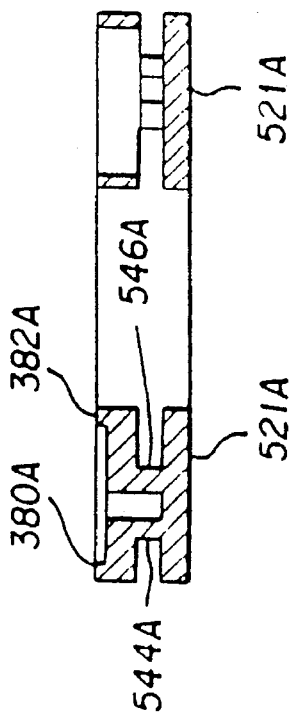
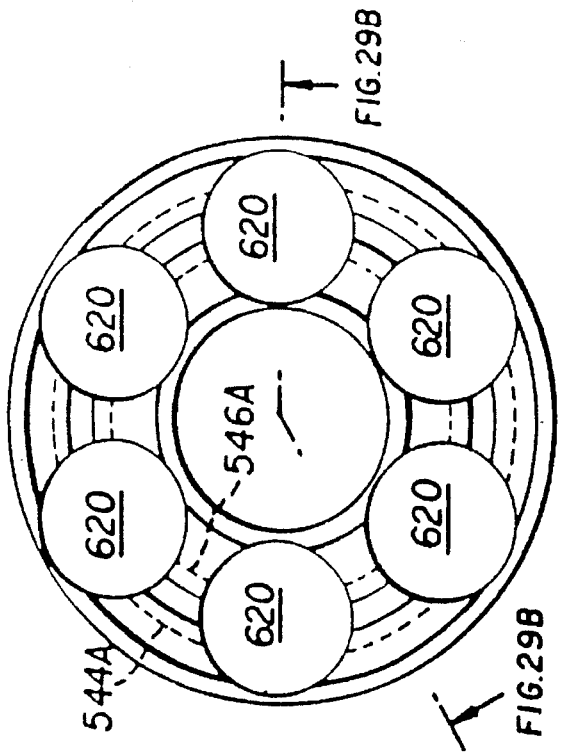
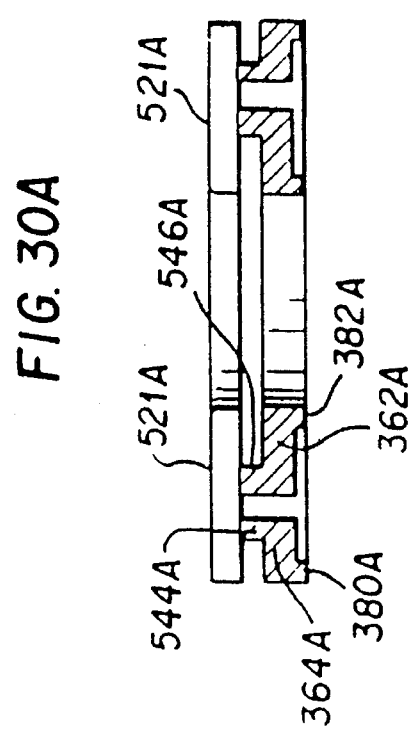
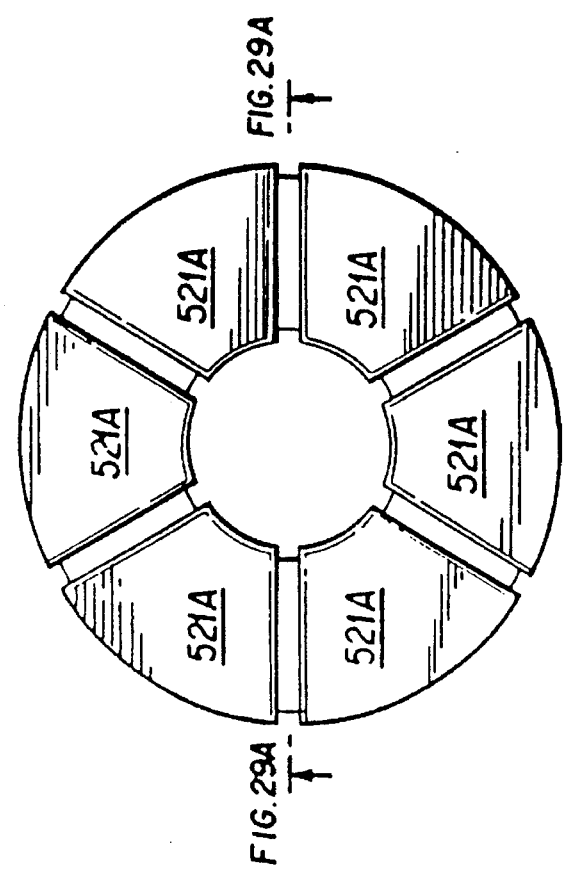

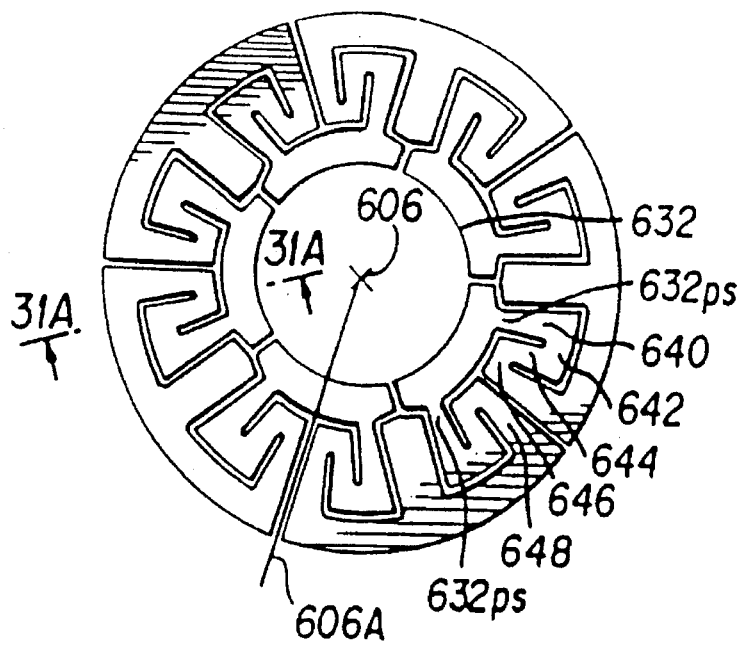
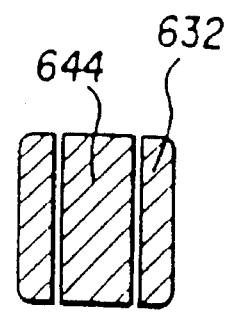
FIG. 31
FIG. 31A
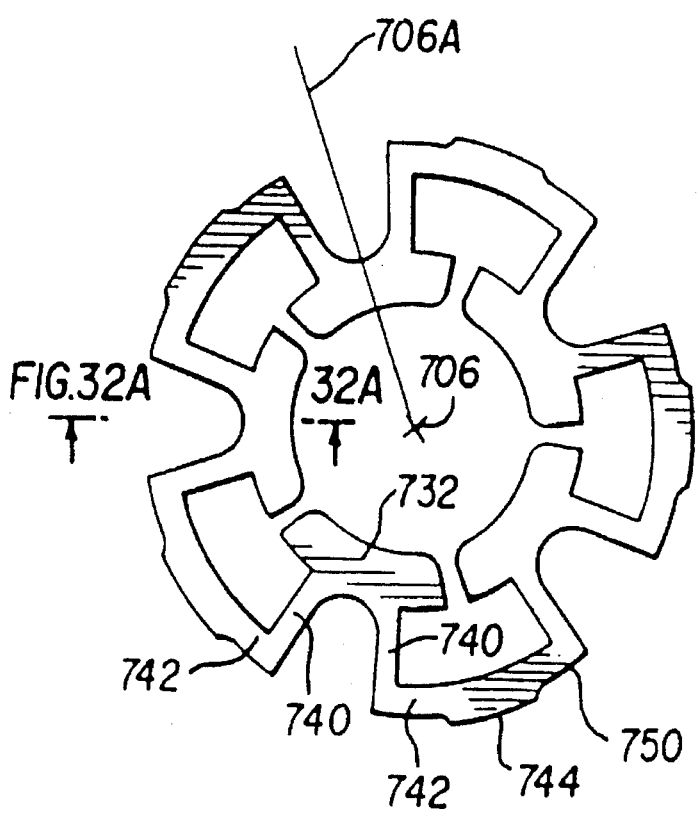
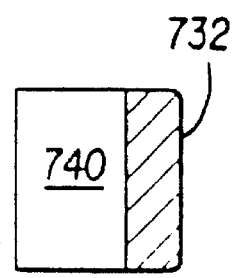
FIG. 32
FIG. 32A

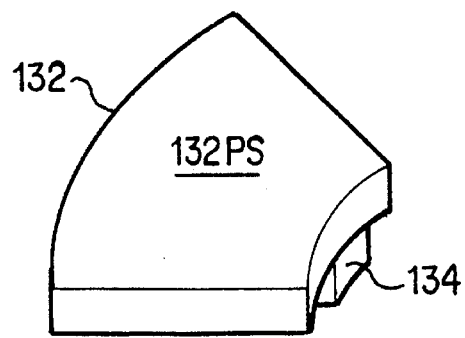
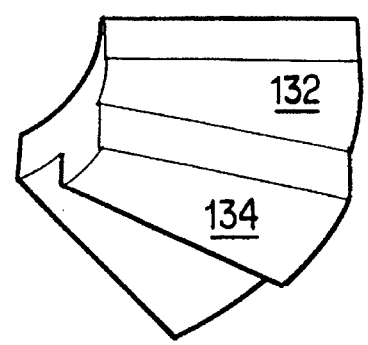
FIG.59E      FIG.59F
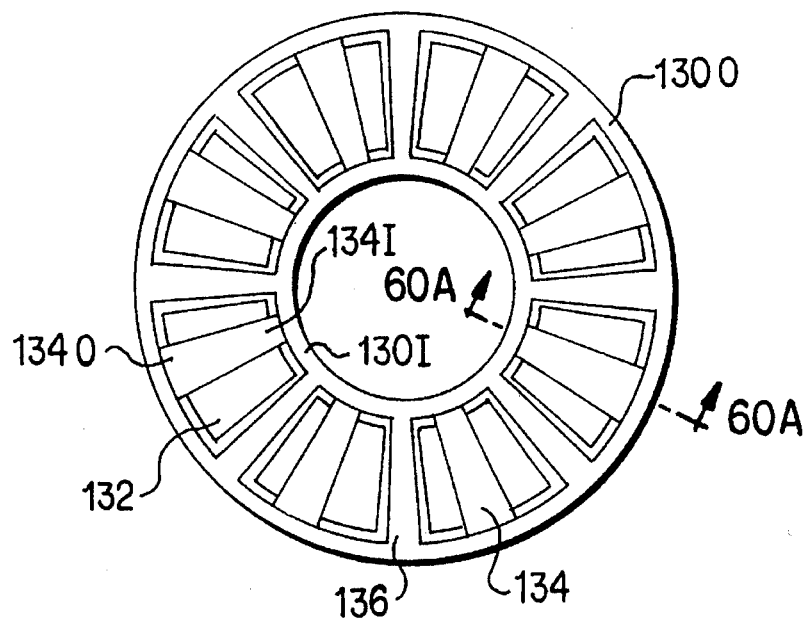
FIG.60
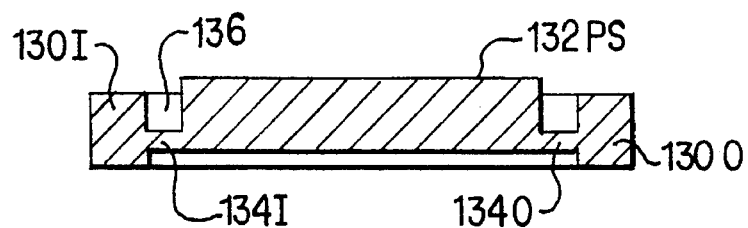
FIG. 60A

LOW PROFILE THRUST BEARINGS HAVING SPACED PADS AND METHODS OF MAKING THE SAME

RELATED APPLICATIONS

This application is a division of application Ser. No. 08/166,020 filed Dec. 14, 1993 now U.S. Pat. No. 5,503,479, which is a continuation-in-part (C.I.P) of, and claims the benefit of, 35 U.S.C. § 120 with respect to the applicant's U.S. application Ser. No. 07/956,038 filed Oct. 2, 1992, now U.S. Pat. No. 5,284,392, which was a continuation-in-part of U.S. application Ser. No. 07/685,148 filed Apr. 15, 1991, abandoned, which is a continuation-in-part of U.S. application Ser. No. 07/309,081 filed Feb. 8, 1989 now U.S. Pat. No. 5,137,373 which was a C.I.P. of international application PCT/US88/01841 and corresponding U.S. application Ser. No. 07/283,529 now U.S. Pat. No. 5,112,143, which in turn was a C.I.P. of and claimed the benefit of applicant's U.S. patent application Ser. No. 07/055,340, filed May 29, 1987 and now abandoned.

BACKGROUND OF THE INVENTION

The present invention relates to hydrodynamic bearings. In such bearings, a stationary bearing pad supports a rotating object such as a shaft via a pressurized fluid such as oil, air or water. Hydrodynamic bearings take advantage of the fact that when the rotating object moves, it does not slide along the top of the fluid. Instead, the fluid in contact with the rotating object adheres tightly to the rotating object. Motion is thus accompanied by slip or shear between the fluid particles through the entire height of the fluid film. Thus, if the rotating object and the contacting layer of fluid move at a velocity that is known, the velocity at intermediate heights of the fluid thickness decreases at a known rate until the fluid in contact with the stationary bearing pad adheres to the bearing pad and is motionless. The load resulting from the bearing pads support of the rotating object causes the bearing pad to deflect at a small angle to the rotating member. Fluid moving with the shaft is drawn into the wedge-shaped opening. Sufficient pressure is generated in the fluid film to support the load. Both thrust bearings and conventional hydrodynamic journal bearings operate on this principle. Both thrust bearings and radial or journal bearings normally are characterized by shaft supporting pads spaced about an axis. The axis about which the pads are spaced generally corresponds to the longitudinal axis of the shaft to be supported for both thrust and journal bearings. This axis may be termed the major axis.

U.S. Pat. No. 3,107,955 to Trumpler discloses one example of a bearing having beam mounted bearing pads that displaces with a pivoting or swing-type motion about a center located in front of the pad surface. This bearing, like many prior art bearings, is based only on a two dimensional model of pad deflection. Consequently, optimum wedge formation is not achieved.

In the Hall patent, U.S. Pat. No. 2,137,487, there is shown a hydrodynamic moveable pad bearing that develops its hydrodynamic wedge by sliding of its pad along spherical surfaces. In many cases the pad sticks and the corresponding wedge cannot be developed. In the Greene Patent, U.S. Pat. No. 3,930,691, the rocking is provided by elastomers that are subject to contamination and deterioration.

U.S. Pat. No. 4,099,799 to Etsion discloses a non-unitary cantilever mounted resilient pad gas bearing. The disclosed bearing employs a pad mounted on a rectangular cantilever beam to produce a lubricating wedge between the pad face and the rotating shaft. Both thrust bearings and radial or journal bearings are disclosed.

There is shown in the Ide patent, U.S. Pat. No. 4,496,251 a pad that deflects with web-like ligaments so that a wedge shaped film of lubricant is formed between the relatively moving parts.

U.S. Pat. No. 4,515,486 discloses hydrodynamic thrust and journal bearings comprising several bearing pads, each having a face member and a support member that are separated and bonded together by an elastomeric material.

U.S. Pat. No. 4,526,482 discloses hydrodynamic bearings that are primarily intended for process lubricated applications, i.e., the bearing is designed to work in a fluid. The hydrodynamic bearings are formed with a central section of the load carrying surface that is more compliant than the remainder of the bearings such that they will deflect under load and form a pressure pocket of fluid to carry high loads.

It has also been noted, in Ide U.S. Pat. No. 4,676,668, that bearing pads may be spaced from the support member by at least one leg which provides flexibility in three directions. To provide flexibility in the plane of motion, the legs are angled inward to form a conical shape with the apex of the cone or point of intersection in front of the pad surface. Each leg has a section modulus that is relatively small in the direction of desired motion to permit compensation for misalignments. These teachings are applicable to both journal and thrust bearings. While the disclosure of this patent represents a significant advance in the art, it has some shortcomings. One such shortcoming is the rigidity of the support structure and bearing pad which inhibits deformation of the pad surface. Further, the bearing construction is not unitary.

The last two patents are of particular interest because they demonstrate that despite the inherent and significant differences between thrust and journal bearings, there is some conceptual similarity between hydrodynamic journal bearings and hydrodynamic thrust bearings.

This application is directed to low profile hydrodynamic thrust bearings. When the hydrodynamic wedge in such bearings is optimized, the load on each of the circumferentially spaced bearings is substantially equal.

Presently, the most widely used hydrodynamic thrust bearing is the so-called Kingsbury shoe-type bearing. The shoe-type Kingsbury bearing is characterized by a complex structure that includes pivoted shoes, a thrust collar which rotates with the shaft and applies load to the shoes, a base ring for supporting the shoes, a housing or mounting which contains and supports the internal bearing elements, a lubricating system and a cooling system. Because of this complex structure, Kingsbury shoe-type bearings are typically extraordinarily expensive.

An alternative to the complex Kingsbury shoe-type bearing is the unitary pedestal bearings shown in FIGS. 19–20. This bearing has been employed in, among other things, deep well pumps. This relatively simple structure is typically formed by sand casting or another crude manufacturing technique because previously, the specific dimensions have not been deemed important. As shown in FIGS. 19 and 20, the bearing is structurally characterized by a flat base 36PA having a thick inner circumferential projection 38PA, a plurality of rigid pedestals 34PA extending transversely from the base and a thrust pad 32PA centered on each rigid pedestal.

FIG. 20(A) illustrates schematically the deflection of the bearing of FIGS. 19–20 in response to movement of the opposing thrust runner in the direction of arrow L. In FIG. 20(A), the deflected position (greatly exaggerated) is illustrated in solid lines and the non-deflected position is illustrated in phantom. The curve PD in FIG. 20(A) illustrates the pressure distribution across the face of the pad. Under load, the thrust pads deflect around the rigid pedestals in an umbrella-like fashion as shown in FIG. 20(A). By virtue of this umbrella-like deflection, only a partial hydrodynamic wedge is formed. Consequently, there is an uneven distribution of pressure across the face of the pad as illustrated in FIG. 20(A). Thus, the bearing has proportionately less hydrodynamic advantage compared to a bearing in which a hydrodynamic wedge is formed across the entire thrust pad face. Moreover, the rigidity of the pedestals and flat inflexible base prevent the deflections necessary to optimize wedge formation. This may explain why bearings of the type shown in FIGS. 19–20, while far less expensive than Kingsbury bearings, have proved less efficient and capable and consequently less successful than the shoe-type bearings.

Additional background relating to this application may be gleaned by reviewing applicant's recently issued patents including U.S. Pat. No. 5,255,984 which shows a variable characteristic thrust bearing. The bearing includes separately formed pads of various shapes and materials that are supported in a carrier. The carrier is constructed such that the pads may be located in separate openings to vary the support characteristics. U.S. Pat. No. 5,222,815 shows a variety of unitary bearings, including journal, thrust and combined radial and thrust bearings of the type having beam mounted bearing pads. The pads and support structure may be integrally formed as a single piece. Similarly, U.S. Pat. No. 5,137,373 discloses thrust, radial and combined radial/thrust bearings in which the pads and support structure are integrally formed as a single piece.

U.S. Pat. No. 5,125,754 discloses thrust and journal bearings having a modular construction. In general, the bearings disclosed therein include separate pads or pad portions that are mounted in a separate carrier. Various pad and carrier configurations are disclosed.

U.S. Pat. No. 5,102,236 discloses hydrodynamic thrust and radial bearings that each have a continuous beam mounted shaft support surface.

SUMMARY OF THE INVENTION

The present application is specifically directed to thrust bearings having a low axial profile. In the preferred embodiment, the bearing includes a low-profile thrust bearing for supporting a rotating shaft. The thrust bearing includes a base and a plurality of bearing pads circumferentially spaced about the axis of the rotating shaft. Each of the pads has a substantially planar shaft support surface, radially inner and outer edges and side edges between the radially inner and outer edges and a supported surface below the shaft support surface. A plurality of radially extending beams connect the pads to the base. Each beam supports a portion of the supported surface which is spaced from the side edges of the pad. A variety of pad shapes and beam configurations can be employed.

While the present application is specifically directed to a low profile thrust bearing, it more broadly relates to a pad type bearing and methods of making the same. The pad type bearing is preferably unitary. The bearing can be formed from a single piece of heavy walled tubing or a cylindrical journal that has been machined or formed with small grooves and slits, bores or cuts through or on the bearing wall to define a flexible journal or thrust pad and a support structure. The pads and support structure are designed to optimize the shape of the converging wedge formed between the pad surface and the shaft when the shaft rotates. This can be done by modifying the pad shape, the support structure or both. Specifically, the pad can be modified to include grooves, cuts, rails and recesses to achieve desired deformations under load. The support structure can be designed to support the pads for movement in the six degrees of freedom (i.e., translation or movement in the +x, −x, +y, −y, +z and −z directions) and rotation about the X, Y, and Z axes to optimize formation of the hydrodynamic wedge, but this is not necessary for all applications.

The support structure is preferably unitary (one-piece) and comprises support stubs, beams, and/or membranes connected to a housing that is sometimes defined by the radially outermost portion of the bearing in a journal bearing or, in thrust bearings, a housing into which the bearing is mounted.

The bearings may be formed of metals, powdered metals, plastics, ceramics or composites. When manufactured in small quantities, the bearings are typically machined by facing, turning, and milling the blanks to form larger grooves or openings; smaller grooves are formed by waterjet cutting, electrical discharge or laser machining methods and allow total design flexibility to tune the bearing to provide desired characteristics. Tuning will essentially change the stiffness that in turn eliminates vibration. Manufacture of larger quantities of a single type bearing is preferably accomplished through injection molding, extrusion, powdered metal die casting, investment casting or some similar manufacturing technique. According to one aspect of the present invention, intermediate quantities of bearings are manufactured according to a novel method combining machining and investment casting techniques. The present invention also contemplates easily moldable bearings that include no hidden openings such that they can be molded in a simple two-piece mold. The bearings of the present invention can be manufactured at a fraction of the cost of competitive bearings.

While there are numerous arrangements of bores, grooves, cuts, or slits there are primarily two modes of deflections: namely, one or more ligaments or membranes that deflect in the general direction of load in a bending mode and secondly, by torsional deflection in a beam or membrane in a direction extending away from the pad along the longitudinal axis of the shaft in journal bearings. The degree of deflection in the bending mode is, in part, a function of the stiffness of the support structure in the radial direction. The pad itself may be made to deflect under a load to form a different shape by providing internal cuts beneath the pad or by undercutting the edges of the pad. In either case, the cuts are specifically made to result in a predetermined shape under load. By surrounding or backing certain ligaments or membranes with lubricating fluid, a damping element may be added to the design.

Similar cuts are used for journal bearings and thrust bearings. The primary determinant is the deflections desired for optimum performance. However, since journal and thrust bearings perform significantly differently functions there, are inherent differences in desired performance requiring different desired deflections. Consequently, despite the general conceptual similarity between the journal bearings and thrust bearings of the present invention there are also significant conceptual differences and plainly evident structural dissimilarities.

The bearing of the present invention includes a pad that may change shape and move in any direction (i.e., is supported for movement with six degrees of freedom). The bearing also may have a built-in damping system and is preferably of unitary or single piece construction for high volume economical manufacture. The journal bearings of the present invention also fits in a relatively small envelope (i.e., spacing between the housing outer diameter and the pad inner diameter).

According to the present invention, the need for close tolerances between the bearing pad and the shaft portion to be supported can be obviated by dimensioning the bearing to eliminate the spacing between the bearing pad and the shaft portion to be supported, while at the same time dimensioning the support structure such that the radial (in a journal bearing) or axial (in a thrust bearing) stiffness of the bearing is less that the corresponding fluid-film stiffness of the supporting fluid. Either the entire pad or only a portion thereof can be pre-biased into contact with the shaft. For instance, with extremely flexible bearings, it may be desirable to pre-torque the entire bearing pad into contact with the shaft. On the other hand, it is sometimes advantageous to pre-torque only the trailing edge of the bearing pad into contact with the shaft to define a hydrodynamic wedge. Thus, the bearings of the present invention can be designed to have an interference fit when installed on the shaft.

In one embodiment, as the bearing is forced onto the shaft, the pad support structure deflects slightly to form a converging wedge shape while in the installed, static position with contact between the bearing pad and the shaft at the trailing edge. In such an instance where the bearing is designed to provide a statically loaded wedge, an appropriate spacing between the pad and the shaft will be established instantaneously upon rotation of the shaft by virtue of the stiffness of the fluid film. This is because the fluid film enters the wedge and builds up fluid pressure causing separation of the shaft and pad. Specifically, the relatively stiff fluid causes the relatively flexible beam support structure to deflect until the stiffness of the support structure is equal to the fluid film stiffness. The instantaneous formation of the fluid film protects the surface of the bearing pad from damage that occurs at low start-up speeds when there is direct contact between the shaft.

Interference fit bearings of the aforementioned type allow a much larger variation in machining tolerances. For example, relatively large (e.g., 0.003 inch) variations in the interference fit can be designed to have an insignificant impact on the wedge. This is particularly critical for gas lubricated bearings where alternate bearing forms require extraordinarily precise machining for proper operation. The present invention relaxes machining requirements.

Similarly the thrust bearings of the present invention can be designed to provide a statically loaded wedge. Specifically, the thrust bearings of the present invention can be designed such that the bearing pads are biased so that the inner circumferential edge of the bearing pad extends away from the shaft and so that the trailing edge extends toward the shaft. With this arrangement, in the static loaded condition, the bearing pad slopes toward the shaft in the radial direction (when moving outwardly from the axis). Further, the bearing pad slopes toward the shaft from the leading edge to the trailing edge. In this way, a statically loaded wedge approximating the optimum wedge is formed and appropriate spacing between the pads and shafts is established instantaneously upon rotation of the shaft.

The relationship between fluid stiffness and spring characteristic may also be used to provide a combined radial-thrust bearing assembly. The assembly can include a simple continuous conical bearing surface pressed into contact with a shaft runner by a spring. The spring rate is selected such that under load, the bearing moves away from the runner surface and the shaft is supported on a fluid film.

In the bearings of the present invention, the pad movement may be directed toward the shaft to hold shaft location and to give the pad the ability to adjust for misalignment of the shaft and unequal loading among pads. Of course, the present invention may apply to any radial, thrust or combined radial and thrust form of bearings and may be one or two directional in nature, depending on the configuration of the bearing. More specifically, if the bearing support structure is symmetrical about the bearing's pad circumferential center line, the bearing will be bi-directional, i.e., capable of supporting a shaft for rotation in two directions in an identical fashion. However, if the bearing support structure is non-symmetrical about the bearing's pad circumferential center line the bearing will deflect differently when supporting a shaft for rotation in a first direction as compared to rotation in the opposite direction. For both journal or radial bearings and thrust bearings, the major axis is the central axis of the cylindrical blank from which the bearing is formed.

According to another important aspect of the bearings of the present invention, the bearing pads can be supported for deflection to retain the hydrodynamic fluid, thus obviating the problem of fluid leakage. With respect to radial or journal bearings, the support structure is designed such that, under load, the bearing pad deflects to form a fluid retaining pocket. Generally, such a support is achieved when the primary support portion is connected to the bearing pad proximate the axial edges of the bearing pad and the center of the bearing pad is not directly supported, i.e., is free to deflect radially outward. With respect to thrust bearings, the pad is supported to tilt toward the bearing's inner diameter under load to prevent centrifugal leakage. Generally, this is achieved when the pad support surface at which the primary support structure supports the bearing pad is located closer to the bearing outer diameter than to the bearing inner diameter. When the primary support structure includes two or more radially spaced beams, the complete support structure must be designed to cause deflection of the bearing pad at the inner end. Further, when the bearing pad is supported by a plurality of radially spaced beams and the region between the beams is not directly supported, the pad will tend to deflect to form a concave fluid retaining channel.

According to the present invention, several methods of manufacturing the bearings of the present invention are also contemplated. The selection of a particular method of manufacturing depends largely on the volume of the particular bearing to be manufactured and the materials used. In low volume applications, or when it is desired to produce prototypes for testing and/or production of molds or the like, the bearings are preferably manufactured from metallic cylindrical blanks such as heavy wall tubing or other journals which are machined to provided radial and/or facing bores or grooves and formed with radial cuts or slits through either numerically controlled electrical discharge manufacturing techniques, numerically controlled laser cutting techniques, or numerically controlled water-jet cutting. In intermediate volumes, the bearings of the present invention are preferably manufactured using an investment casting method according to the present invention. In high volume applications, the bearings of the present invention can be manufactured using a variety of materials such as plastics, ceramics, powdered and non-powdered metals, and composites. In high volume applications, several manufacturing methods, including injection molding, casting, powdered metal, die casting, and extrusion, can be economically employed. The bearings of the present invention can be formed in a shape that is easily moldable.

In short, the present invention relates to radial, thrust and compound radial and thrust hydrodynamic bearings that perform significantly better than known bearings and can be manufactured at a fraction of the cost of competitive bearings.

BRIEF DESCRIPTION OF THE DRAWINGS

The details of the invention will be described in connection with the accompanying drawing, in which:

FIG. 1 is a sectional view of a journal bearing illustrating a sector thereof embodying one form of the invention;

FIG. 2 is a schematic view of a single pad made in accordance with the example illustrated in FIG. 1;

FIG. 6 is an end view of the bearing of FIG. 4;

FIG. 8 is a sectional view of a journal bearing illustrating an example of a bearing incorporating the features of the present invention that includes two beams;

FIG. 9 is an edge view of the pad of FIG. 1 illustrating local deflection of the pad surface without support structure deflection, greatly exaggerated;

FIGS. 11A and 11B are cross sectional views of a cylindrical journal or blank before machining;

FIGS. 12A and 12B are cross sectional views of a machined journal or blank;

FIGS. 13A and 13B are cross-sectional views of a further machined journal or blank;

FIGS. 14A and 14B are cross sectional views of a modified machined journal or blank; and FIGS. 14C and 14D are cross sectional views of a bearing constructed from the modified machined journal or blank of FIGS. 14A and 14B.

FIG. 29A is a cross-section of another thrust bearing construction according to the present invention.

FIG. 29B is a cross-section along the lines indicated in FIG. 30B.

FIG. 30A is a top view of the bearing of FIG. 29A.

FIG. 30B is a bottom view of the bearing of FIG. 29A.

FIG. 31 is a side view of another journal bearing construction according to the present invention.

FIG. 31A is a radial cross-section of part of the bearing illustrated in FIG. 31.

FIG. 32 is a side view of another journal bearing construction according to the present invention.

FIG. 32A is a radial cross-section of the bearing of FIG. 32.

FIG. 56A is a flattened interior view of a portion of the bearing of FIG. 56.

FIG. 56B is a flattened edge view of the bearing of FIG. 56.

FIG. 56C is a cross-section of the bearing of FIG. 56 along the lines indicated in FIG. 56B.

FIG. 57 is a side view of another radial bearing according to the present invention.

FIG. 57A is a flattened interior view of part of the bearing of FIG. 57 along the lines indicated in FIG. 57.

FIG. 57B is a flattened edge view of part of the bearing of FIG. 57.

FIG. 57C is a cross-section of the bearing of FIG. 57 along the lines indicated in FIG. 57A.

FIG. 57D is a cross-section of the bearing of FIG. 57 along the lines indicated in FIG. 57A.

FIG. 58 is a schematic view of a conventional prior art turbocharging system used in an internal combustion engine.

FIG. 58A is a schematic view of part of a turbocharger including one of the bearings of the present invention.

FIG. 59 is a top view of a low profile thrust bearing according to the present invention.

FIG. 59A is a bottom view of the low profile thrust bearing of FIG. 59.

Figure 59A:
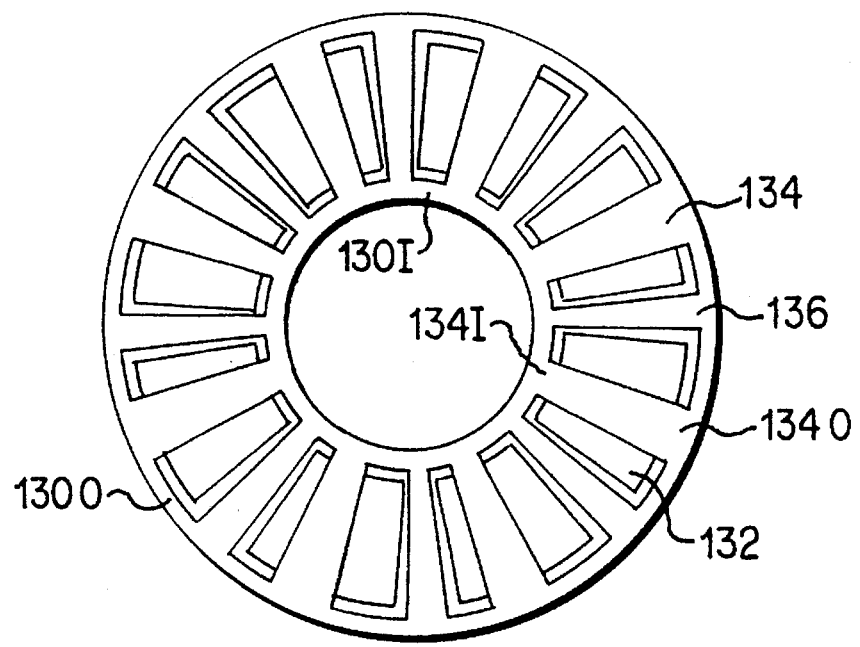
Figure 59:
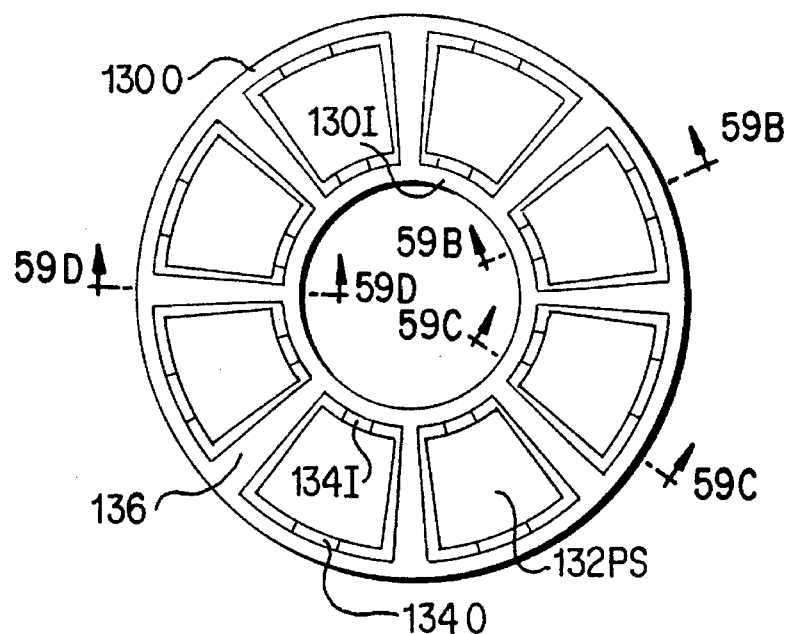
Figure 59B:
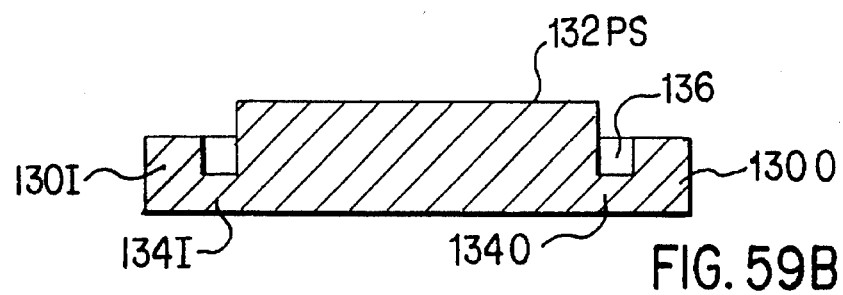

FIG. 59B is a cross-section of the bearing of FIG. 59 along the lines indicated in FIG. 59.

Figure 59C:
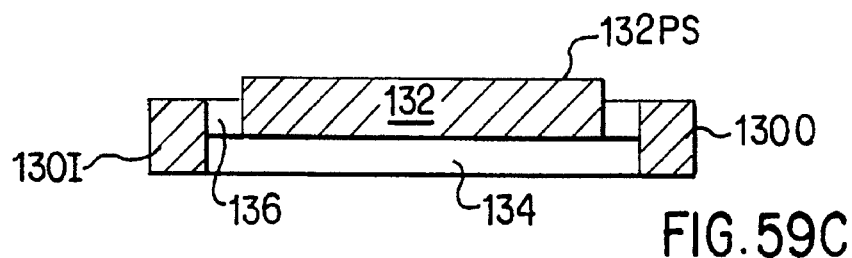

FIG. 59C is a cross-section of the bearing of FIG. 59 along the lines indicated in FIG. 59.

Figure 59D:
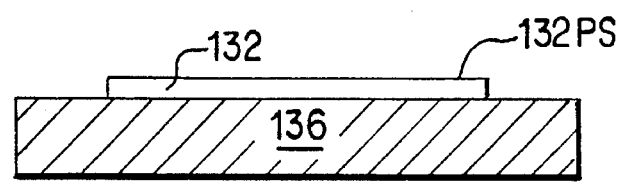

FIG. 59D is a cross-section of the bearing of FIG. 59 along the lines indicated in FIG. 59.

FIG. 59E is an upper perspective view showing the configuration of a bearing pad used in the bearing of FIG. 59.

FIG. 59F is a lower perspective view showing the configuration of a bearing pad used in the bearing of FIG. 59.

FIG. 60 is a bottom view of another low profile thrust bearing according to the present invention.

FIG. 60A is a cross-section of the bearing of FIG. 60 along the lines shown in FIG. 60.

Figure 61:
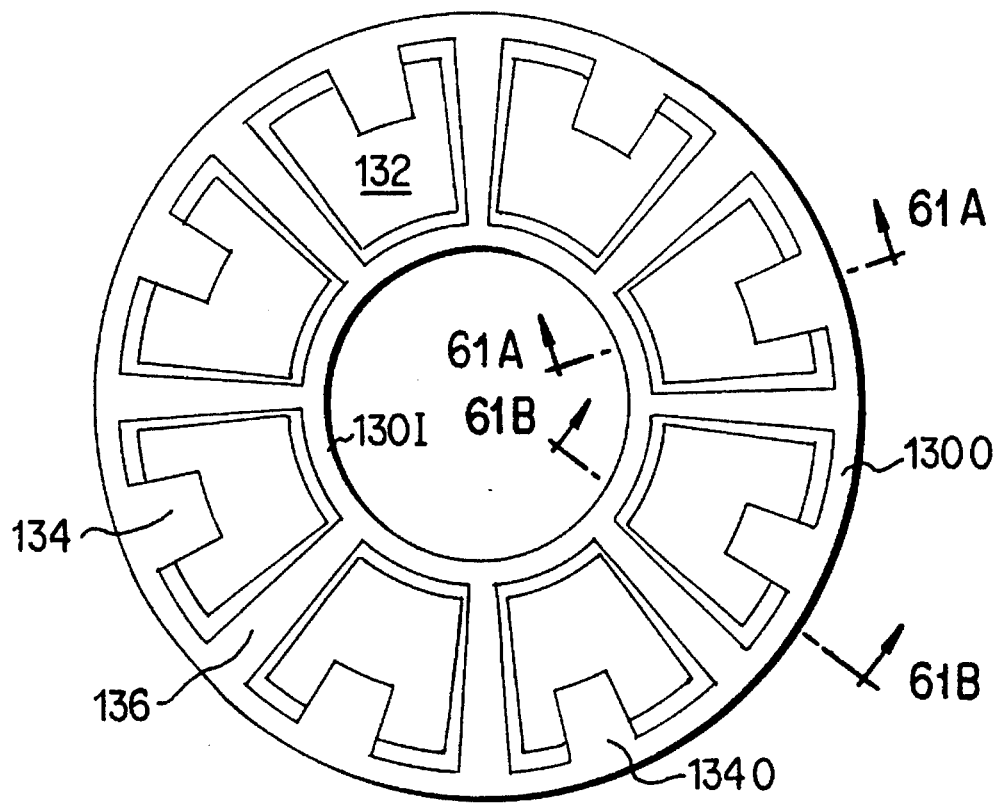

FIG. 61 is a bottom view of an alternate embodiment of the low profile thrust bearing according to the present invention.

Figure 61A:
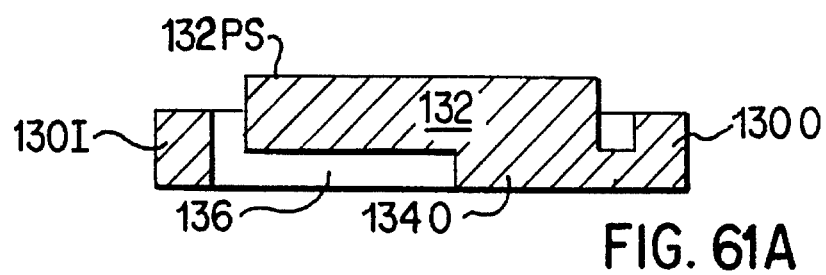

FIG. 61A is a cross-section of the bearing of FIG. 61 along the lines indicated in FIG. 61.

Figure 61B:
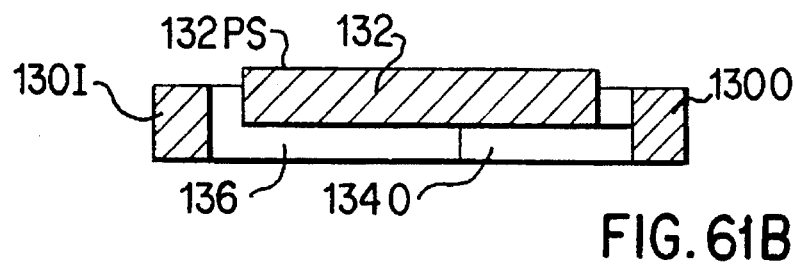

FIG. 61B is another cross-section of the bearing of FIG. 61 along the lines indicated in FIG. 61.

DETAILED DESCRIPTION

In describing the bearings of the present invention in an understandable way, it is helpful to describe the bearing structures as formed from a cylindrical blank by providing grooves, slits, bores and other openings in the cylindrical blank. As noted below, this is sometimes a useful technique for manufacturing a prototype bearing. However, the reference to the cylindrical blank is primarily intended to assist understanding of the present invention. It should be noted that although many bearings of the present invention could be manufactured from a cylindrical blank, it is not necessary that any of them be so manufactured. Indeed the bearings can be manufactured in numerous ways, some of which are discussed hereinafter.

Figure 3:
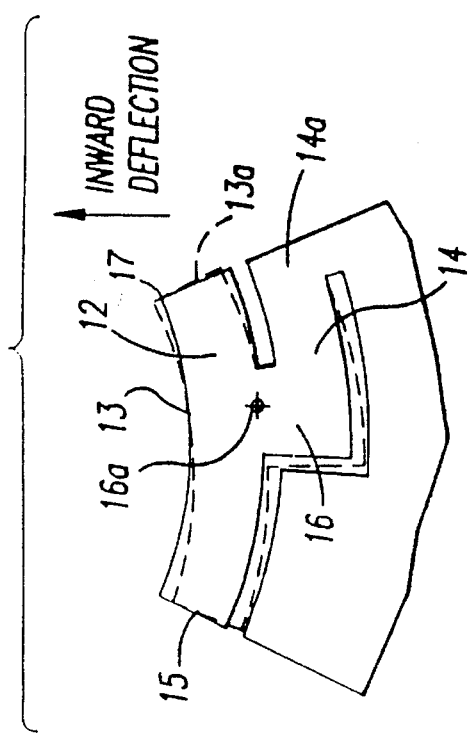
FIG. 3 is an edge view of the pad of FIG. 2 illustrating the pad orientation with the support structure in the loaded state.

Referring first to FIG. 1, the structure therein illustrated is a sector of a journal bearing assembly having grooves and slits formed therein to define a housing 10 and a plurality of circumferentially arranged bearing pads 12 each of which is supported by a support structure that includes the housing, a beam 14 and a stub section 126. The bearing is not symmetrical about the pad circumferential center line 13a (FIG. 3).

Accordingly, the bearing illustrated is a radial unidirectional bearing, i.e., it is adapted for radially supporting a shaft for rotation in only one direction. In the illustrated embodiment, the bearing supports the shaft 5 only for rotation in the counter-clockwise direction illustrated by the arrow. On the other hand, if the bearing is symmetrical about the center line of the pad, the bearing can support the shaft 5 for either clockwise or counter clockwise rotation, i.e., the bearing is bi-directional.

Each bearing pad 12 includes a leading edge 15 and a trailing edge 17. The leading edge is the edge first approached by a point on the circumference of the shaft as it continues to rotate. Similarly, the trailing edge is the edge approached circumferentially later by the same point on the shaft as it continues to rotate. When the shaft 5 is rotating in the proper direction, it moves, on a fluid film, from the leading edge across the bearing pad and off the trailing edge. Optimum performance is obtained when the stub-section 16 supports the bearing pad 12 and hence any load, at a point 16a (FIG. 3) between the circumferential center line 13a of the pad 12 and the trailing edge 17, preferably closer to the center line 13a. The beam 14 should also pivot about a point 14a that is located angularly between the leading edge and the trailing edge so that because of deflection of the beam 14, the trailing edge 17 deflects inwardly. Of course, the degree of deflection depends on, among other things, the shape of the beam and the length of the cuts or slits formed in the bearing.

Although specific reference is made to either journal bearings or thrust bearings to facilitate an understanding of this invention, some of the same principles of bearing design apply whatever the specific form of bearing being designed. For example, both types of bearings operate on the principle of formation of a hydrodynamic wedge. Further, the major axis of both journal bearings and thrust bearings is the central axis of the cylindrical blank from which the bearing is formed. The circumferential pad center line is the radially extending line passing through the geometric center of the pad and the major axis of the bearing. Accordingly, if either a thrust bearing or a journal bearing is symmetrical about this center line axis, i.e., the major axis, the bearing will be bi-directional.

There are significant differences between thrust bearings and journal or radial bearings. The most prominent difference is, of course, the portion of the shaft supported and consequently the orientation and/or attitude of the bearing pad supports. For instance, while journal bearings support circumferential portions of shafts, thrust bearings support shoulder or axial end portions of shafts. Other differences follow from this fundamental difference. For example, in a radial or journal bearing, the pads in the direction of the load take or support the load; whereas, in a thrust bearing, all pads normally share load. Moreover, a journal bearing generally has a built-in wedge due to differences in the shaft and bearing diameters; conversely, there is no such built-in wedge in thrust bearings. Additionally, while a journal or radial bearing controls rotational stability as well as load; a thrust bearing typically only carries load. It should also be understood that the design of journal bearings, particularly hydrodynamic journal bearings, is significantly more complicated than the design of thrust bearings. In part, this is because of the constraints imposed by the need to limit the radial envelope of the journal bearings. To accommodate these differences the configuration of the thrust bearings is naturally somewhat different from that of journal bearings. Nevertheless, as is evident from this disclosure, many principles discussed herein are applicable to either thrust or journal bearings.

Referring now to FIGS. 2 and 3, it will be seen that the pad 12 is provided with an accurate face 13 that corresponds essentially to the radius or arc of the outer diameter of the shaft that the pad will be supporting (via the fluid film) and each pad is defined by axially extending and radially extending edges. The axially extending edges comprise the leading and trailing edges. The beam is shown both in a static position (solid lines) and in a deflected position (phantom lines) in FIG. 3. The basic construction of the support structure as illustrated in FIG. 1, is created by forming small slits or cuts through the wall. Typically these slits or radial cuts are between 0.002" to 0.125" wide. The degree of deflection can be varied by varying, among other things, the length of the cuts. Longer cuts provide a longer moment arm that yields greater deflection. Shorter cuts yield beams having less flexibility and higher load carrying ability. In selecting a length of cut or slit, care must be taken to avoid resonance.

By locating the end of beam 14 as shown, the deflection downward about the connection point 16a will result in inward movement of the trailing edge 17 of the pad 12, outward movement of the leading edge 15 and a slight flattening of the pad 12 as seen in the dotted lines of FIG. 9. Because of this deflection, the gap between the pad face 13 and the outer surface of the shaft 5, through which fluid flows, becomes wedge shaped to yield the well-known hydrodynamic support effect. Ideally the ratio of the spacing between the trailing edge and the shaft versus the spacing between the leading edge and shaft is between 1:2 to 1:5. In other words, the spacing between the leading edge and shaft should be between 2 to 5 times greater than the spacing between the trailing edge and the shaft. To attain this ideal spacing or wedge ratio for any specific application, appropriate deflection variables including number, size, location, shape and material characteristics of the unitary element must be selected. A computer aided finite element analysis has proven to be the most efficacious means of optimizing these variables. Computer aided analysis is particularly useful in a bearing such as the type described above which permits movement in all six directions (six degrees of freedom).

The most important consideration in the performance of a hydrodynamic bearing is the shape of the space, typically a converging wedge, between the rotating shaft to be supported and the bearing pad surface. Since the shape of the shaft surface to be supported is invariable, it follows that the most important consideration in the design of hydrodynamic bearings is the shape of the pad surface under load. The shape of the pad surface under load principally depends upon two factors: the shape of the pad itself and the construction and location of the pad support structure. For purposes of this description, the various support structure designs will be discussed first followed by a discussion of various pad designs. It must be emphasized that the various support structures disclosed herein can be used with any of the pad shapes disclosed herein and the pad-shapes used herein can be used with any of the support structures disclosed herein.

Figure 4:
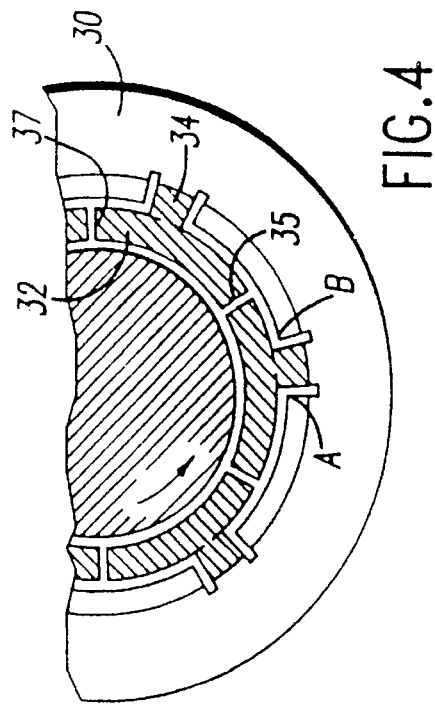
FIG. 4 is a sectional view of a sector of a second example of a journal bearing made according to the present invention.
Figure 5:
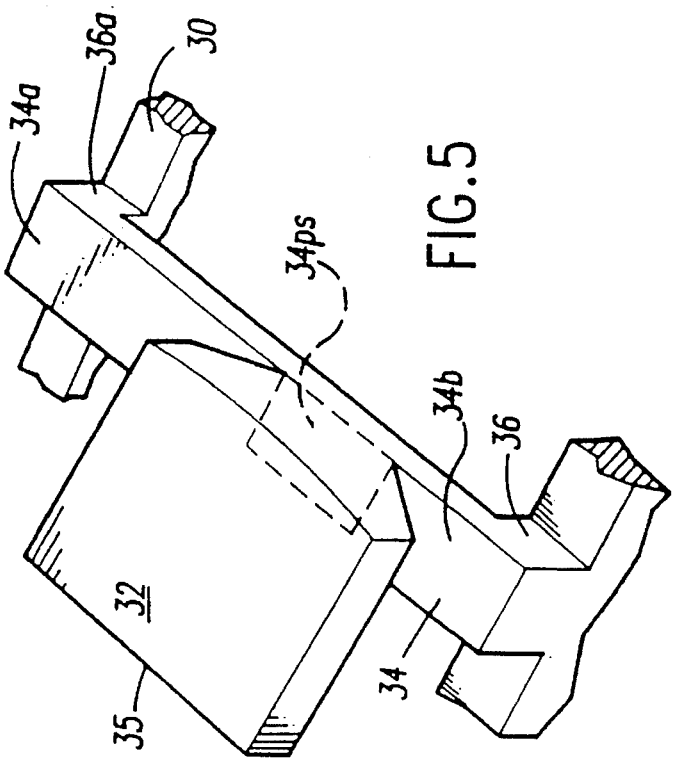
FIG. 5 is a view partly in section of a single pad of FIG. 4.

Referring to FIGS. 4 and 5, there is shown a second illustrative example of a bearing incorporating features of the present invention in which the bearing is formed with slits or cuts and grooves to define a bearing housing 30 with a bearing pad 32 that is supported from the housing by a support structure that includes a beam having a pair of beam portions 34a, 34b that extend substantially in a single line away from the pad. Moreover, the pad may be undercut so that it is supported by the beams only on a pad support surface 34ps. Referring to FIG. 5, it will be seen that the beams 34, 34a have a convenient stub beam end as is 36, 36a which acts as a cantilever support for the beam.

Figure 7:
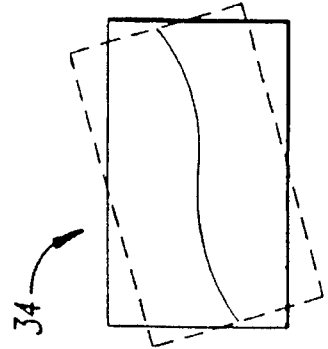
FIG. 7 is a diagrammatic view of the torsional deflection of a beam, greatly enlarged.
Figure 5A:
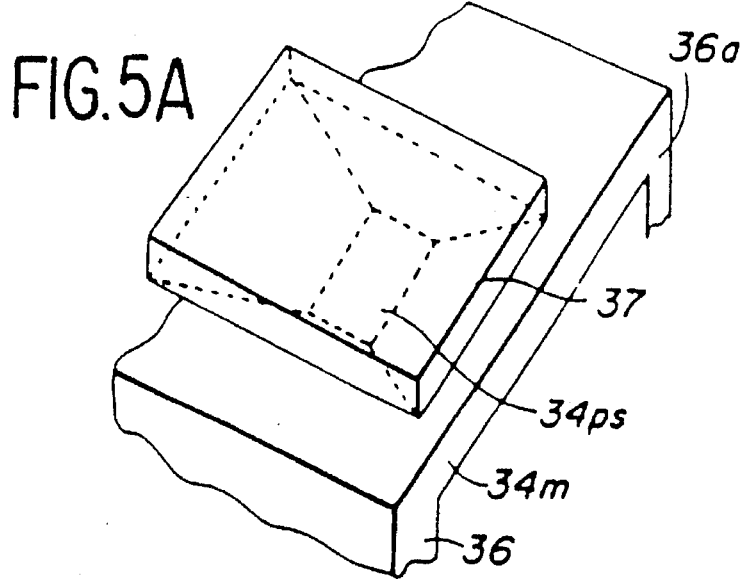
FIG. 5A is a perspective view of a section of a modified form of the bearing of FIG. 4.
Figure 5B:
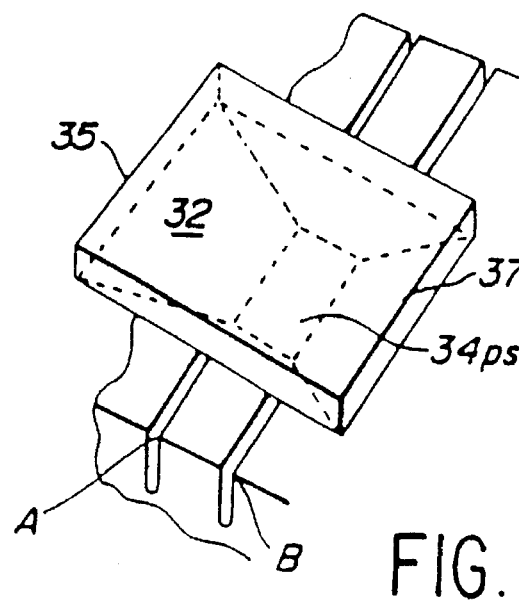
FIG. 5B is a perspective view of a modified form of the bearing shown in FIG. 4.

As is evident from FIG. 4, the perspective view of FIG. 5 shows only a portion of the pad 32. The complete pad is illustrated in FIGS. 5A and 5B that show possible modifications of the bearings illustrated in FIG. 4. As is clear from the drawings, the pad support surface 34ps is located closer to the trailing edge 37 than the leading edge 35. With this construction, twisting of the beam, as illustrated in FIG. 7, will take place intermediate the beam and create the torsional deflection illustrated. Again the primary flexibility is developed by small cuts or slits through the bearing housing wall. These cuts provide the bearing pad with six degrees of freedom (i.e., the pad can translate in the +x,−x, +y,−y, +z and −z directions as well rotate about the x, y and z axes) and are designed to optimize hydrodynamic wedge formation. If the cuts or slits were terminated before breaking through to form beam portions 34a and 34b, the pad 32 would be supported by a continuous cylindrical membrane 34m as shown in FIG. 5A. The membrane acts as a fluid damper upon which the pad 32 is supported. The termination of the cuts would occur at Point A and Point B of FIG. 4. The flexibility of the membrane, combined with the fluid lubricant, provides a means to vary the damping action and to isolate the pad from the housing. The damping takes the form of a dash pot that exhibits high damping characteristics. As with the bearing illustrated in FIGS. 1–3, the bearing illustrated in FIGS. 4–7 is non-symmetrical about its pad center line and is therefore a unidirectional bearing. Accordingly, the bearing has a leading edge 35 that deflects outward and a trailing edge 37 that deflects inward to form a wedge. Again, the wedge ratio (ratio of spacing between the trailing edge and the shaft to the spacing between the leading edge and the shaft) should be between 1:2 to 1:5. Moreover, the location of the center of action of the load that is primarily determined by the location of pad support portion 34ps of the beam 34 with respect to the pad should, again, be between the circumferential center of the pad face and the trailing edge, preferably closer to the circumferential center of the pad face.

As shown in FIG. 5B, the beam may be defined more simply than shown in FIG. 5 by simply extending the cuts or slits downward from points A and B.

Referring to FIG. 8, there is shown another illustrative example of a bearing incorporating features of the present invention. In this example, internal slits or cuts are provided to create a beam on beam support structure. Specifically, the bearing is formed with grooves and slits or cuts to define a pad 40 that is supported from a housing by beams 42 and 44. The pad is connected to the beams at support stubs 40a and 40b. Beam attachment to the housing is at support stubs 46 and 48. Again the bearing consists of the thin cuts or slits shown cut through the bearing wall. The cut or slit 60 below the pad surface introduces additional flexibility such that under load the pad changes shape to form an airfoil for the introduction of lubricant. Thus, as a result of the beam on beam two point support, the pad acts as a spring like membrane.

Figure 10:
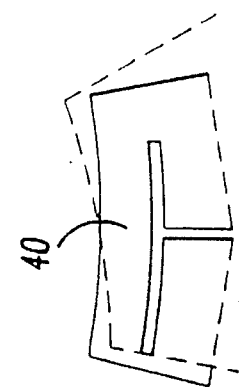
FIG. 10 is an edge view of the pad of FIG. 8 illustrating the pad orientation with the support structure in the loaded state.
Figure 10A:
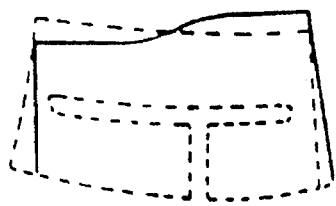
FIG. 10A is an edge view of the pad of FIG. 8 illustrating local deflection of the pad surface greatly exaggerated.

FIG. 10A shows the deflected shape of the pad 40 under load. As shown in the drawings (exaggerated), the pad can be formed and supported so as to deflect to an airfoil shape under load. The airfoil dramatically improves performance. As is evident from the drawings, the pad is capable of displacement in the x, y, and z directions as well as rotation about the x, y, and z axes, that is, the pad has six degrees of freedom. Again, the structure allows optimal hydrodynamic wedge formation.

Referring to FIG. 9, there is shown the local inherent deflection of the face pad 50 where the pad flattens under load. These deflections are combined with the support structure deflection shown in FIGS. 3 and 10 but are of a lower magnitude. The net result is the shape shown in FIGS. 3 and 10 but with a face curvature that has been minutely flattened.

FIGS. 31 and 31A illustrate another example of a journal bearing in accordance with the present invention. The bearing construction illustrated in FIGS. 31 and 31A differs from the previously described journal bearing constructions in that the bearing is bi-directional, i.e., the bearing is capable of supporting a shaft for either clockwise or counterclockwise rotation as viewed in FIG. 31. The bearing is bi-directional because the pads are symmetrical about their center line, which is defined as the radial extending line passing through the bearing major axis (606) and the geometric center of the pad. Like the previously described journal bearings, the bearing of FIGS. 31 and 31A is formed with a plurality of thin radial and circumferential slits to define a plurality of circumferentially spaced bearing pads 632.

The support structure for each of the bearings pads 632 is somewhat similar to the support structure for the journal bearing illustrated in FIG. 8. In particular, each bearing pad 632 is supported by a beam support structure at two pad support surfaces 632ps. The beam network connected to the bearing pads at each pad support surface 632ps is identical, yielding the symmetrical construction of the bearing that makes the bearing bi-directional. For purposes of simplifying this description, only the network of beams which supports the bearing at one pad support surface will be described since the other pad support surface is supported in an identical fashion. Thus, as shown in FIG. 31, a first, generally radially extending beam 640 is connected to the bearing pad 632 at the pad support surface 632ps. A second, generally circumferential beam 642 is connected to the radially outermost end of beam 640. A third, generally radial, beam 644 extends radially inward from the beam 642. A fourth, generally circumferential beam 646 extends from the radially innermost portion of the beam 644. A fifth, generally radial beam 648 extends radially outwardly from a beam 644 to the housing portion of the support structure. In summary, each bearing pad 632 and the bearing illustrated in FIG. 31 is supported by ten beams and the bearing housing. Further, as discussed below, by forming radially extending circumferentially spaced grooves or continuously extending circumferential grooves in the housing portion of the support structure, the housing portion of the support structure can be designed to act as a plurality of beams or membranes. It should also be noted that, like the bearing in FIG. 8, the cut or slit formed below the pad's surface introduces additional flexibility such that under load the pad changes shape to form an airfoil for the introduction of lubricant. Thus, as a result of the beam on beam two point support, the pad acts like a spring-like membrane.

FIG. 31A is a radial cross-section of FIG. 31 showing the third beam 644, the bearing pad 632 and the housing.

Figure 32B:
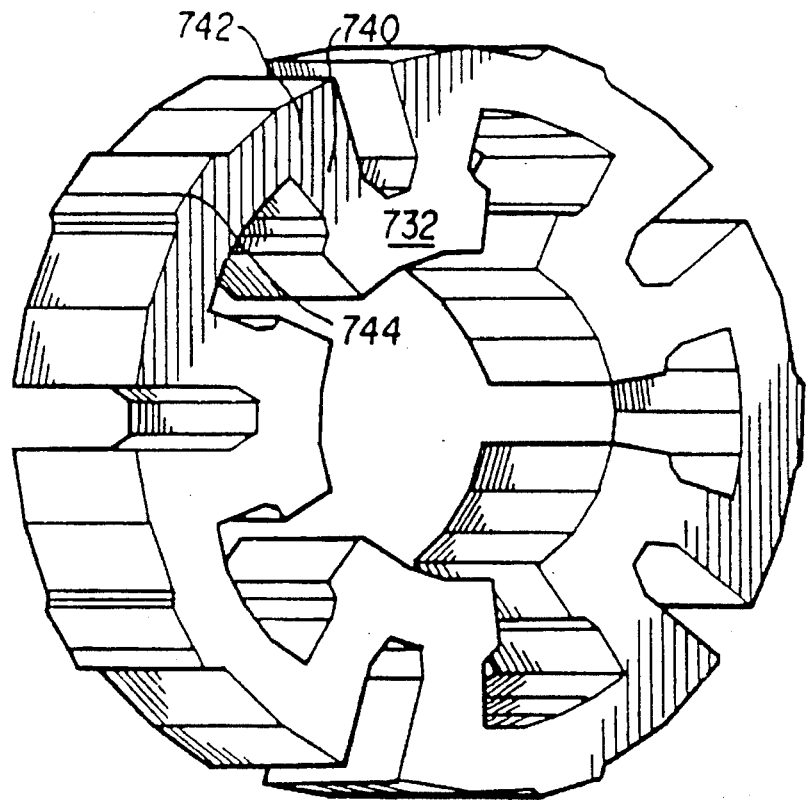
FIG. 32B is a perspective view of the bearing of FIG. 32.

FIGS. 32, 32A and 32B illustrate another journal bearing construction in accordance with the present invention. This bearing construction differs from the previously described bearing constructions in that the bearing pads and support structure are defined by relatively large grooves and openings formed in a cylindrical blank. Normally, this type of construction would be formed by milling the blank rather than electrical discharge machining or another similar technique for farming small grooves as with the previously described embodiments. An advantage of the bearing construction illustrated in FIG. 32 is that in applications requiring extremely small bearings it is easier to form precisely the proportionately larger cuts and openings required to form a bearing of the type illustrated in FIGS. 32, 32A and 32B as compared to the proportionately smaller cuts and openings required by the construction of, for example, FIGS. 1, and 8. Moreover, the large grooves or openings are generally easier to mold or extrude bearings formed by larger cuts also find use in applications requiring extremely large bearings with stiff bearing pad support structures.

The bearing pads shown in FIG. 32 are symmetrical about their pad center line, 706A. Hence, the bearing is bi-directional. Moreover, as best shown in the perspective view of FIG. 32B, the bearing has a continuous cross-section with no hidden openings. Hence, it is easily extrudable and easily moldable. Naturally, the support structure can be altered by providing discontinuities in the cross-section, e.g., by providing radially extending circumferential grooves or non-symmetrically disposed radially extending openings to alter the support structure and thereby alter the performance characteristics. The bearing's major axis is 706.

As shown in FIG. 32, the bearing includes a plurality of circumferentially spaced bearing pads 732. Each bearing pad 732 is supported by a support structure that includes a pair of generally radial beams 740 connected to the bearing pad 732 at a pad support surface. A second, generally circumferentially extending beam 742 supports each of the beams 740. Beams 742 are connected to the housing or support stubs 744 in a cantilever type fashion. In this bearing, the beams 740 can be regarded as a primary support structure; the beams 742 can be regarded as a secondary support structure; and the beams 744 can be regarded as a tertiary support structure.

The second beams 742 shown in FIG. 32 are defined by forming a plurality of axially extending circumferential grooves 750 in the housing of the support structure. In order to maintain the symmetry of the bi-directional bearing, these grooves are circumferentially spaced about pad center lines 706A in a manner identical to the circumferential spacing of the bearing pads 732. Naturally, similar circumferentially spaced radial grooves could be provided in any of the previous bearing constructions. For instance, as noted above, such grooves could be formed in the periphery of the bearing construction illustrated in FIGS. 31 and 31A to provide a further beam-like support.

FIG. 32A is a radial cross-section of a portion of the bearing illustrated in FIG. 32. In this cross-section, the bearing pad 732 and first beam 740 are visible.

FIG. 32B is a perspective view of the bearing of FIG. 32. It should be noted that although the peripheral, circumferential and cylindrical portions of the bearing are depicted in a somewhat segmented fashion to emphasize the curvature, these curved surfaces are in fact continuously curved.

Figure 33:
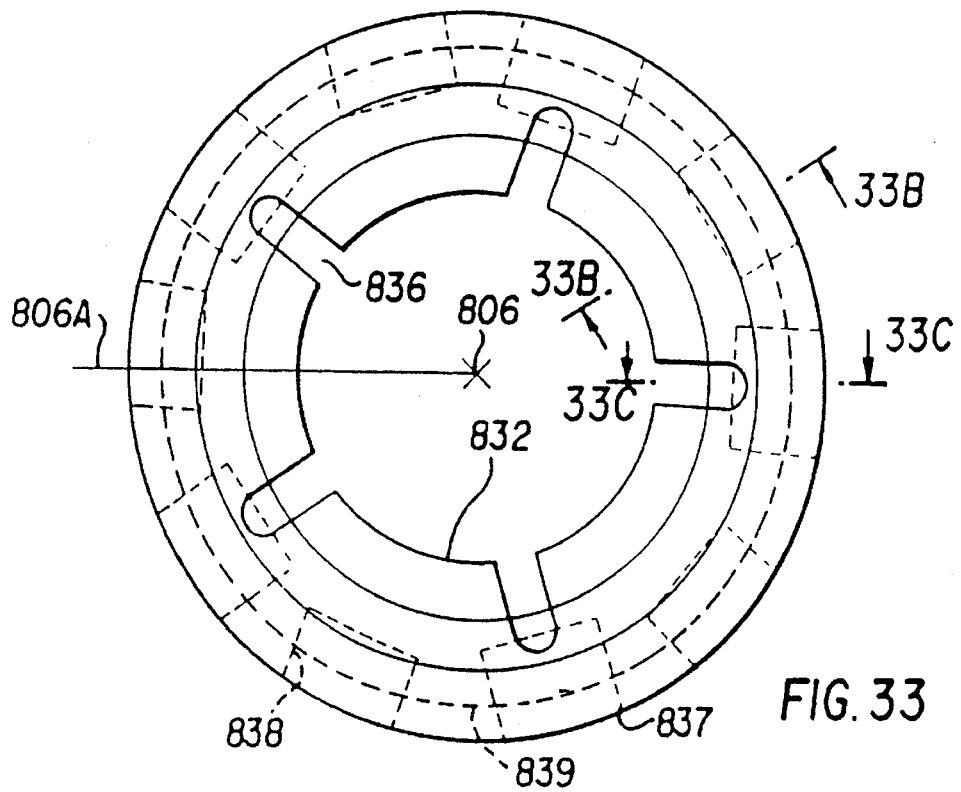
FIG. 33 is a side view of another journal bearing construction according to the present invention.

FIG. 33 illustrates a journal bearing construction according to the present invention. Like the bearing of FIG. 32, the bearing of FIG. 33 is formed by proportionately large grooves and bores. In particular, a plurality of equally spaced radially extending circumferential grooves define a plurality of circumferentially spaced bearing pads 832. The bearing pads 032 are further defined by a pair of axially extending circumferential grooves that extend symmetrically from the planar faces of the cylindrical blank and are best seen in FIGS. 33B and 336 in which the grooves are indicated by the reference numerals 834 and 835. The bearing support structure is defined by the aforementioned structural features and by a plurality of circumferentially spaced symmetrically disposed shallow bores 838 and a plurality of circumferentially spaced symmetrically disposed deep bores 837. Because of the presence of the "hidden" bores 837,838, the bearing construction of FIG. 33 is not extrudable and not moldable in a simple two-piece mold, i.e., not easily moldable.

Figure 33A:
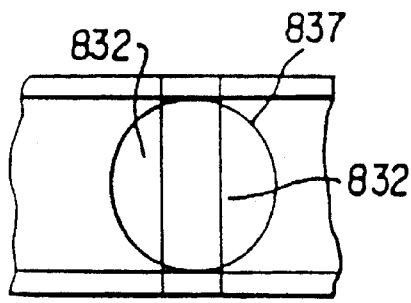
FIG. 33A is a detail of part of the outer periphery of the bearing of FIG. 33.
Figure 33B:
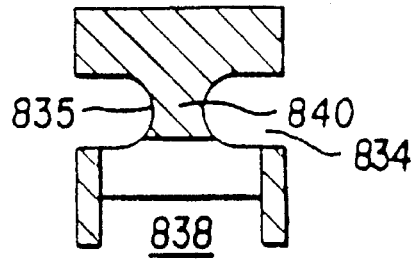
FIG. 33B is a cross-section of the bearing of FIG. 33.

As best shown in FIG. 33A, the deep bores 837 intersect the axial grooves 836 so as to define support structures for each bearing pad. The support structure is further defined by a circumferential groove 839 extending from the outer periphery of the cylindrical blank.

Figure 33C:
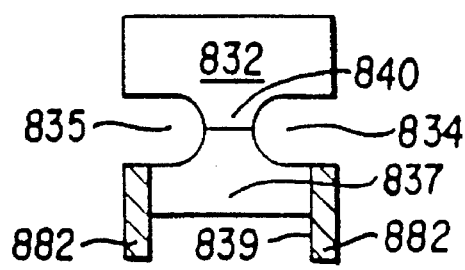
FIG. 33C is another cross section of the bearing of FIG. 33.

With reference to FIGS. 33–33c, it will be understood that the provision of the structural members as discussed above provide a support structure for the bearing pad 832, which includes a beam 840 directly supporting the pad, i.e. a primary support structure, two continuous beams 882, i.e. a tertiary support structure and a secondary support structure comprising a plurality of beams defined in part by bores 837 and 838 connecting the beam 840 to the continuous beams 882.

Because the support structure of the bearing illustrated in FIGS. 33–33C is non-symmetrical about the pad center line extending from the major axis 806, it is uni-directional. Further, like the bearing of FIG. 32, this bearing is particularly well suited to applications requiring extremely small bearings since the proportionately larger grooves and bores that define this bearing and its support structure are more easily manufactured.

Figure 34:
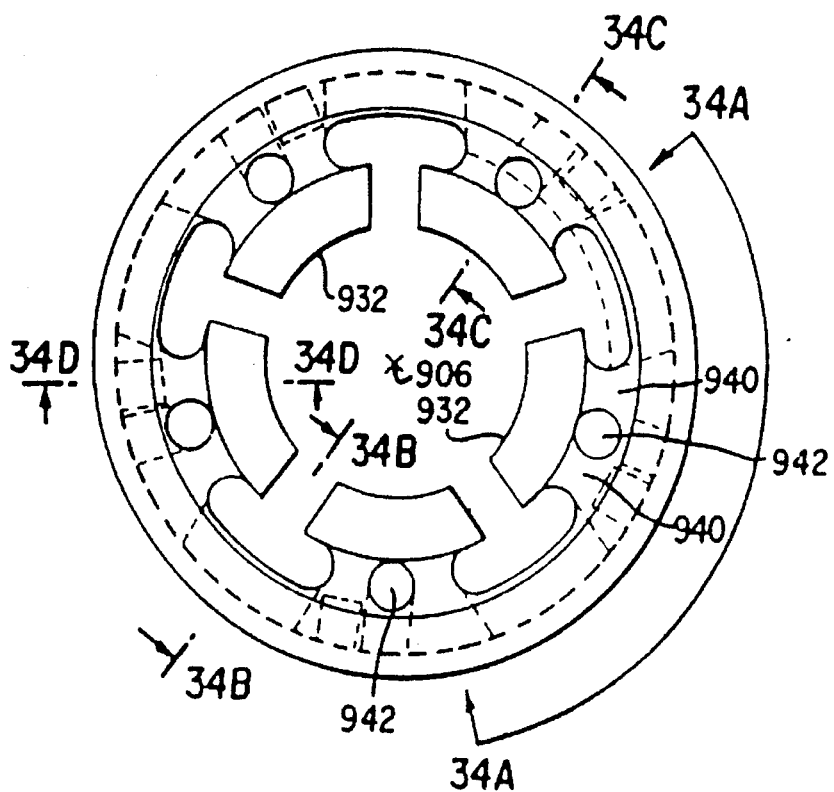
FIG. 34 is a side view of another journal bearing according to the present invention.
Figure 34A:
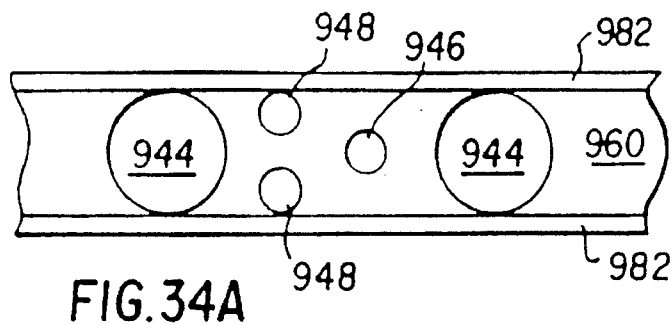
FIG. 34A is a detail of part of the outer periphery of the bearing of FIG. 34.
Figure 34B:
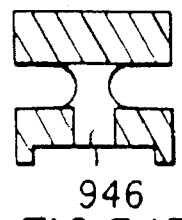
FIG. 34B is a cross-section of the bearing of FIG. 34.
Figure 34C:
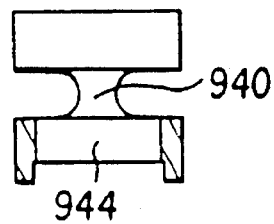
FIG. 34C is another cross-section of the bearing of FIG. 34.
Figure 34D:
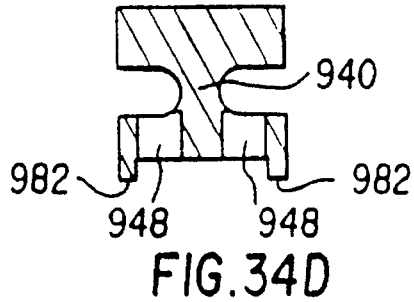
FIG. 34D is another cross-section of the bearing of FIG. 34.

FIGS. 34 and 34A–34D illustrate another journal bearing construction in accordance with the present invention. The bearing construction of FIG. 34 is similar to that of FIG. 33 insofar as the bearing pads and their support structures are defined by proportionately large grooves and bores as shown in the drawings. The support structure for the bearing pads 932 is like the support structure for the bearing pads 832. In particular, while the support structure for each of the bearing pads 932 is identical, the support structure is not symmetrical with respect to each bearing pad. Hence, the bearing illustrated in FIG. 34 is unidirectional. Moreover, because the support structure includes "hidden" openings, the bearing is neither extrudable or moldable in a simple two-piece mold.

As shown in the drawings, the bearing support structure includes a primary support structure comprising a pair of beam-like members 940 that are connected to the bearing pads 932 and defined in part by symmetrically disposed openings 942. A shallow circumferential groove formed on the outer periphery of the bearing defines a tertiary support structure comprising a pair of continuous beam-like elements 982. A secondary support structure comprising a beam and membrane network 960 for connecting the beams 940 to the continuous beams 982 is defined by the provision of a plurality of large symmetrically disposed bores 944, the provision of smaller symmetrically disposed bores 946 and the provision of small non-symmetrically disposed bores 948. By virtue of the provision of the non-symmetrically disposed bores 948, the support structure is more flexible, and thus biased, in the direction of those bores.

Figure 16:
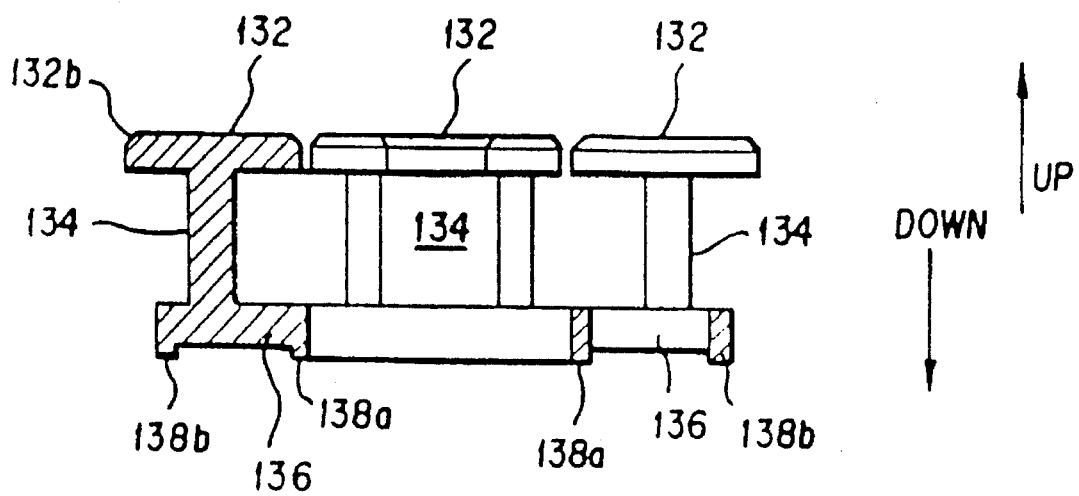
FIG. 16 is a side cross section of the thrust bearing of FIG. 15.
Figure 17:
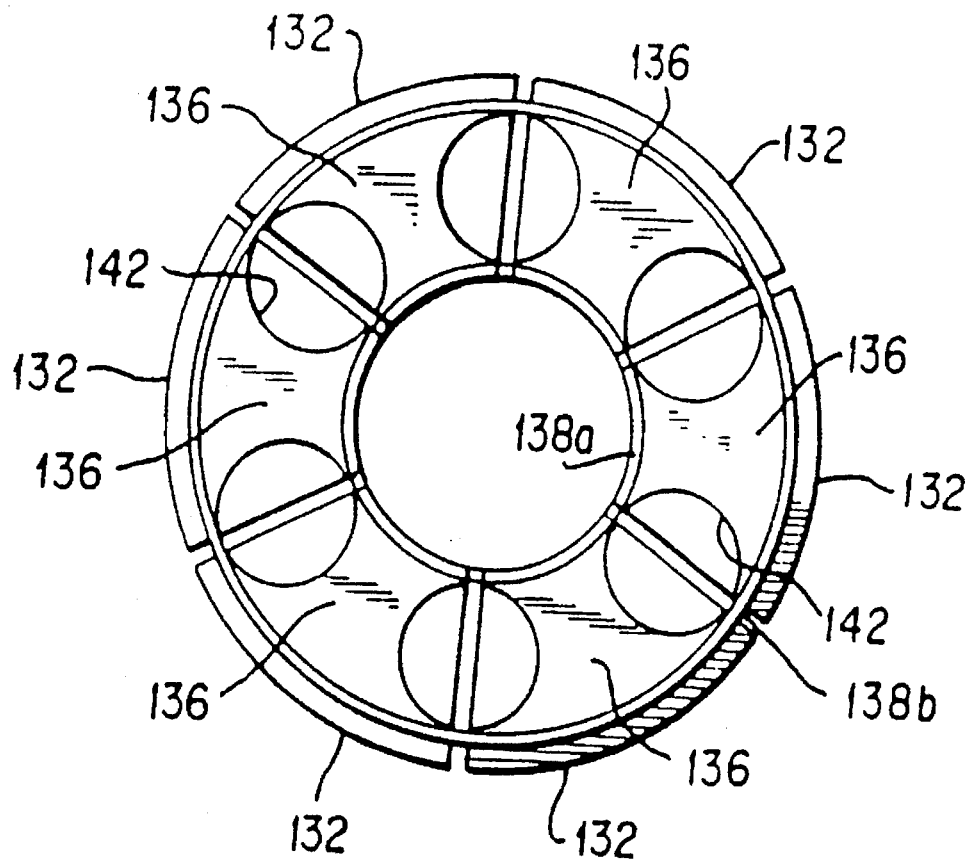
FIG. 17 is a bottom view of the thrust bearing of FIG. 15.
Figure 18:
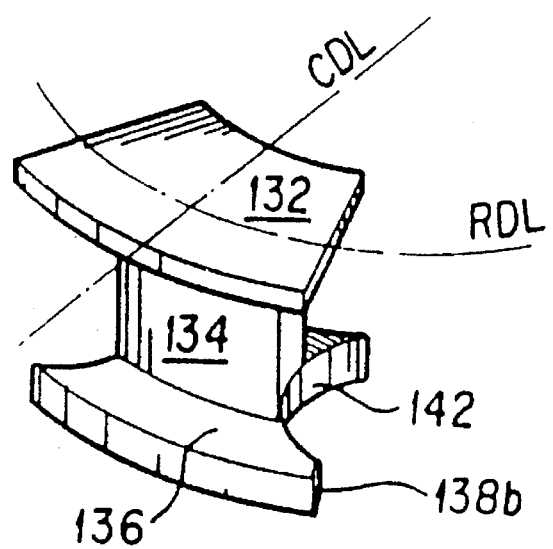
FIG. 18 is a perspective view of part of the thrust bearing of FIG. 15.
Figure 19:
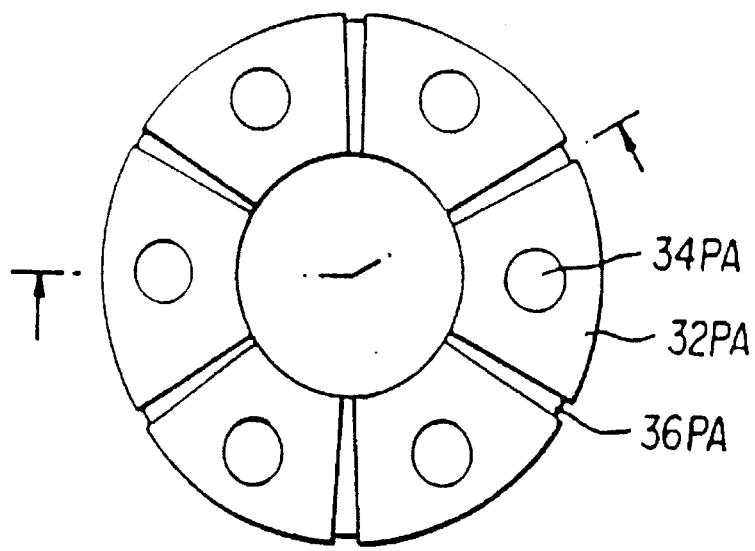
FIG. 19 is a top view of a prior art thrust bearing.
Figure 20:
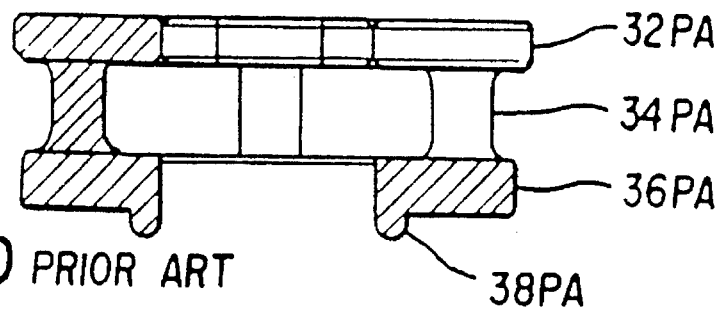
FIG. 20 is a cross-section of the prior art thrust bearing of FIG. 19.
Figure 20A:
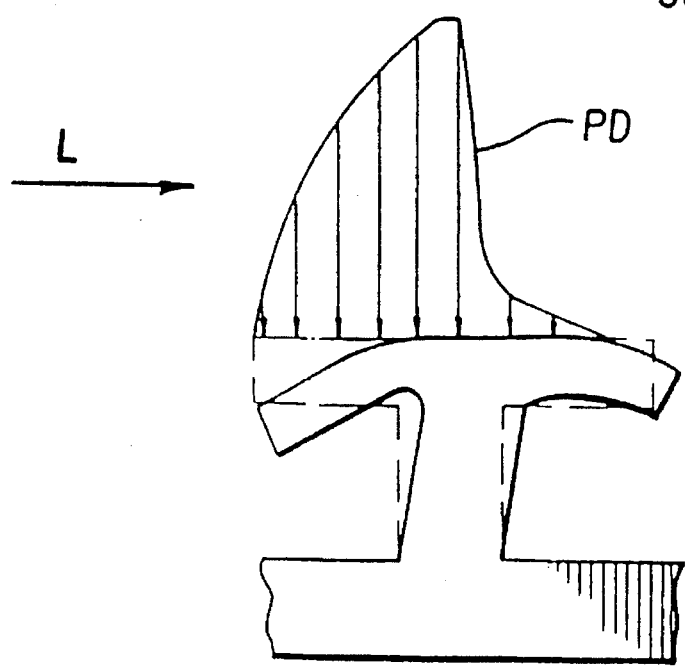
FIG. 20A is a schematic representation of a segment of the prior art thrust bearing of FIGS. 19 and 20 showing the pressure distribution across the surface of a bearing pad.

FIGS. 15–18 illustrate a unitary hydrodynamic thrust bearing in accordance with the present invention. As noted earlier, thrust bearings in accordance with the present invention incorporate some of the same features as journal bearings in accordance with the invention. For instance, like journal bearings, the thrust bearings of the present invention have a major axis defined as the central axis of the blank from which the bearing is formed. Also the bearing pads have a circumferential center line extending from the major axis through the geometric center of the pad. When the thrust bearing is symmetrical about its circumferential center line it is bi-directional; when the bearing is non-symmetrical about its circumferential center lines, it is undirectional. However, by nature of their different function, the thrust bearings have a slightly different configuration. For example, the thrust bearing shown in FIGS. 15–18 includes a plurality of bearing pads 132 of substantially identical configuration. FIG. 18 shows the circumferential dividing line CDL and radial dividing line RDL of the bearing pad 132. The bearing pad surfaces of the bearing pads 132 lie in a plane that is essentially transverse to the axis of the shaft to be supported and the bearing's major axis. Of course, when the pad surfaces are deflected under load, or if it is desired that the bearing be skewed slightly so as to contact the shaft in the installed or static state, the surface of the bearing pads may be somewhat non-planar and somewhat skewed with respect to the major axis or the axis of the shaft to be supported.

A particularly important consideration in the design of thrust bearings of the present invention is the prevention of fluid leakage. To a large extent, this objective is achieved by designing the support structures such that under load the inner edge of the bearing pads deflect downward (as viewed in FIG. 16) and the outer edge deflects upwardly. All of the thrust bearings described herein are designed in this manner. For instance, in the bearing shown in FIG. 16, the beam 134 is connected to the pad 132 at a pad support surface 134ps that is closer to the outer edge of the bearing pad than it is to the inner edge of the bearing pad. Thus, the pad support surface 134ps is located radially outward of the radial dividing line RDL shown in FIG. 18. Hence, the bearing is designed such that, under load, the inner edge of the bearing deflects downward.

In operation, the downward deflection of the inner edge of the bearing pad corresponds to deflection away from the shaft supported and the upward deflection of the outer edge of the bearing pad corresponds to deflection toward the shaft. The deflected orientation of the bearing pad significantly inhibits the loss of fluid that otherwise occurs as a result of centrifugal forces' action on the fluid.

Figure 29:
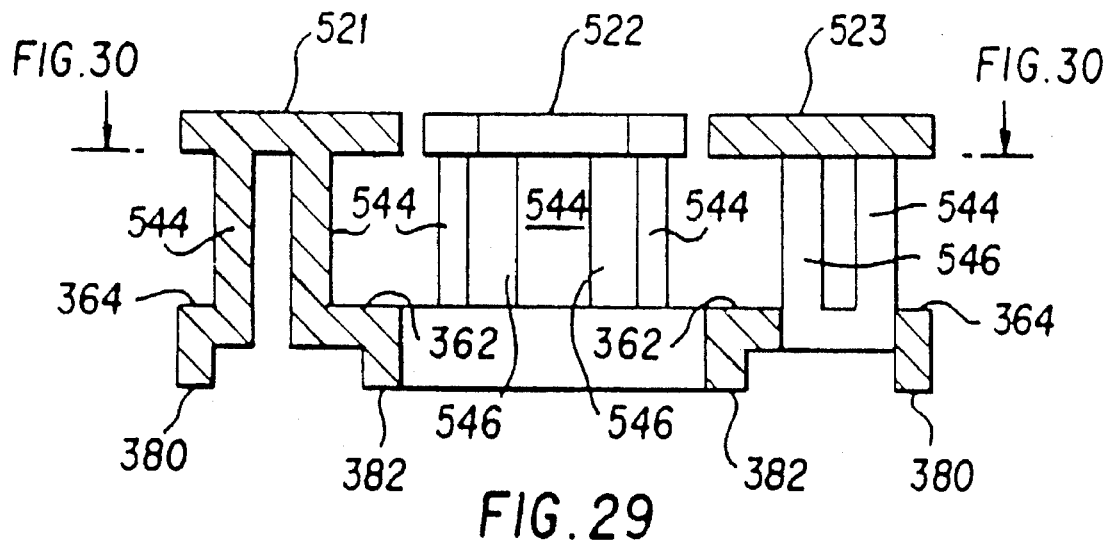
FIG. 29 is a side cross-section of another bearing construction according to the present invention.

The loss of hydrodynamic fluid can be further reduced by supporting the bearing pad such that under load, the bearing pad deforms to form a lubricant retaining pocket. Generally, such support is achieved when the bearing pad is supported by a plurality of radially or circumferentially spaced beams and the region between the beams is not directly supported such that the unsupported central region of the pad will tend to deform outwardly so as to form a fluid retaining channel. FIG. 29, which is discussed below, illustrates an example of a bearing having the requisite radially spaced beams therein. A greater pocket is obtained when the beams are spaced further apart. In a similar manner, a channel can be formed in a journal bearing by providing axially or circumferentially spaced beam supports and an unsupported region between the beams.

Figure 15:
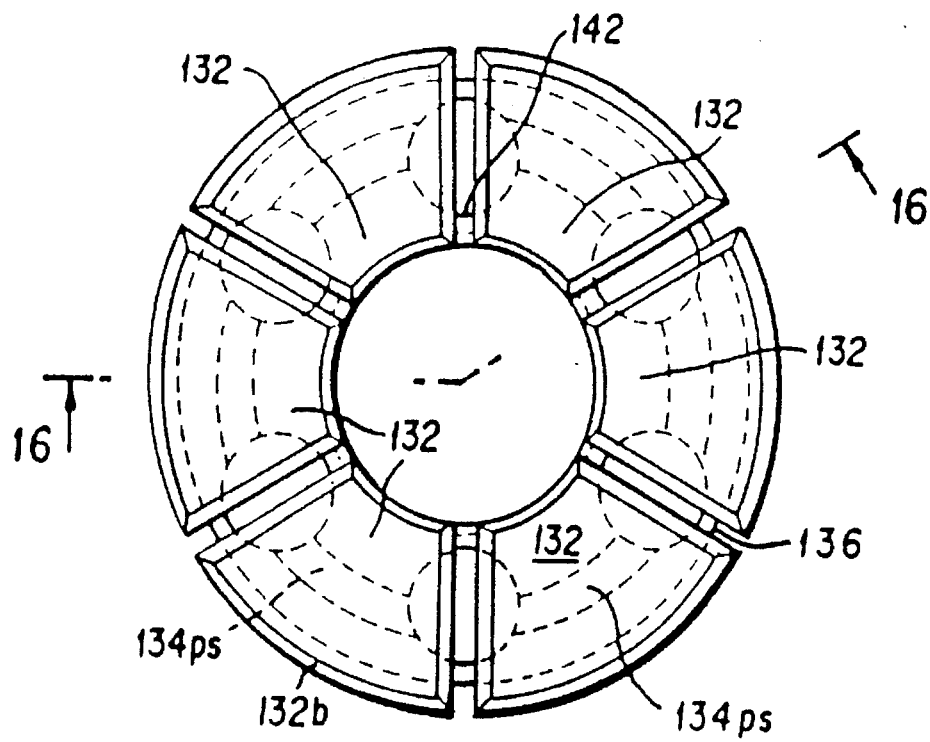
FIG. 15 is a top view of a thrust bearing having beam mounted bearing pads.

As best shown in FIGS. 15 and 16, each bearing pad has a chamfer or bevelled edge 132b around its entire periphery. The purpose of the chamfer is to reduce entrance and exit lubricant losses.

Each of the bearing pads 132 is supported by primary support portion, which in the illustrated embodiment comprise a beam-like support member 134 supporting the pad at a bearing pad support surface 134ps. Each beam 134 is in turn supported by a secondary support portion such as a beam supported beam or membrane 136. The beam or membrane 136 is in turn supported by a tertiary support member such as pair of beam-like legs 138a, 138b.

By providing holes or openings 142 in the beam or membrane portion 136, the continuous membrane 136 becomes a set of beams 136. Naturally, if holes or openings 142 are not provided in the membrane 136, the membrane functions as a continuous membrane. Alternatively, the inner beam-like leg 138a could be replaced with short stub-like beams or even eliminated to define a tertiary support such that the secondary support is supported in a cantilever fashion. Finally, because the holes and openings are symmetrically disposed with respect to the major axis the bearing is symmetrical about the major axis and is therefore bidirectional.

As shown in FIGS. 15, 17 and 18 the holes or openings 142 that divide the continuous membrane into separate beams are round. The use of round openings facilitates manufacture of the bearing prototype because circular openings can easily be drilled into the bearing material. This is true of all the bearings described herein. Once such circular openings are provided, it may also be advantageous to extend the openings past the beam or membrane member 136 to the lower portion of the bearing pads 132 so as to define the beam-like members 134. This is why in FIG. 15, the cross-section of the pad support surface 134ps and consequently the sidewalls of the beam 134 have an accurate appearance.

Although the shape of the beam members may be dictated by manufacturing convenience, the shape also affects the performance of the individual bearings. Thus, although the specific shape of the bearings described herein, including the thrust bearing shown in FIGS. 15–18, is primarily attributable to the ease of manufacturing a prototype, it also has been found to yield excellent results for a specific application. Any changes in the shape would, of course, influence the performance characteristics of the bearing by, for example, altering the bending or twisting characteristics of the beams that support the bearing pad. Thus, while other shapes of beams, pads and membranes are certainly contemplated, both the ease of manufacturing and the effect of the beam pad or membrane's shape on bearing performance must be considered.

Examples of other thrust bearing shapes are shown in an FIGS. 21–30 and 38–39. The difference between these bearings and the bearing construction shown in FIGS. 15–18 primarily resides in different constructions of the primary support portion, the secondary support portion and the tertiary support portion.

Figure 21:
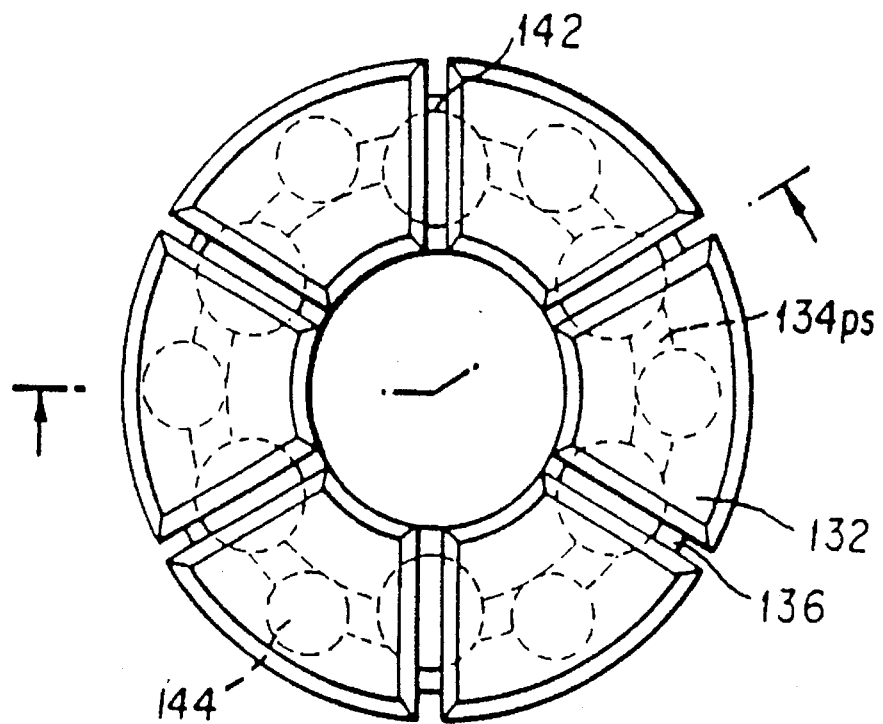
FIG. 21 is a top view of a thrust bearing according to the present invention having two legged support.
Figure 22:
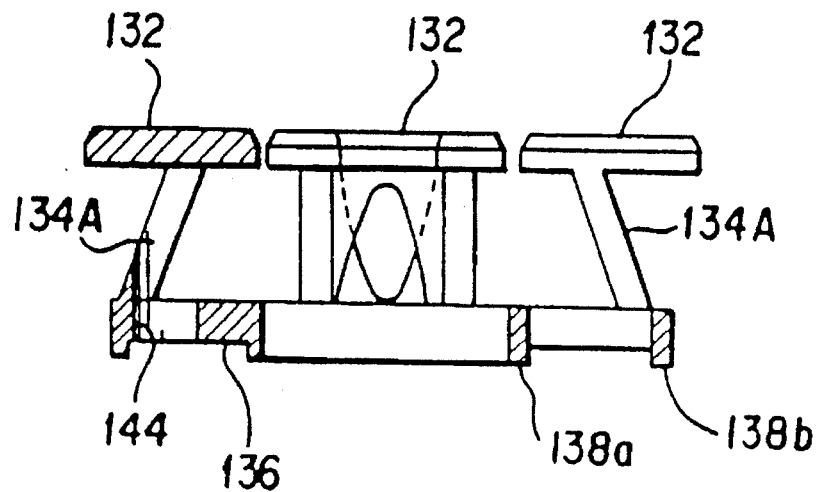
FIG. 22 is a side cross-section of the thrust bearing of FIG. 21.
Figure 23:
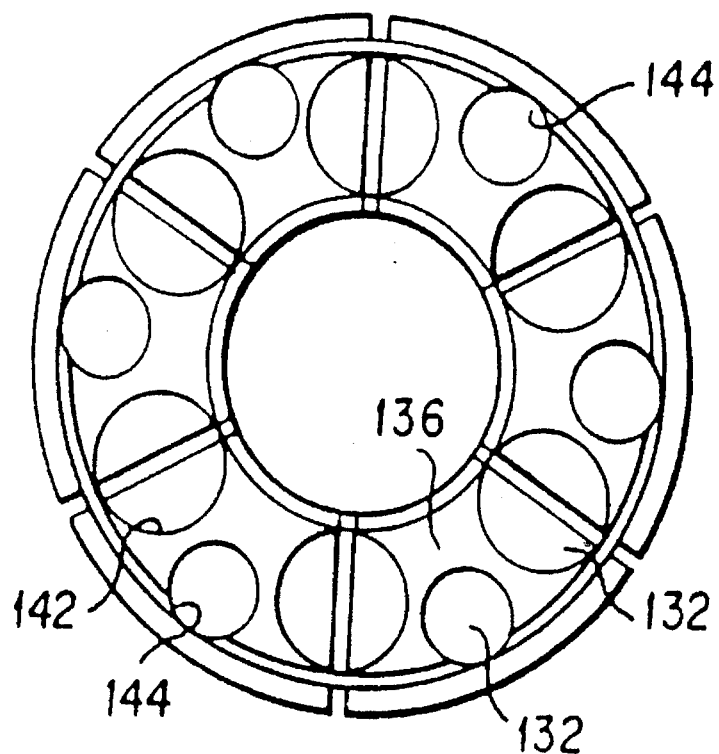
FIG. 23 is a bottom view of the bearing of FIG. 21.
Figure 24:
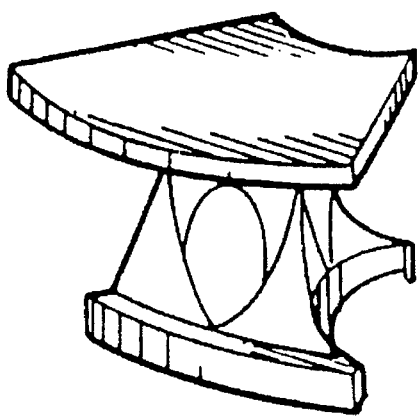
FIG. 24 is a perspective view of a segment of the bearing of FIG. 21.

One such other bearing shape is illustrated in FIGS. 21–24. A top view of the bearing is shown in FIG. 21; a cross-section of the bearing is shown in FIG. 22; a bottom view of the bearing is shown in FIG. 23 and a perspective view of the bearing is shown in FIG. 24. The bearing shown in FIGS. 21–24 is similar to the bearing of FIGS. 15–18 with two notable exceptions. First, the bearing of FIGS. 21–24 includes an angled or slanted support beam 134A rather than a vertical support beam as in FIG. 15. Second, the bearing includes additional holes 144 that extend through the support beam 136 to form a cylindrical opening through the slanted or angled beam 134 so as to form elliptical openings in the support beam. The elliptical openings divide the beam into a pair of complex ligaments, the shape of which can be appreciated with reference to the perspective view of FIG. 24. The provision of the openings 144 and consequent division of the slanted or angled beams 134A into complex ligaments significantly increases the flexibility of the support structure of the bearing shown in FIGS. 21–24 as compared to the bearings shown in FIGS. 15–18. Thus, the pads 132 of the bearing of FIGS. 21–24 deflect to form a hydrodynamic wedge in response to a lighter load than do the pads 132 of the bearing shown in FIGS. 15–18. It follows that the bearing shown in FIGS. 21–24 is better suited for supporting light loads and the bearing shown in FIGS. 15–18 is better suited for carrying heavier loads. Further, the provision of angled or slanted support beams such as beam 134A, with or without openings to divide the beam into complex ligaments, increases the flexibility of the pad in the vertical direction since a vertically applied load creates a moment that tends to cause the beam to deflect toward the center or inner diameter of the bearing and thereby eliminate centrifugal leakage of the lubricating fluid.

Figure 23A:
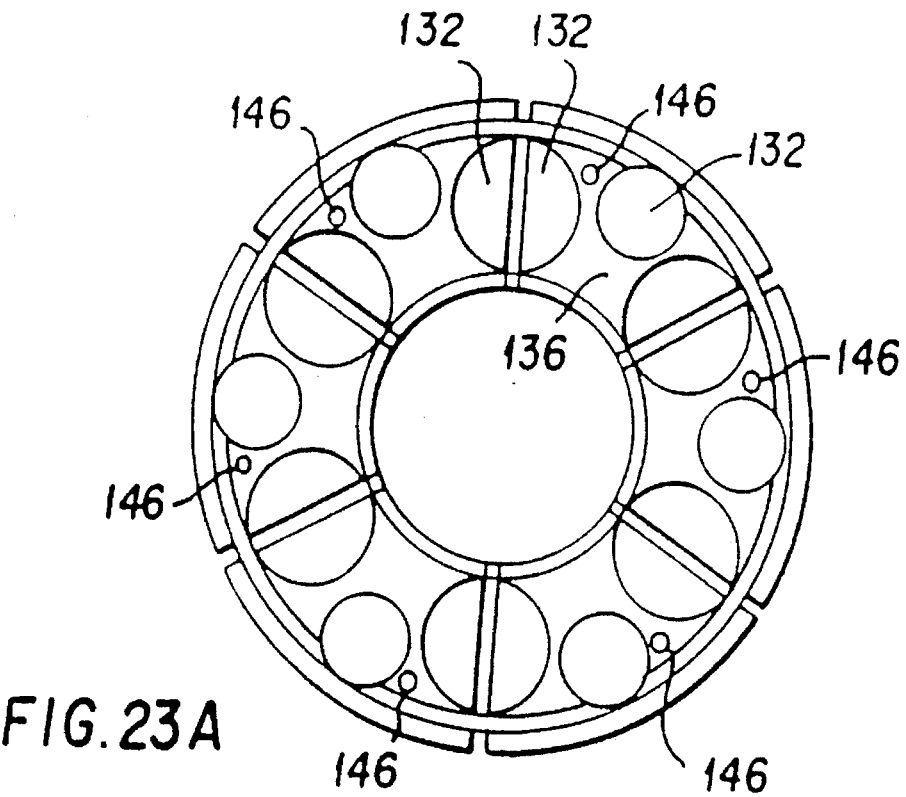
FIG. 23A is a bottom view of a modified version of the bearing of FIG. 21.

FIG. 23A shows a bottom view of a bearing of the type shown in FIGS. 21–24 in which additional holes 146 are formed in the membrane or support beam 136 to enhance the flexibility of the beam or membrane 136 even further. As illustrated in FIG. 23A, the holes 146 are formed nonsymmetrically with respect to each bearing segment. The provision of these holes in such a nonsymmetrical fashion results in a bearing in which the pads tend to deflect more easily in one direction than in the other direction. In other words, the bearing pads are biased in one direction by the provision of nonsymmetrical openings in the support structure. Naturally, such nonsymmetrically disposed openings can be provided in any of the bearing constructions of the present invention in which it is desired to bias the bearing pads in one direction. It may even be desirable to provide the nonsymmetrically disposed openings or holes such that only selected ones of the bearing pads are biased.

Figure 25:
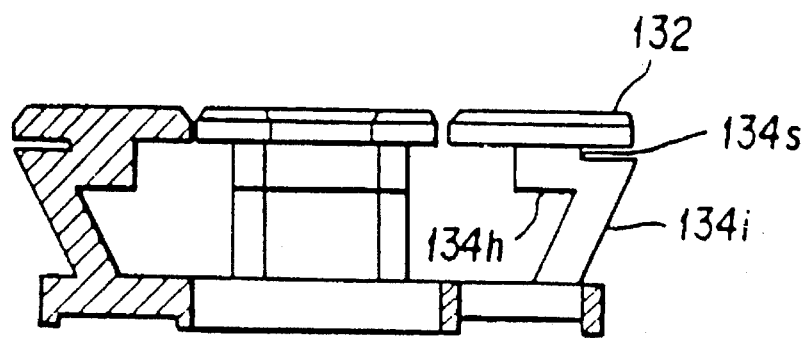
FIG. 25 is a cross-section of another bearing according to the present invention.

FIG. 25 is a cross-sectional view of another bearing according to the present invention. In accordance with this construction, the bearing pad 132 is supported on a pad support stub 134S that is in turn supported on a horizontally oriented beam portion 134H that is in turn supported on an inversely angled beam portion 134I. In other respects, the construction is similar to that of the previously described bearings. By virtue of this construction, the bearing has a great deal of flexibility in one direction but it is extremely rigid in the opposite direction.

Figure 26:
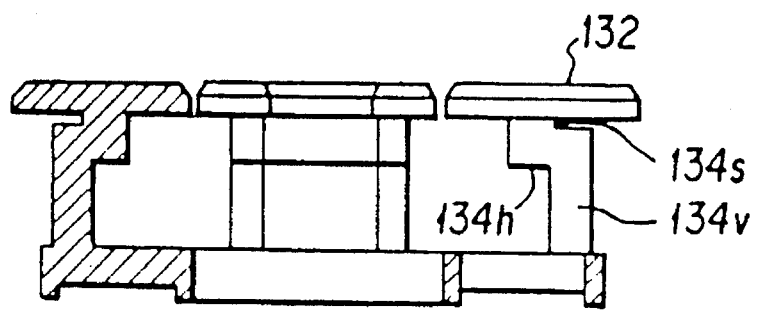
FIG. 26 is a cross-section of another bearing according to the present invention.

A similar construction is illustrated in FIG. 26. The difference between the bearing illustrated in FIG. 26 and the bearing illustrated in FIG. 25 is that the bearing illustrated in FIG. 26 uses a vertical beam portion 134V rather than an inversely angled beam portion 134I. The bearings are similar in all other respects. The absence of a angled beam in the bearing of FIG. 26 tends to give the bearing more rigidity in the vertical direction.

Figure 27:
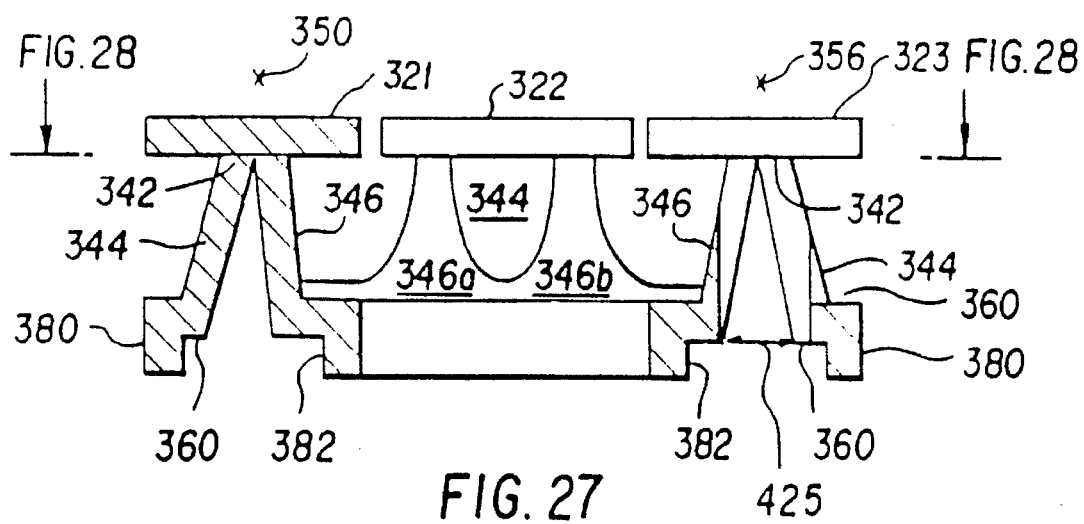
FIG. 27 is a side cross-section of another bearing construction according to the present invention.
Figure 28:
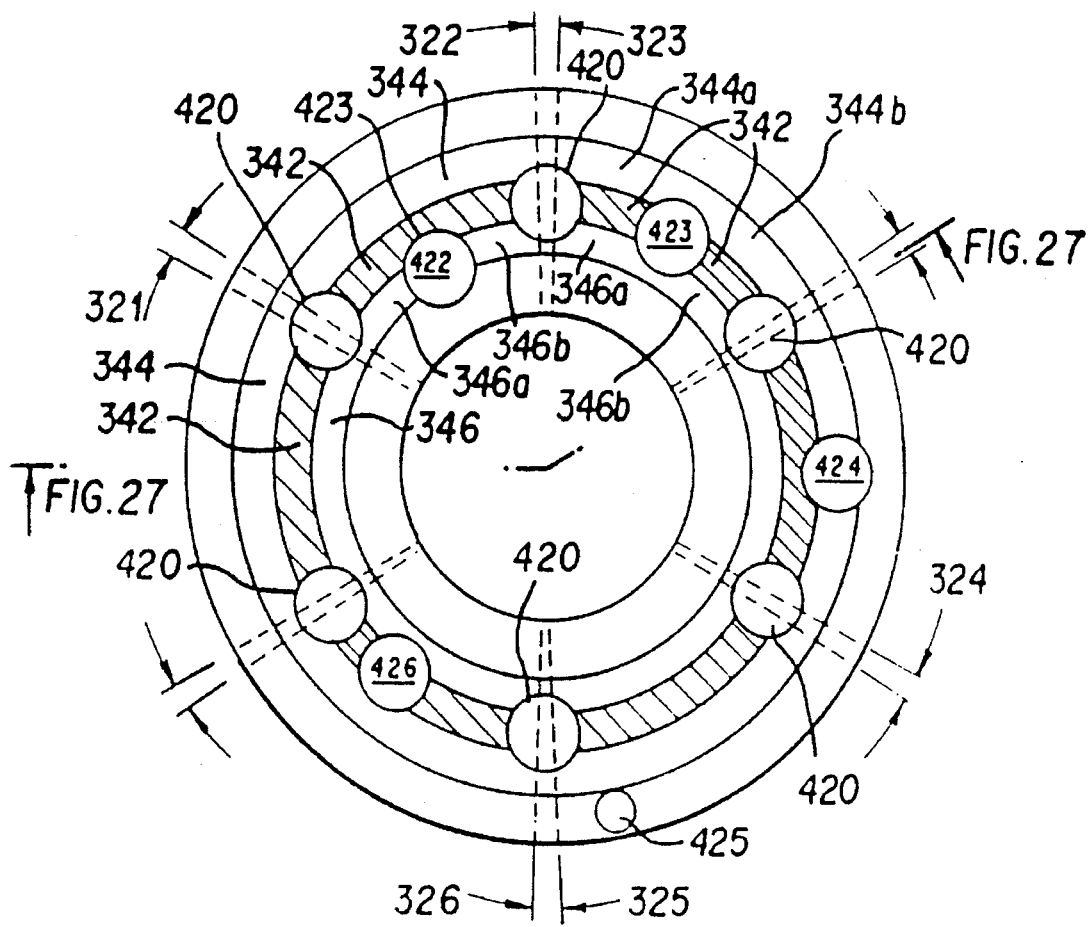
FIG. 28 is a top cross-section of the bearing construction of FIG. 27.

FIGS. 27–28 illustrate another embodiment of the bearing construction of the present invention.

As shown in the drawings, this bearing includes a plurality of bearing pads 321–326 (shown in phantom in FIG. 28). Each of the bearing pads 321–326 are supported on a pad support surface 342 of a bearing support structure. The bearing support structure includes a primary support portion composed of a pair of nested frustums supported on a secondary support portion that includes a split peripheral membrane 360 that is supported on a tertiary support portion that includes a pair of peripheral beams 382. The peripheral beams 380 and 382 are similar to those of the previously described constructions. The membrane 360 differs from the membrane in previously described constructions since the membrane 360 is radially split by the groove formed in the bottom of the bearing support structure which forms the nested frustums. The inner frustum is inverted with respect to the outer frustum such that the mean center lines of the frustums merge at a point 350 above the pad support surface 342 and have a cross-section that appears similar to an inverted V. Since the center lines of the frustums intersect at point 350 above the pad surface, the primary support structure supports the bearing pad for pivoting about a point above the pad surface. This ensures proper deflection.

The beams 346 and 344 that support the bearing pad can be angled toward one another at the same angle, angled toward one another at different angles, one beam angled and one beam not angled, and angled in the same direction. Of course, variations in the degree of angling of the beams in the primary support structure impacts the deflection characteristics of the bearing.

A plurality of holes or openings 420 that are disposed symmetrically about the bearing support structure divide the nested frustum or inverted v structure into a plurality of support beams 344,346 and divide the apex of the nested frustums so as to define the pad support surfaces 342. Thus, for example, the bearing pad 321 is supported on a pad support surface 342 by a pair of complex support beams 344 and 346 that are tapered toward one another and have a complex geometrical configuration defined by the cylindrical extending openings passing through the nested frustum section. As best shown in FIG. 27, the center lines of the beams 344 and 346 intersect at a point 350 above the pad surface to ensure proper pivoting support. The individual beams 344 and 346 are supported on a peripheral membrane 360 that is split by the groove that defines the frustums. The membrane is supported by peripheral beams 380, 382. Naturally, as discussed above, the peripheral beams 380, 382 and the peripheral membrane 360 can be circumferentially split to define individual beam supports.

Numerous modifications to the bearing support structure are possible. For example, deflection of the support structure can be modified by changing the angle of the beams, changing the location of the holes or openings that define the legs, varying the length of any of the beams or membranes, and changing the width or thickness of any of the beams or membranes. In order to illustrate a number of these possibilities, FIGS. 27 and 28 depict a different support structure for each of the bearing pads 321–326. It should be understood that these various support structures are shown in a single bearing for purposes of illustrating the present invention. In normal use, each of the bearing pads 321–326 would have a similar, though not necessarily identical, support structure to assure uniform performance.

The support structure for bearing pad 322 differs from that of bearing pad 321 by virtue of the provision of a hole or opening 422 that extends through the beam 346 so as to divide the beam 346 into a plurality of beams or sub-beams 346a and 346b. If, like the opening 422, the diameter and positioning of the opening is such that the beam is completely separated, the beam is divided into separate beams. On the other hand, if the opening only partially separates the beam (e.g. opening 423) the beam is divided into sub-beams.

As shown in FIG. 27, the opening 422 forms an elliptical opening in the side of the beam 346 such that as viewed in FIG. 27, radially outer beam 344 is visible. By virtue of this construction, the pad 322 is supported by three angled ligaments or beams, 344, 346a and 346b.

Bearing pad 223 is supported by four angled beams or ligaments 344a, 344b, 346a and 346b. This structure is achieved by providing a hole or opening 423 that extends through both beam 344 and beam 346 and divides the pad support surface 342 into two sections.

It should be noted that with respect to all of the modifications discussed herein, the size of the openings should be selected based upon the degree to which the beams 344 and 346 are to be divided into separate beams. In some instances it may be desirable to separate the beam sections completely, in which case a larger opening would be used. In other instances, such as that illustrated with respect to the support of bearing pad 323, it is desirable to subdivide the beam at some point along the sidewall of the beam. Although the drawings only show the provision of one opening for bearing pad support structure to divide the beams 344 and 346, it is possible that two or more openings similar to that of the openings 422–426 shown in FIG. 28 could be provided so as to divide the beams 344, 346 into three or more beams or sub-beams. As always, a determination of the type of support to be employed depends on the desired performance characteristics. Generally, dividing the beams into separate beams or sub-beams makes the support structure more flexible. By making the support structure more flexible in one direction as with the support structure for bearing pads 322, 324 and 326, the bearing pads are biased in a predetermined direction.

The support structure for bearing pad 324 is similar to that for bearing pad 322 except that the opening 424 extends through the outer support beam 344 rather than the inner support beam 346. Thus, like the bearing pad 322, the bearing pad 324 is supported by three angled legs.

The support structure for bearing pad 325 is similar to that for bearing pad 321 except that an opening 425 is provided through the outer peripheral beam 380 and peripheral membrane 360 in a nonsymmetrical position. Thus, the bearing pad 325 is biased in a predetermined direction, i.e., the direction of greatest flexibility caused by the provision of the opening 425.

The support structure for the bearing pad 326 is similar to that of bearing pad 322 except that the opening 426 which divides the beam 346 is provided in a nonsymmetrical fashion so as to bias a bearing pad 326 in the direction of greater flexibility, i.e., the direction of the smaller, more flexible beam.

Naturally, any combination of the support structures illustrated in FIGS. 27, 28 could be employed to achieve desired performance characteristics.

Figure 30:
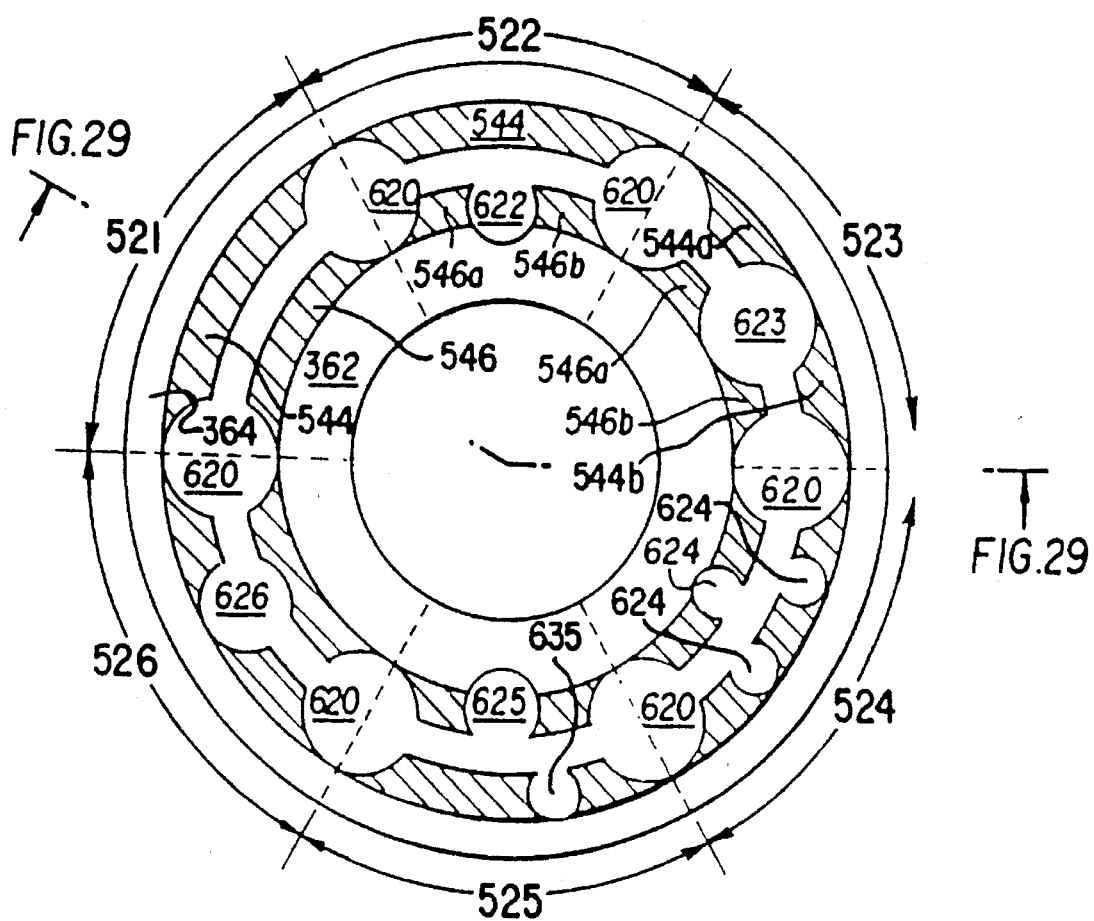
FIG. 30 is a top cross-section of the bearing construction of FIG. 29.

FIGS. 29–30 illustrate another embodiment of the bearing of the present invention. As shown in the drawings, this bearing includes a plurality of bearing pads 521–526 (location shown in phantom in FIG. 30). Each of the bearing pads 521–526 are unitary with, and supported on, a bearing pad support structure. Generally, the bearing pad support structure includes at least a primary support structure including an inner circumferential support beam 546 and an outer circumferential support beam 544; a secondary support portion including an inner peripheral membrane 362; and a tertiary support portion including an outer peripheral membrane 364 and an inner peripheral support beam 382 and an outer peripheral support beam 380. As best shown in FIG.

29, the circumferential support beams 544, 546 are defined in part by a deep circumferential channel extending from the bottom of the bearing to the bearing pad. The support beams are further defined by a plurality of holes or openings 620 disposed symmetrically about the bearing pad support structure that separate the beams 544, 546 from adjacent beams. Thus, for example, the bearing pad 521 is supported on a pair of beams 544 and 546, which beams have generally accurate side walls. As mentioned earlier, the beam support structure also includes membranes 364, 362 and peripheral beams 380, 382.

Numerous modifications to the bearing support structure are possible. In order to illustrate a number of these possibilities, FIGS. 29 and 30 depict a different support structure for each of the bearing pads 521–526. As with the previously described embodiment of FIGS. 27–28, these various support structures are shown in a single bearing for the purpose of illustrating the present invention. In normal use, each of bearing pads 521–526 would have a similar, though not necessarily identical, support structure to assure uniform performance.

The support structure for bearing pad 522 differs from that of bearing pad 521 by virtue of the provision of a hole or opening 622 that extends through the inner circumferential beam 546 so as to divide the beam 546 into a plurality of beams 546a and 546b. By virtue of this construction, the pad 522 is supported by three vertically extending beams or ligaments 544, 546a and 546b.

The bearing pad 523 is supported by four vertically extending beams or ligaments 544a, 544b, 546a and 546b. This structure is achieved by providing a hole or opening 623 that extends through both beam 544 and beam 546. The thinner beams which result from this modification would naturally have greater flexibility than the support structure for bearing pads 522 and 521.

The bearing pad 524 is supported by five, relatively thin vertically extending beams or ligaments. This structure is achieved by providing a hole or opening 624 to divide the inner beam 546 into two beams and providing two holes 624 to divide the outer beam 544 into three beams.

The support structure for bearing pad 525 is similar to that for bearing pad 522 except that an additional opening 635 non-symmetrically divides the outer beam 544 into two beams. By virtue of the non-symmetrical division of the outer beam 544, the bearing pad is biased in the direction of greater flexibility.

The support structure for bearing pad 526 is similar to that for bearing pad 522 except that the outer beam 544 is split rather than the inner beam 546. Further, the opening 626 is somewhat larger than the opening 622 such that a groove is formed on the outer periphery of the inner beam 546 so as to make the inner beam 546 somewhat more flexible.

Naturally, any combination of the support structures illustrated in FIGS. 29, 30 could be employed to achieve desired performance characteristics.

FIGS. 29A, 29B, 30A and 30B illustrate in detail a thrust bearing in which each of the bearing pads 521A of the support structure are very similar to that used to support bearing pad 521 in FIGS. 29 and 30. The bearing construction is different, however, insofar as the beams 544A and 546A are circumferentially narrower and vertically shorter than their counterparts in the bearing illustrated in FIGS. 29 and 30. Naturally, shorter beams are more rigid than the comparatively longer beams and narrow beams are less rigid than comparatively wider beams. Moreover, the beam 544A is radially narrower than the beam 546A; whereas in the bearing illustrated in FIGS. 29 and 30, the beams 544 and 546 have equal widths. The difference in radial thickness is compensated for since the large opening 620, which defines the circumferential extent of the beams 544A and 546A, is arranged such that beam 544A is significantly wider in the circumferential direction than is beam 546A. Finally, it should be noted that the openings 620 are significantly larger than the corresponding openings 620 in the bearing construction of FIGS. 29 and 30. Naturally, the larger openings increase the flexibility of the support structure defined thereby.

Figure 35:
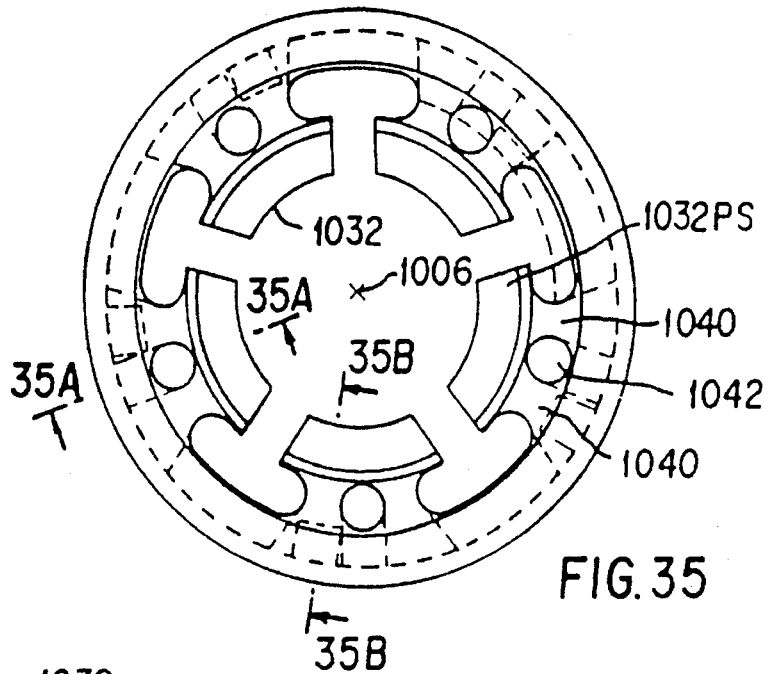
FIG. 35 is a side view of a combined radial and thrust bearing according to the present invention.
Figure 35A:
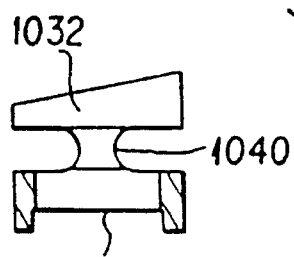
FIG. 35A is a cross-section of the bearing of FIG. 35.
Figure 35B:
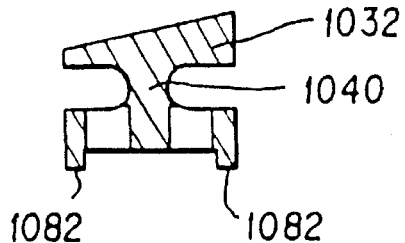
FIG. 35B is another cross-section of the bearing of FIG. 35.
Figure 36:
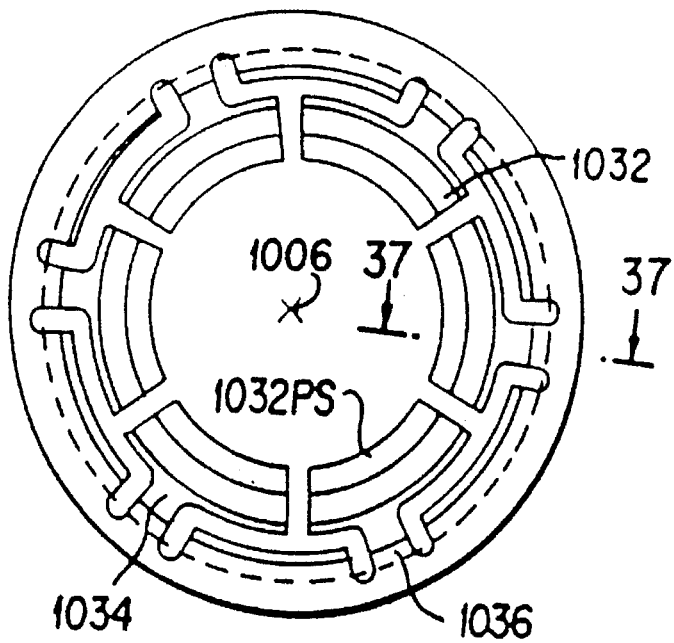
FIG. 36 is a side view of another combined radial and thrust bearing according to the present invention.
Figure 37:
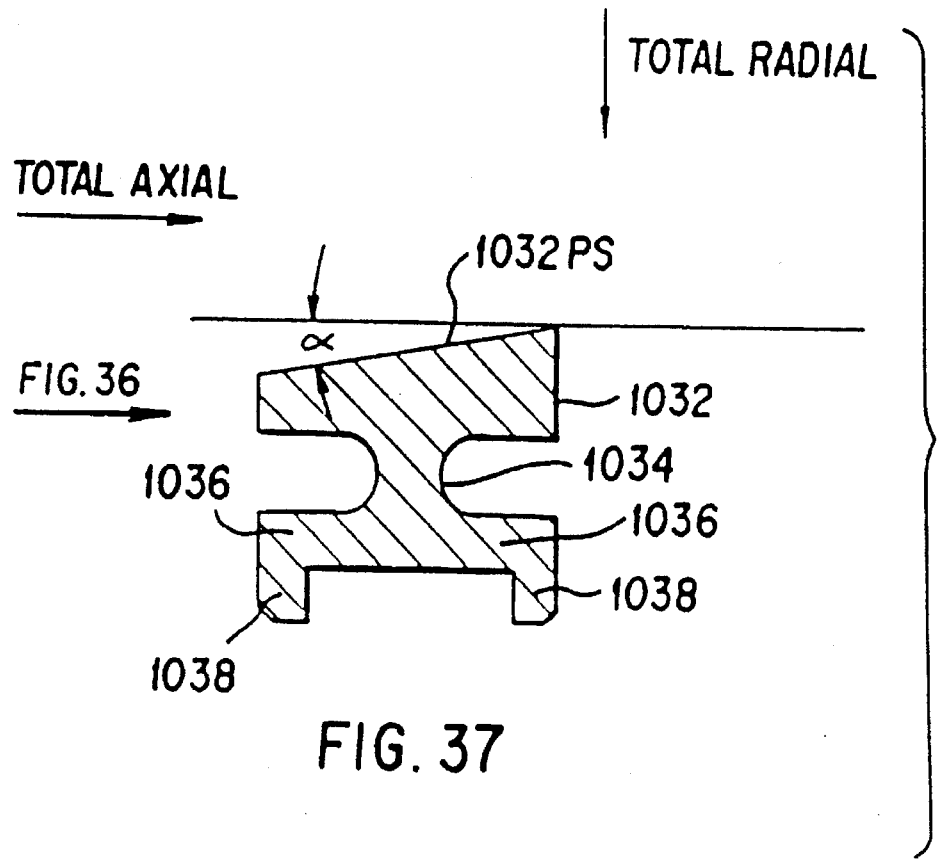
FIG. 37 is a diagrammatic cross-section of the bearing of FIG. 36 illustrating the forces acting on the bearing pad.

FIGS. 35–37 illustrates a combined thrust and radial hydrodynamic bearing in accordance with the present invention. The bearing illustrated in FIG. 35 is quite similar to the bearing illustrated in FIG. 34 and similar numerals are used to designate similar structure. Similarly, as viewed in the cross-section in FIG. 37, the bearing of FIGS. 36–37 is somewhat similar to the radial bearings illustrated in FIGS. 4 and 14D except that the bearing pad 1032 and the bearing pad support structure, which includes beams and/or membranes 1034, 1036 and 1038, are defined by proportionately larger slits and grooves. However, the radial-thrust bearings differ from radial-only bearings in that the bearing pad surface 1032ps is angled with respect to the major axis 1006. By virtue of its angled pad surface, the bearings of FIGS. 35–37 support loads acting both along the major axis 1006 and radially from the axis 1006.

In order to be supported by the angled pad support face 1032ps, the shaft must be fitted with a runner that is angled at an angle complementary to the angle of the pad support face. The portion of the axial load taken by the bearing and the portion of the radial load taken by the bearing depends on the angle of the pad surface 1032ps. If the pad is angled at an angle with respect to the major axis 1006, the axial load applied to the bearing can determined by the following equation:

$$\text{Applied Axial Load} = \text{Total Axial Load (Sin X)}.$$

Similarly, the radial load applied to the bearing can be determined by the following equation:

$$\text{Applied Radial Load} = \text{Total Radial Load (Cos X)}.$$

The support structure for the bearing shown in FIG. 35 is similar to the support structure for the bearing shown in FIG. 34.

The support structure for the bearing illustrated in FIGS. 36 and 37 includes a primary support structure for the spaced bearing pads 1032 having a beam 1034 that supports the bearing pad 1032, a tertiary support structure that comprises a pair of circumferential beams 1038, which may be continuous. The secondary support structure comprises a membrane 1036 or a network of beams 1036 for connecting beam 1034 to the beams 1038. As shown most clearly in FIG. 36, the support structure for each of the plurality of bearing pads 1032 is nonsymmetrical. Accordingly, the bearing illustrated in FIGS. 36 and 37 is unidirectional.

Generally, any of the general bearing constructions described in this application can be employed in the design of combined radial-thrust bearings of the type illustrated in FIGS. 36 and 37. Of course in order to achieve the combined radial and thrust bearing characteristic, the bearing pad surface must be angled at an angle between 0 and 90 degrees with respect to the major axis. Moreover, the need to accommodate both radial and axial loads necessarily will impact the design of the bearing pad support structure.

In the past, the pad shape of hydrodynamic bearings has been primarily dictated by manufacturing convenience. For a thrust bearing, this has traditionally meant sector shaped pads to maximize the area of support or—in the case of applicant's prior U.S. Pat. No. 4,676,668—circular pads for low cost manufacture. For radial bearings, pads having a simple cylindrical section shape have been used. In many cases, such conventional pad shapes can be supported to obtain optimum results. However, the present inventor has discovered that important performance characteristics can be achieved by modifying conventional pad shapes. Consequently, the support structure can be simplified, and sometimes, even eliminated.

Figure 42A:
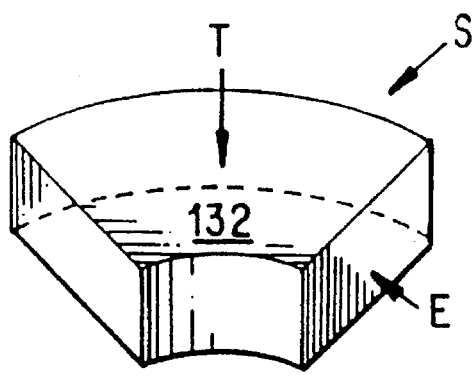
FIG. 42A is a perspective view of a sector shaped thrust pad with arrows indicating the side lines for the top side and edge views.
Figure 42B:
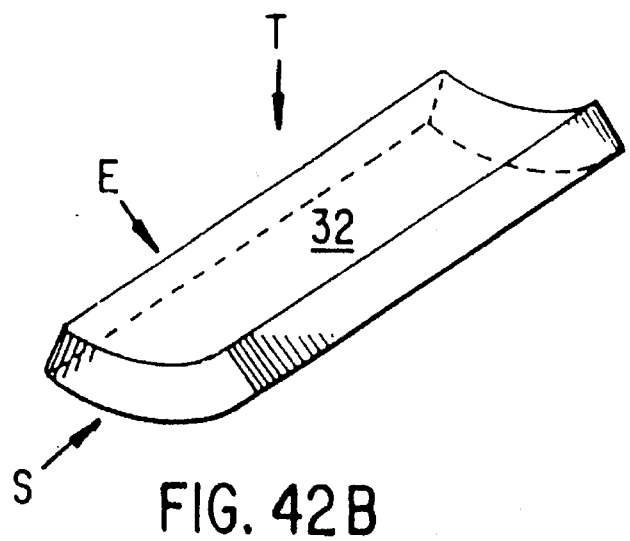
FIG. 42B is a perspective view of a journal bearing pad with arrows indicating the side lines for a top edge and side view.
Figure 42C:
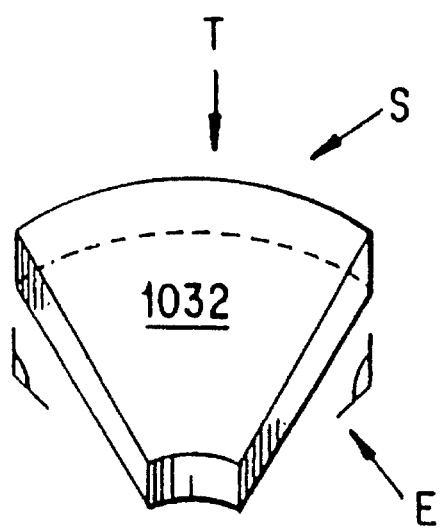
FIG. 42C is a perspective view of a combined radial/thrust bearing pad with arrows indicating the side lines for a top, side and edge view.
Figure 42D:
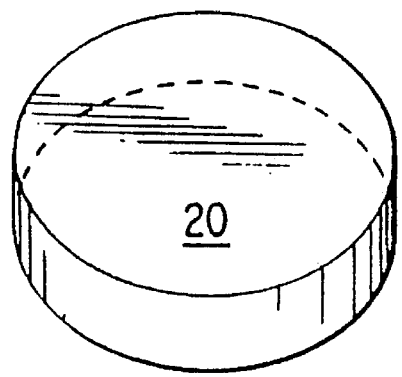
FIG. 42D is a perspective view of a circular thrust pad.

Examples of typical thrust pad shapes are illustrated in FIGS. 42A and 42D. FIG. 42A shows a sector shaped pad 132. The sight lines for a top view T, an edge view E and a side view S are indicated by arrows labeled T, E and S, respectively. FIG. 42D shows a circular pad 20. An example of a typical radial bearing pad is shown in FIG. 42B. Again, the arrows indicate the sight lines for the top view T, edge view E and side view S, as discussed below. Finally, one form of combined radial/thrust pad 1032 is shown in FIG. 42C. The arrows indicate the sight lines for the top view T, edge view E and side view S discussed below. These pad shapes are all characterized by uninterrupted planar surfaces and a uniform pad thickness.

Various modifications to traditional thrust, radial and combined radial/thrust pad shapes will be discussed hereinafter. It should be kept in mind that any of these modifications to the shape of the pad may be used in combination or alone. Also, the modifications can be easily adapted to pads having shapes other than the specific pad shapes illustrated. Moreover, the pads may be symmetrically shaped to allow bidirectional operation or non-symmetrical to provide different operating conditions depending on the direction of rotation. The modified pad shapes discussed hereinafter may be used in combination with any support structures including those described in this application where appropriate or, when used in the proper combination, may eliminate the need for a deflecting support structure altogether.

Figure 43A:
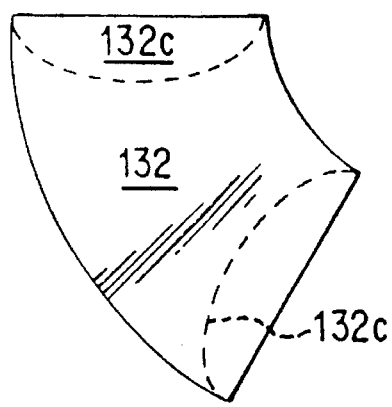
FIG. 43A is a top view of a thrust pad provided with radius cuts on both edges.
Figure 43B:
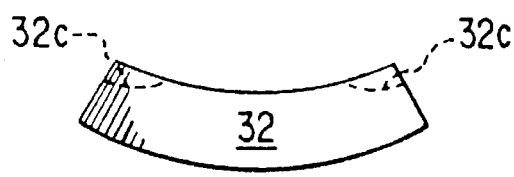
FIG. 43B is a side view of a journal bearing pad with radius cuts formed on both edges.
Figure 43C:
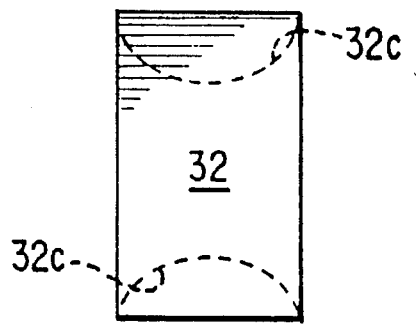
FIG. 43C is a top view of the journal bearing pad of FIG. 43B.
Figure 43D:
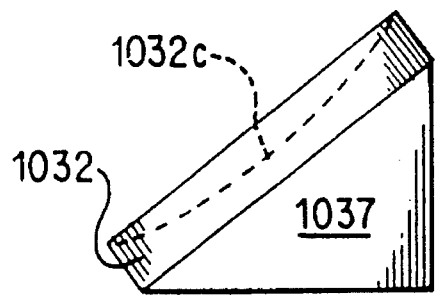
FIG. 43D is an edge view of a combined radial/thrust bearing pad having radius cuts formed on both edges thereof.
Figure 43E:
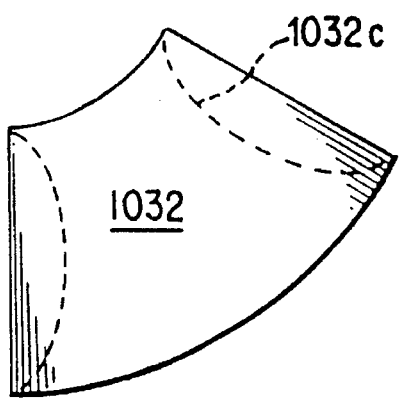
FIG. 43E is a top view of the combined radial/thrust bearing pad of FIG. 43D.

The first possible modification to the general pad shape is shown in FIGS. 43A–E. These figures illustrate the modification as applied to thrust bearing (FIG. 43A), a radial bearing (FIGS. 43B–C) and a combined radial/thrust bearing (FIGS. 43D and 43E).

This modification is based on finite element analysis that has shown that, in some instances, increasing the length of the edge where the lubricant enters (the leading edge) can improve bearing performance. Specifically, lengthening this edge allows more lubricant to be directed toward the pad center. To achieve this effect a radius cut may be formed on the pad surface to lengthen the leading edge. The cut may be formed either entirely through the pad or partially through the pad surface to provide a recess in the pad surface. Such a radius cut may be provided in a thrust bearing, a radial bearing or a combined radial/thrust bearing. It should be kept in mind that the provision of such a radius cut decreases the load bearing surface of the pad. Thus, there is a trade off; more lubricant but less load bearing surface.

FIG. 43A shows a top view of a thrust bearing pad 132 in which a radius cut 132C is formed as shown. In the illustrated embodiment, the cut 132C is provided on each edge of the pad 132. This is because the illustrated pad is intended for bidirectional use and the improved result is desired in both directions. If unidirectional operation is sufficient, the cut should only be provided on one edge.

FIGS. 43B and 43C show side and top views respectively of a radial bearing pad 32 formed with radius cuts 32C at each edge. Again, the provision of the radius cuts 32C increases the amount of lubricant entering the pad center at the same time reducing the load bearing surface area of the pad. The radial bearing shown in FIGS. IIB & C is also a bidirectional pads since it is symmetrical with radius cuts 32C formed in each edge.

FIGS. 43D and 43E show a combined radial/thrust bearing pad 1032 supported on an angled support structure 1037 schematically illustrated as a conically tapered block. FIG. 43D is an edge view and FIG. 43E is a top view. Again, the pad is symmetrical and a radius cut 1032C is provided on each edge of the thrust bearing pad to allow bidirectional operation.

Figure 44A:
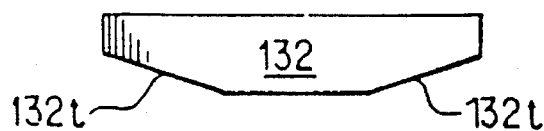
FIG. 44A is a side view of a thrust pad with tapered edges.
Figure 44B:
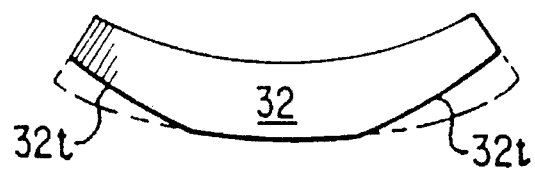
FIG. 44B is a side view of a journal bearing pad with tapered edges.
Figure 44C:
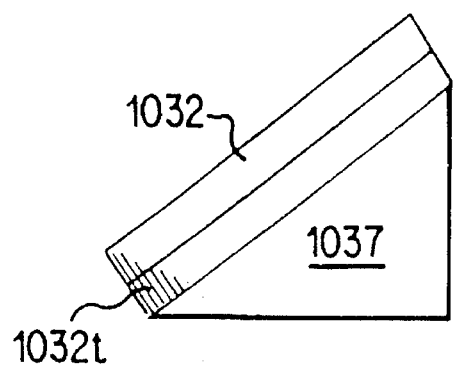
FIG. 44C is a side view of a combined radial/thrust bearing pad with tapered side edges.
Figure 44D:
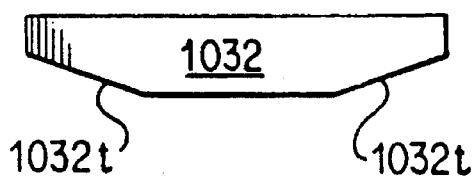
FIG. 44D is a side view of the combined radial/thrust bearing pad of FIG. 44C.

FIGS. 44A–D illustrate another possible modification to the basic pad shape. Specifically, it has been learned that tapering the leading edge of the bearing pad results in increased inlet bending. This allows more lubricant to enter the shaft-pad space that increases the load carrying capability of the pad. Complex finite element analysis using computers can predict the amount of bending needed to obtain optimum lubricant flow. The drawings illustrate the use of tapered edges in thrust, radial, and combined radial/thrust bearings. Specifically, FIG. 44A is a side view along the S axis in FIG. 42A illustrating a thrust bearing pad 132 with a taper 132$t$ formed at each edge. Again, the taper is provided at each end to allow for bidirectional operation. FIG. 44B shows a side view of a radial bearing pad 32 with a taper 32$t$ formed at each edge thereof to allow bidirectional operation. Finally, FIGS. 44C and 44D illustrate edge and side views of a combined radial/thrust bearing pad 1032 with tapers provided on each edge to increase inlet bending. Of course, if unidirectional operation is sufficient, only one edge, the leading edge, should be tapered.

The basic pad shape may also be modified by providing rails on the side edges of the pads such that, under load, the pad deflects to form a channel that retains lubricant on the pad face and minimizes end or side leakage.

Figure 45B:
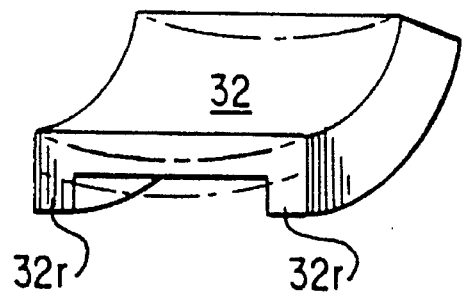
FIG. 45B is an edge perspective view of a journal or radial bearing pad provided with side edge rails on its axial edges.
Figure 45A:
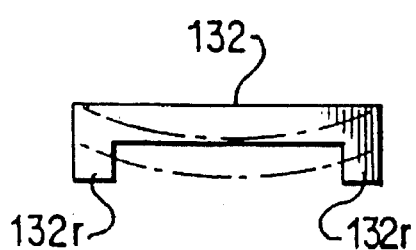
FIG. 45A is an edge view of a thrust pad provided with side edge rails.
Figure 45C:
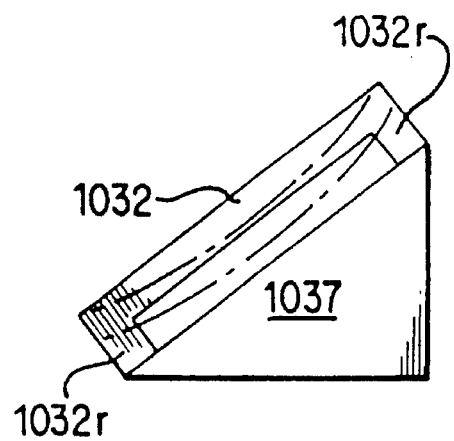
FIG. 45C is an edge view of a combined radial/thrust bearing pad provided with side edge rails.

Examples of pad shapes so modified are shown in FIGS. 45A–C. FIG. 45A shows an edge view of a thrust bearing pad 132 provided with side edge rails 132$r$ on the radially inner and outer edges. The deflection of this pad under load (greatly exaggerated) is indicated in phantom. As can be seen, the pad deflects under load to form a lubricant retaining channel.

FIG. 45B shows a radial or journal bearing pad 32 provided with side edge rails 32$r$ on its axial edges. The deflection of the pad under load, again greatly exaggerated, is illustrated in phantom. As is apparent from this exaggerated example, the pad deforms under load to form a lubricant retaining channel to prevent leakage of lubricant along the axial ends of the bearings.

FIG. 45C shows a combined radial/thrust bearing pad 1032 formed with rails 1032$r$ on its inner and outer edges. The deflection of the pad under load (greatly exaggerated) is indicated in phantom. As is apparent from this exaggerated view, the pad deforms under load to form a lubricant retaining pocket so that lubricant does not escape from the radially inner and outer edges of the pad 1032.

Figure 46A:
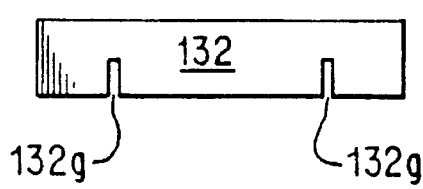
FIG. 46A is a side view of a thrust bearing pad having grooves formed in the bottom proximate the side edges.
Figure 46B:
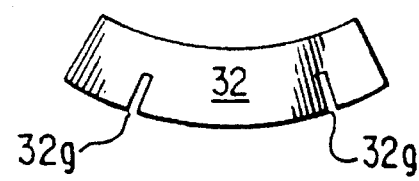
FIG. 46B is a side view of a radial or journal bearing pad having grooves formed in the bottom proximate the sides.
Figure 46C:
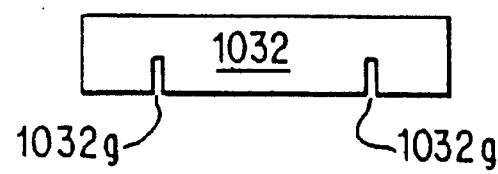
FIG. 46C is a side view of a combined radial/thrust bearing pad having grooves formed in the bottom proximate the side edges.

As mentioned before with reference to FIGS. 44A–44D, it is sometimes desirable to increase the inlet bending of the leading edge of a bearing pad. Another modified bearing pad shape for achieving or enhancing this desired result is shown in FIGS. 46A–46C. Specifically, these drawings show that in addition to or instead of tapering the leading edge, a groove may be formed on the lower edge of the lower side of the pad proximate the leading edge to cause increased leading edge bending while maintaining a flatter surface. FIG. 46A shows a thrust pad 132 with grooves 132g formed in the bottom near both edges to allow bidirectional operation. FIG. 46B shows a radial bearing pad 32 with grooves 32g formed on the outer surface proximate each side edge. FIG. 46C shows a combined radial/thrust bearing pad 1032 with grooves 1032g formed in the bottom surface thereof near each edge.

Figure 47A:
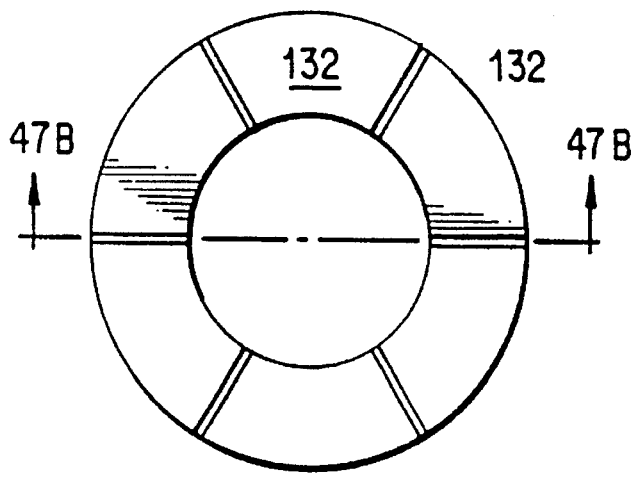
FIG. 47A is a top view of a thrust bearing in which the individual pads are defined by pad defining grooves.
Figure 47C:
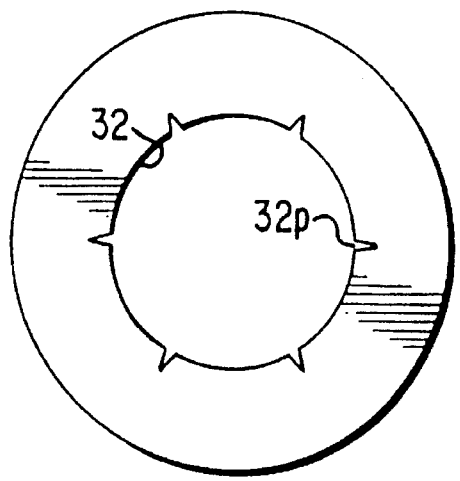
FIG. 47C is a side view of a radial or journal bearing in which the individual pads are defined by pad defining grooves.
Figure 47B:
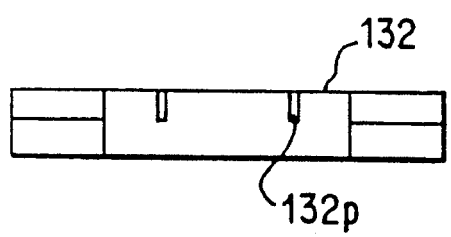
FIG. 47B is a sectional view of the thrust bearing of FIG. 47A along the lines indicated in FIG. 47A.

Another consideration in the design of hydrodynamic pads is that the pads themselves may be formed from a single member by simply providing grooves to define individual pads. Examples of this are shown in FIGS. 47A–47C. FIGS. 47A–47B show how a continuous surface can be divided into individual thrust pads 132 through the provision of pad defining grooves 132p. In this case, FIG. 47A is a top view and FIG. 47B is a side view along the lines indicated in FIG. 47A. For a combined radial/thrust bearing the construction is essentially the same as that shown in FIG. 47A. FIG. 47C illustrates how a cylindrical body may be divided into individual journal pads 32 through the provision of pad defining grooves 32p on the radially inner surface thereof.

Figure 48A:
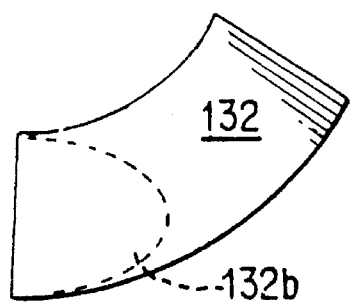
FIG. 48A shows a top view of a thrust bearing pad formed with a bottom recess indicated in phantom.
Figure 48B:
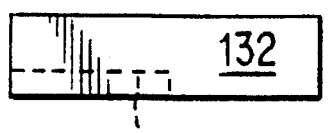
FIG. 48B shows a side view of the thrust bearing pad of FIG. 48A.

A final consideration in the design of specific pad shapes is the provision of bottom recesses on the pads. Specifically, the provision of bottom recesses can cause channeling in a manner somewhat like that shown in FIGS. 45A–45C and allow inlet bending in a way such as the tapered structure shown in FIGS. 44A–44D. Examples of bottom recesses formed in pads designed for unidirectional operation are shown in FIGS. 48A–48D. FIGS. 48A–48B show top and side views of a thrust bearing pad 132 formed with a bottom recess 132b to cause channeling. The reduced pad area also enables compressive deflections onto the bottom surface, which develop a converging wedge. Since this modification is provided on only one edge of the pad 132, the pad is intended for use in a unidirectional bearing. The pad construction shown in FIGS. 48A and 48B is essentially the same as would be used for a combined radial/thrust bearing. The only difference is that the pad would be formed of a conical section.

Figure 48C:
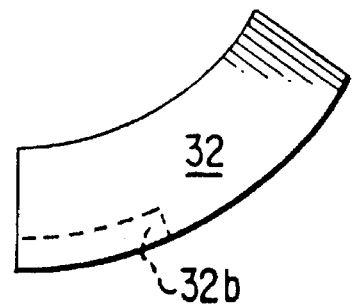
FIG. 48C shows a side view of a radial bearing pad formed with a bottom recess indicated in phantom.

FIG. 48C shows a radial bearing pad 32 provided with a bottom recess 32b on one edge thereof. Again, this is a unidirectional bearing.

Figure 49A:
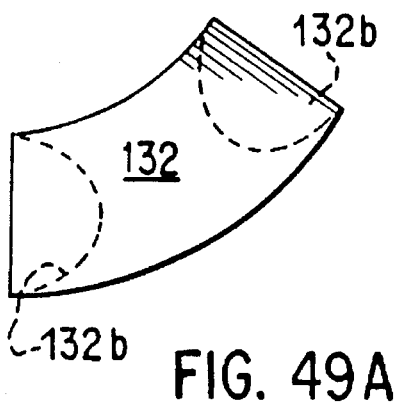
FIG. 49A is a top view of a thrust bearing pad formed with a bottom recess on each edge indicated in phantom.
Figure 49B:
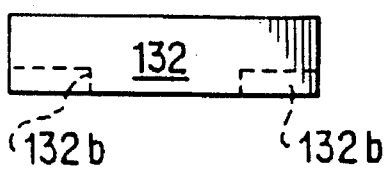
FIG. 49B is a side view of the thrust bearing pad of FIG. 49A with the bottom recesses indicated in phantom.
Figure 49C:
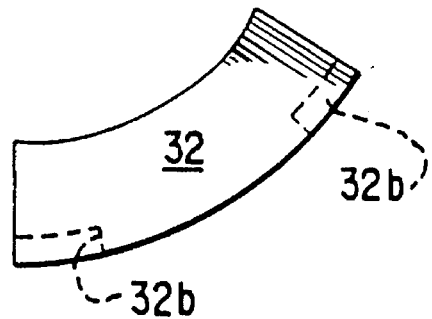
FIG. 49C is a side view of a radial or journal bearing pad with bottom recesses formed proximate each edge as indicated in phantom.

FIGS. 49A–49C illustrate bearing pad configurations similar to those shown in FIGS. 48A–48C except that the bottom recesses 132b are provided at both edges of the bearing pad so as to permit bidirectional operation. Specifically, the thrust or combined radial and thrust bearing pad 132 shown in FIGS. 48A and 49B includes bottom recesses 132b at each edge thereof. As is apparent by comparing FIGS. 49A–49B with FIGS. 48A–48B, the bottom recesses are somewhat smaller to accommodate the provision of such recesses at each edge.

Similarly, in FIG. 49C the radial bearing pad 32 includes bottom recesses 32b at each edge thereof. Again, the recesses are somewhat shorter than the recesses provided in the unidirectional bearing shown in FIGS. 48C.

As mentioned before, the design of a pad shape for any particular application depends on the requirements of that application. The foregoing structural modifications and considerations can be used alone or in combination. FIGS. 50A–50C and 51A–51C show how all these features can be combined in a single bearing. This is not to suggest that all these features should necessarily be included in every design. Indeed, this would rarely be required. However, it is possible to combine all these features in a single bearing, if desired.

Figure 50A:
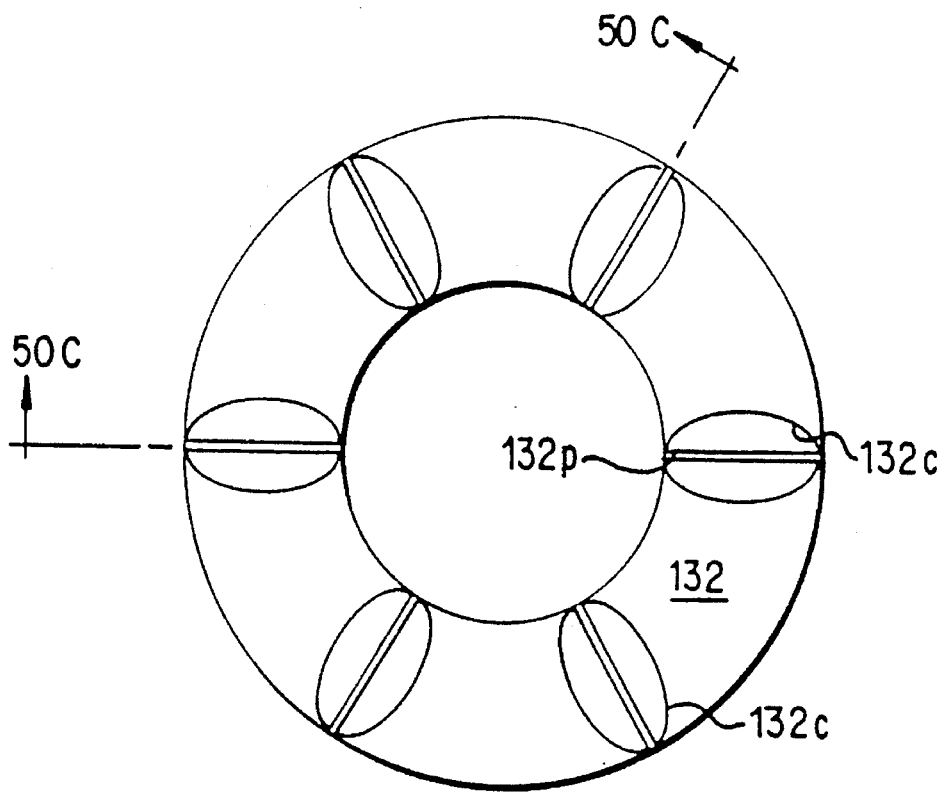
FIG. 50A is a top view of a thrust or combined radial/thrust bearing.

FIG. 50A shows a top view of a thrust bearing or combined radial/thrust bearing in which the bearing pads 132 are provided with radius cuts 132C to increase the length of the leading edge. The radius cuts 132C are provided on each edge so as to permit bidirectional operation. Of course, if desired, the radius cuts 132C can be provided on only one edge to provide optimum results for unidirectional operation. In FIG. 50A, the individual pads 132 are defined by pad defining grooves 132p.

Figure 50B:
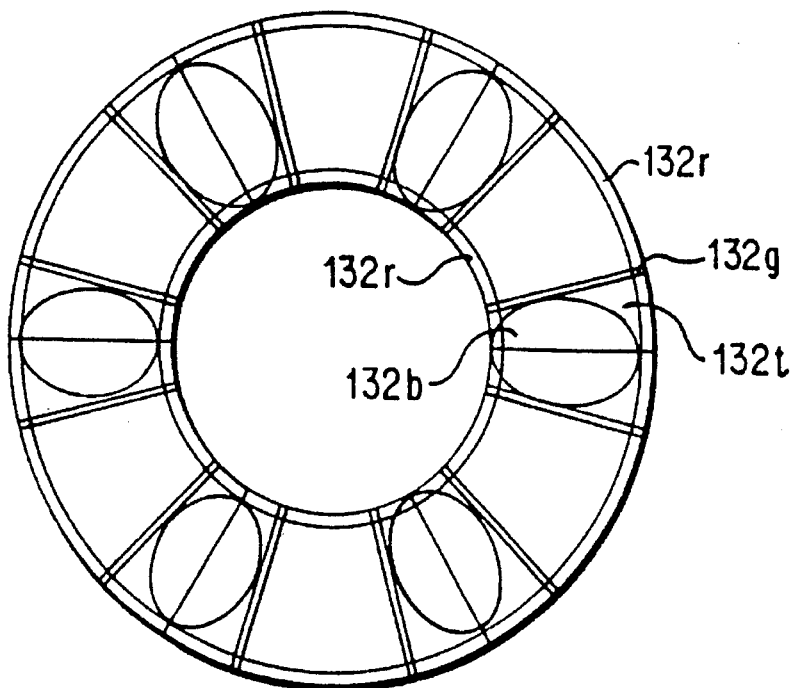
FIG. 50B is a bottom view of the thrust bearing or combined radial/thrust bearing of FIG. 50A.
Figure 50:
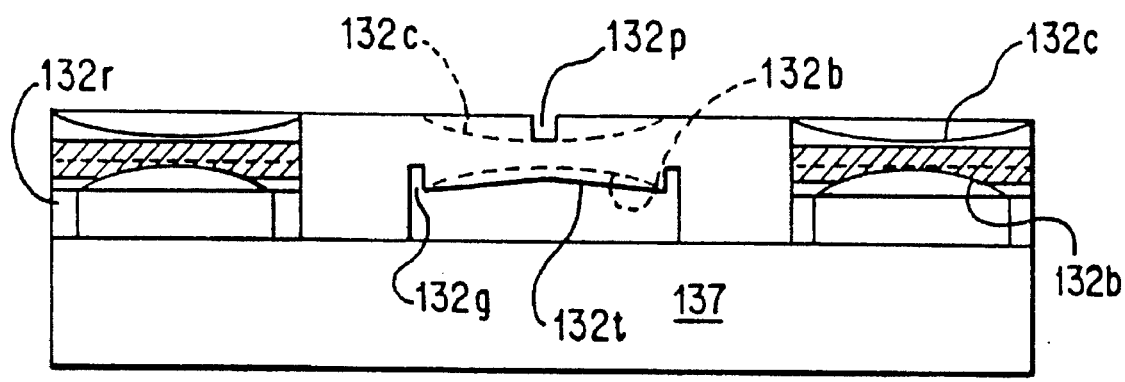
FIG. 50C is a cross-section through the lines indicated in FIG. 50A.

FIG. 50B shows a bottom view of the thrust bearing of FIG. 50A. In this view, it can be seen that the bearing includes bottom rails 132r, grooves 132g to increase inlet bending, a taper 132t to further increase inlet bending and a bottom recess 132r to further channel liquid and increase inlet bending. In this case, the grooves, taper, and recesses collectively provide the desired deflection.

FIG. 50C is a cross-section of the bearing of FIG. 50A along the lines indicated in FIG. 50A. FIG. 50C also shows the bearing mounted on a support structure 137. The support structure is shown schematically as a box to indicate that, in accordance with the present invention, any of the support structures disclosed herein can be used. As noted above, it is possible through proper pad design to obviate the need for a deflecting support structure. In such a case, the support structure could be rigid, e.g., the housing. Alternatively, however, the support structure can be a deflecting support structure of any of the types disclosed herein having primary, secondary and tertiary support portions for supporting the bearing pads for movement with six degrees of freedom. Similarly, the pad modifications discussed herein are generally applicable individually or in combination to the bearing pads of any of the bearings disclosed herein.

Figure 51A:
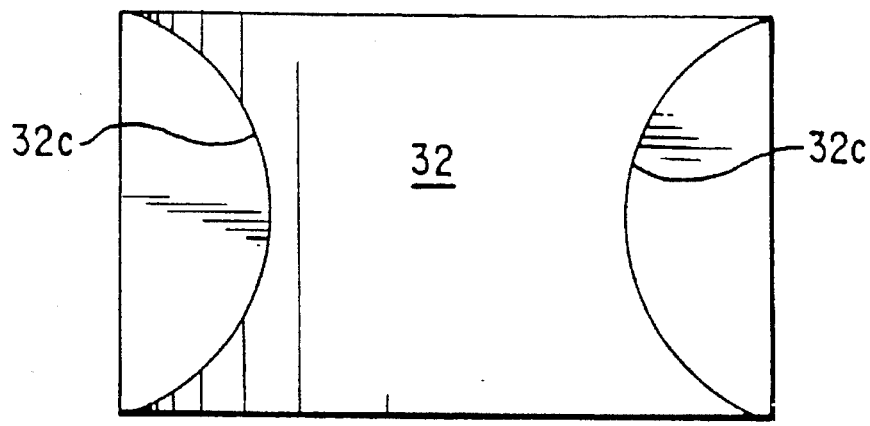
FIG. 51A is a top view of a bearing pad for a radial bearing.

FIG. 51A shows a top view of a journal or radial bearing pad 32 having a radius cut 32C formed in each edge thereof to increase the length of the leading edge. This increases the amount of lubricant passing on to the bearing pad surface.

Figure 51B:
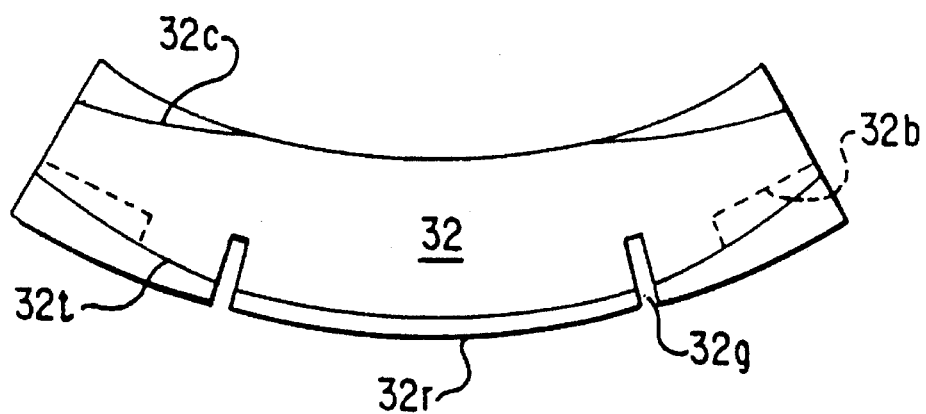
FIG. 51B is a side view of the bearing pad of FIG. 51A.

FIG. 51B shows a side view of the bearing pad 32 of FIG. 51A. From this view, it is possible to see the radius cut 32C formed on the top surface of the pad, the taper 32t formed at the bottom edges of the pad, the bottom recess 32b formed on the bottom side of the pad, the grooves 32g formed on the bottom side of the pad and the rails 32r extending radially outward from the bottom surface of the pad.

Figure 51C:
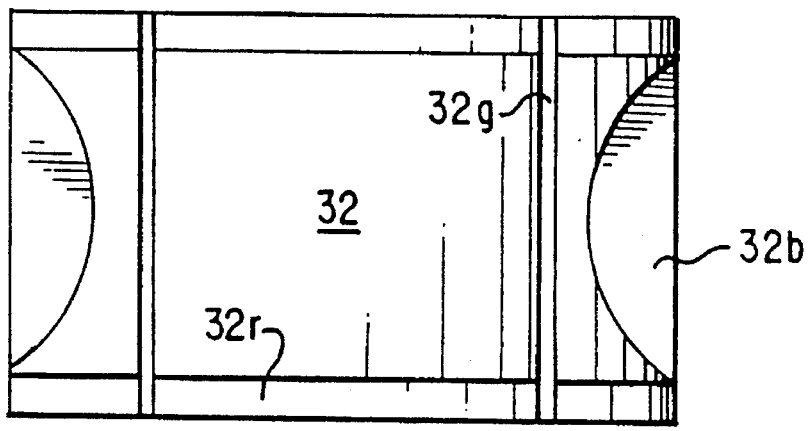
FIG. 51C is a bottom view of the bearing pad of FIG. 51A.

FIG. 51C shows the bottom view of the bearing pad of FIGS. 51A & 51B in which the bottom rails 32r, the grooves 32g and the bottom recess 32p are apparent.

If desired, a bearing having pads of the type illustrated in FIGS. 51A–51C could be formed from a single piece with the pads separated from one another by pad defining grooves as shown in FIG. 47C.

Figure 52A:
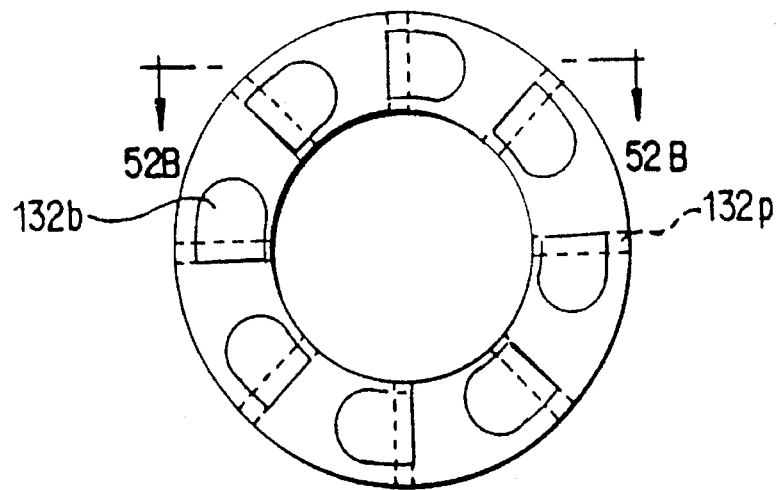
FIG. 52A is a bottom view of a thrust bearing according to the present invention.
Figure 52B:
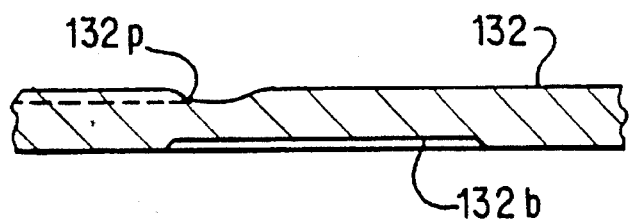
FIG. 52B is a partial sectional view of the thrust bearing of FIG. 52A along the lines indicated in FIG. 52A.
Figure 52C:
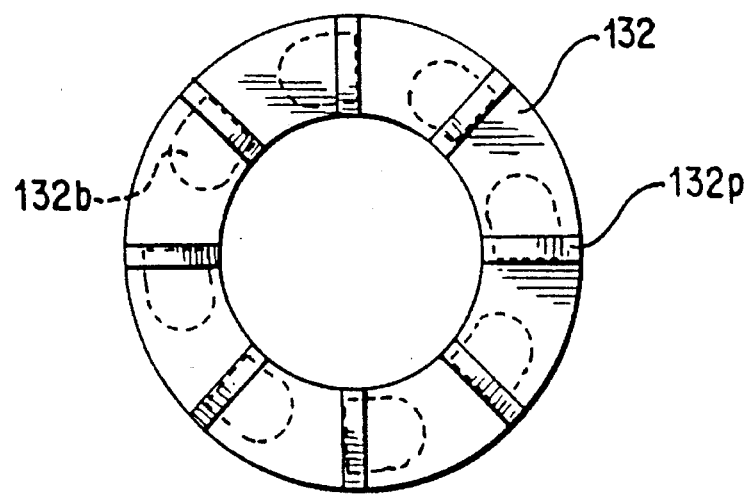
FIG. 52C is a top view of the thrust bearing of FIG. 52A.

Another complete bearing design is depicted in FIGS. 52A–52C. These drawings depict a washer-like thrust bearing in which the desired pad shape is obtained in an extremely thin washer-like cylindrical element. FIG. 52A is a bottom view of the washer-like bearing showing circumferentially spaced bottom recesses 132b and grooves 132p (in phantom) which define a plurality of circumferentially spaced thrust pads 132. The cross-section of the grooves 132p and bottom recesses 132b is best illustrated in the cross-sectional view of FIG. 52B. As shown in this figure, the grooves 132p and 132b are very shallow. Finally, FIG. 52C shows a top view of the washer-like thrust bearing in which the circumferentially spaced pad defining grooves 132p are depicted and the bottom recesses 132b are shown in phantom.

As previously discussed, the pad defining grooves 132p define a circumferentially spaced series of bearing pads 132.

The bottom recesses 132b undercut the pad surface to a sufficient extent that the portion of the thrust pad surface that is undercut can deflect slightly downward so as to form a conveying wedge and a lubricant retaining channel. Collectively, these deflections result in the formation of a series of converging wedges so that the shaft runner is supported on a layer of pressurized fluid film. Further, because of the nature of the bottom recesses 132b the lubricant is retained on the pad surface and does not escape from the radially inner and outer edges of the pad. Finite element analysis has shown that, under sufficient load, this simple washer will deflect so as to operate as a multiple pad hydrodynamic bearing even without a deflecting support structure. Thus, a simple washer-type bearing pad configuration of the type shown in FIGS. 52A–52C can be mounted on a rigid support structure with satisfactory results. Of course, a deflecting support structure could be used, if desired.

Figure 54:
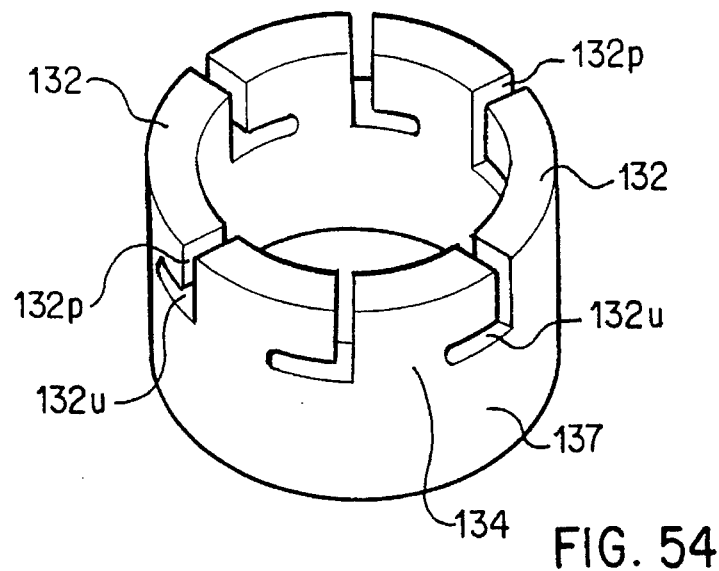
FIG. 54 is a perspective view of another thrust bearing according to the present invention.
Figure 54A:
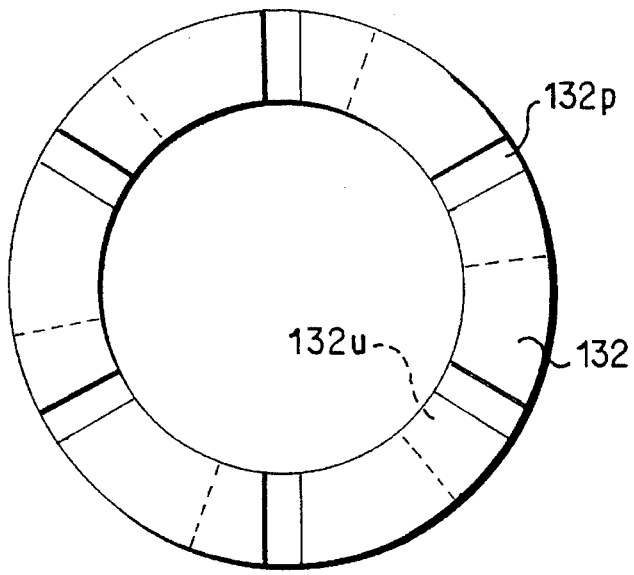
FIG. 54A is a top view of the thrust bearing of FIG. 54.
Figure 54B:
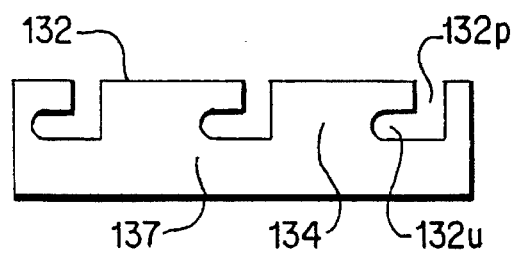
FIG. 54B is a side view of the thrust bearing of FIG. 54.

FIGS. 54, 54A and 54B illustrate another thrust bearing according to the present invention. The bearing shown in these figures is a relatively simple bearing formed from a pipe or tube like cylindrical piece of material by providing circumferentially spaced axially extending pad defining grooves 132p on one end of the cylindrical member and extending these grooves with circumferentially extending undercut grooves 132u so as to define a circumferentially spaced series of pads 132 each of which is supported on a base portion 137 by a relatively rigid support post 134.

As is readily apparent from FIGS. 54 and 54B, the pads 132 each have two circumferential edges one of which is undercut by the undercut groove 132u and the other of which is substantially rigidly supported by the support post 134. By virtue of this construction, the edge of the pad 132 that is undercut is less rigidly supported than the other edge of the pad. Thus, under loading, the undercut edge of the pad 132 is free to deflect downward whereas deflection of the other edge of the pad 132 is inhibited by the support post 134. Consequently, the pads 132 can deflect downwardly at one end to permit formation of a hydrodynamic wedge.

Since the bearing illustrated in FIGS. 54–54B is relatively rigid, it is to be expected that there may be some pad to shaft contact at start-up. To prevent unnecessary wear the surface of the pad 132 could be provided with a wear surface such that the shaft to pad contact will not result in undesirable wear. In accordance with the preferred embodiment of the present invention, however, the entire bearing can be formed of a material having a high PV limit. The currently preferred material is CELEDYNE™ a material known to have a high PV limit. Tests have shown that a bearing formed of CELEDYNE™ and constructed as shown in FIGS. 54–54B exhibits excellent wear characteristics at start-up and hydrodynamic wedge operation after start-up. CELEDYNE™ is also less rigid than metal materials thus, giving the relatively rigid bearing construction more flexibility.

Although the bearing construction shown in FIGS. 54–54B does not include a support structure for supporting the pads 132 for movement with six degrees of freedom, it does offer a number of advantages. Specifically, the construction is quite simple and easy to mass produce at low cost. Moreover, even without providing six degrees of freedom, the bearing pads 132 provide far superior performance to plain bearings of similar material. Thus, the simple L-shaped groove formations provided by the pad defining grooves 132p and the undercutting grooves 132u dramatically improve pad performance. This embodiment illustrates how the teachings of the present invention can be applied to achieve improved results by modifying the support for a pad 132 by simply undercutting a portion of that support. Again, this demonstrates how through finite element analysis modelling the pads 132 as a piece of putty by removing the specific portions of the overall structure superior results can be achieved.

Figure 55:
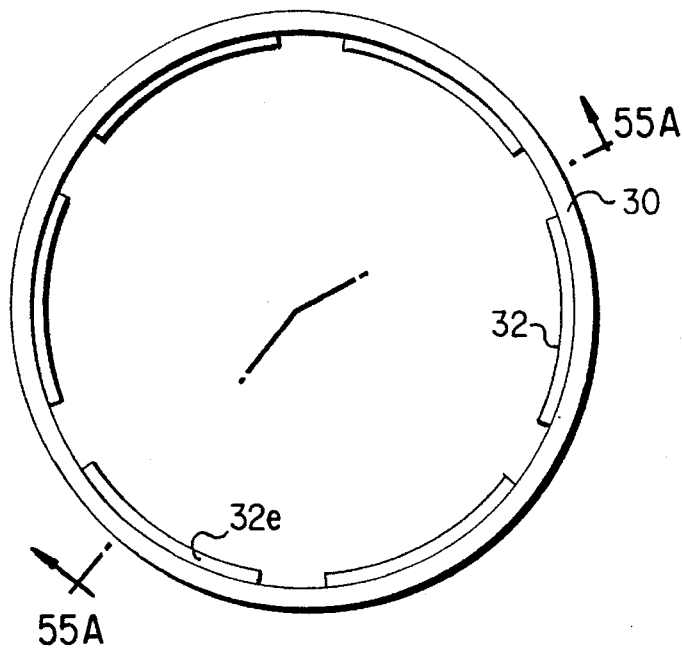
FIG. 55 is a side view of another radial or journal bearing according to the present invention.
Figure 55A:
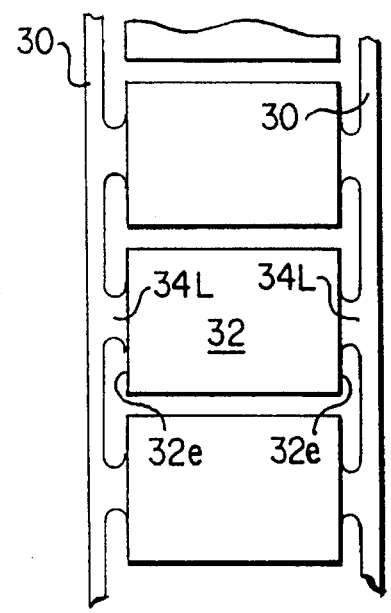
FIG. 55A is a flattened interior view of the bearing of FIG. 55 along the lines indicated in FIG. 55.
Figure 55B:
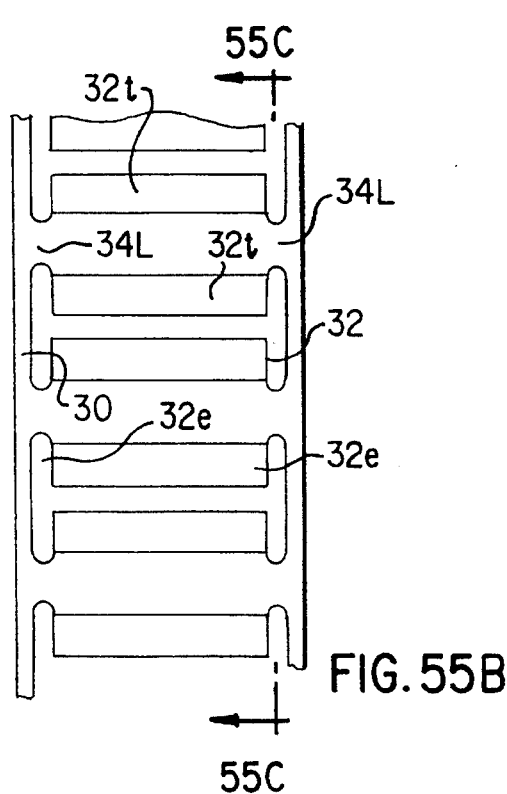
FIG. 55B is a flattened side view of the bearing of FIG. 55.
Figure 55C:
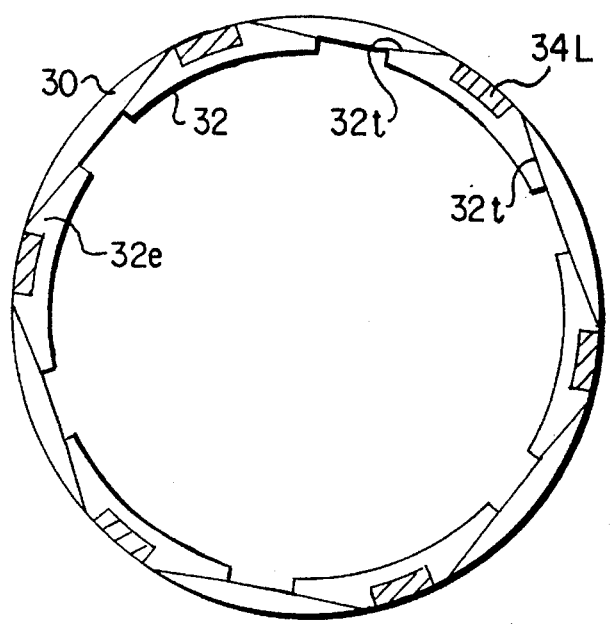
FIG. 55C is a cross-section of the bearing of FIG. 55 along the lines indicated in FIG. 55B.

FIGS. 55–55C illustrate another radial or journal bearing construction according to the present invention. In this particular embodiment, the bearing is constructed with a very small radial dimension to allow the bearing to provide support in an extremely small radial envelope. In part, this small radial dimension is achieved by using longitudinal support beams as described below. As discussed below in connection with FIGS. 59–60A, a similar concept can be used to provide a low profile thrust bearing.

As shown in FIGS. 55–55C, the radial or journal bearing includes a series of circumferentially spaced bearing pads 32. Each of the bearing pads 32 includes circumferentially spaced longitudinally extending edges and axially spaced axial edges 32e. Each of the pads 32 is also preferably formed with a taper 32t to increase inlet bending as discussed previously. The pads 32 are supported at both axial edges by a longitudinal beam 34L. The longitudinal beams 34L are, in turn, supported by continuous base rails 30.

As best shown in FIG. 55C, the radially outer dimension of the pads 32 is flush with the radially outer dimension of the base rings 30. Consequently, the central region of the bearing pads 32 is rigidly supported. On the other hand, the circumferential edges of the bearing pad are free to deflect. By virtue of this support, the pads 32 are adapted to rock or pivot about the center of the pad so as to form a wedge with respect to the rotating shaft in the known manner.

Several other significant features and advantages of the bearing construction shown in FIGS. 55–55C should be noted. One important advantage is that the bearing is constructed as a unitary piece. Among other things, this means that the position of the circumferentially spaced pads 32 with respect to one another is fixed with a single tolerance thus avoiding the problem of tolerance stack up which is inherent with any multi-piece design. Moreover, the bearing can be molded as a single piece at a fraction of the cost of multi-part assemblies particularly when both manufacturing and assembly costs are considered. Another important feature is that the pads 32 are supported only at their axial edges 32e such that the pads are easily supported for torsional twisting.

It should be noted that the degree of torsional flexibility depends on the dimensions of the longitudinal beams 34L. As best shown in FIG. 55C, the illustrated embodiment includes longitudinal beams 34L of a moderate dimension. Naturally, thin or thick beams could be used to vary torsional flexibility in the known manner. In the embodiment shown in FIGS. 55–55C, the pad has little, if any, radial flexibility in its central region. In this particular embodiment, this is intended since it is only desired that the beam pivot to form a wedge. If, on the other hand, it were desirable to build some radial flexibility into the support for the pads 32 this could be done by providing rails radially extending the base rings 30 so as to provide rails as discussed elsewhere herein.

Figure 56:
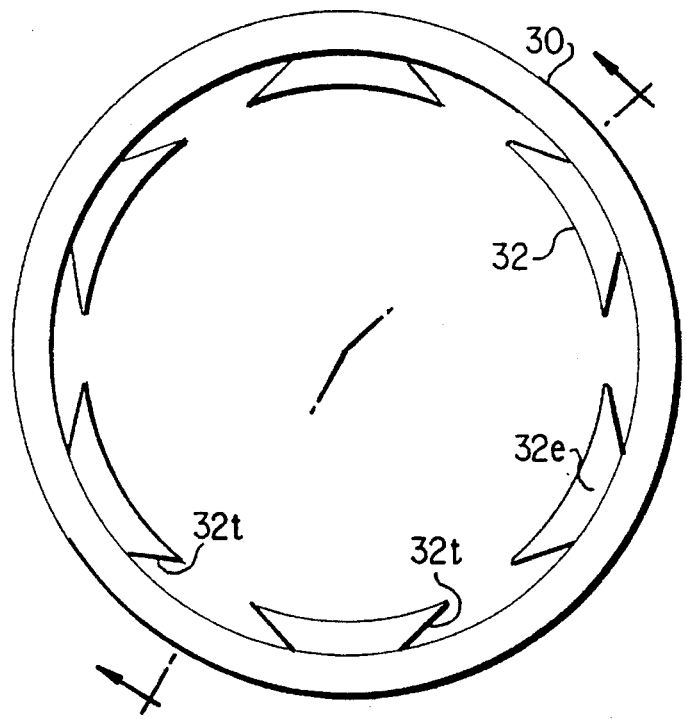
FIG. 56 is a side view of another radial bearing according to the present invention.
Figure 56C:
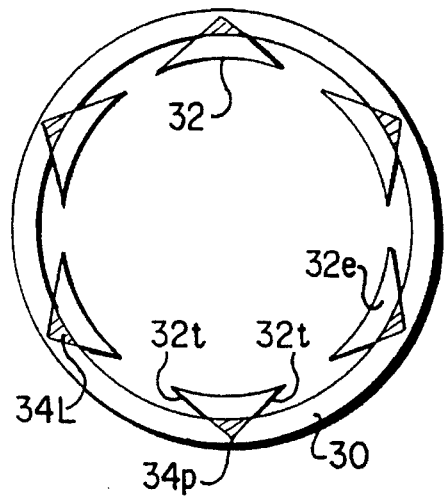
Figure 56A:
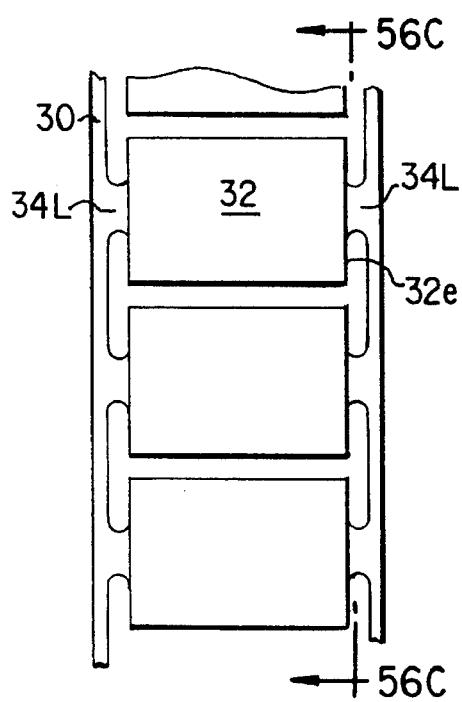
Figure 56B:
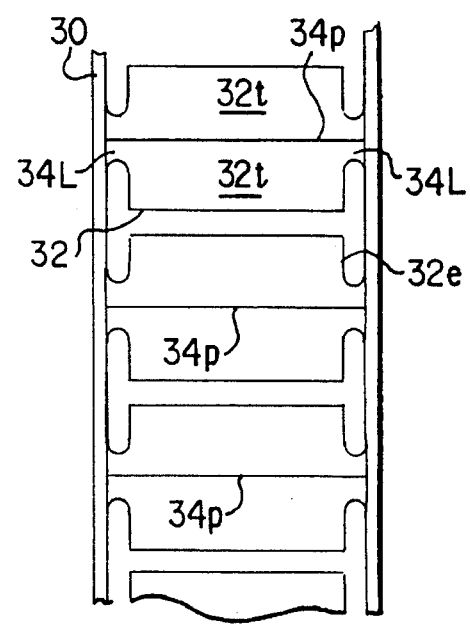

Another radial bearing construction is shown in FIGS. 56–56C. This construction is similar to the construction shown in FIGS. 55–55C and discussed above with several exceptions. One difference is that the pads 32 are more sharply tapered, as best shown in FIG. 56. As a consequence of this sharp taper, the edges of the pad are extremely flexible and would have a tendency to deflect a relatively great amount to allow inlet bending. Naturally, the degree of taper can be varied to suit desired performance characteristics.

The most significant functional difference, however, is that the longitudinal beams 34L have a triangular cross-section with the apex of the triangle providing a pivot point support for the pads as best shown in FIG. 56C. This pivot point support extends in a line across the back side of the pads. By virtue of this construction, the pads are in effect a series of triangular pads that readily deflect to form a wedge. The pads 32 have certain amount of stability, however, because of the support and torsional resistance of the longitudinal beams 34l. Further, the circumferential position and alignment of the individual pads 32 is assured by the integral base ring 30 that maintains the alignment of the various pads 32.

Figure 57:
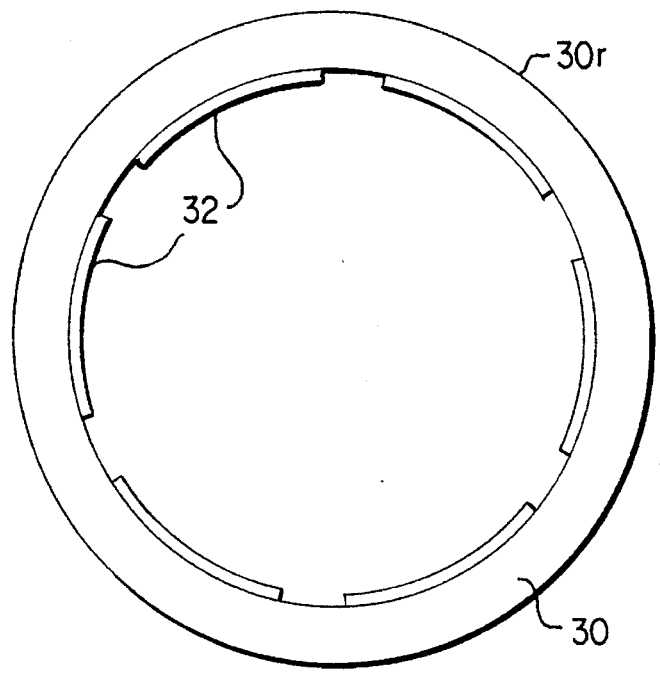
Figure 57A:
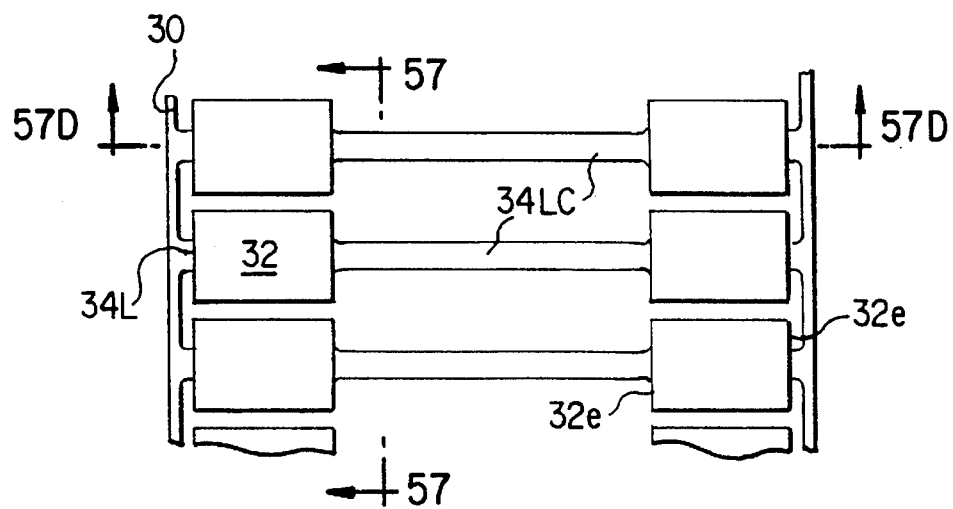
Figure 57D:
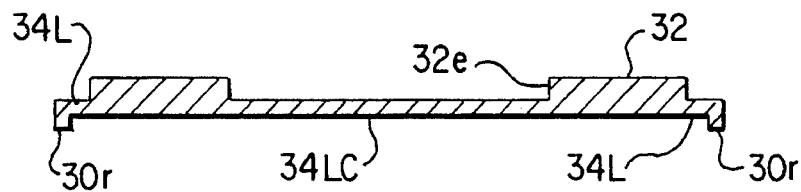
Figure 57C:
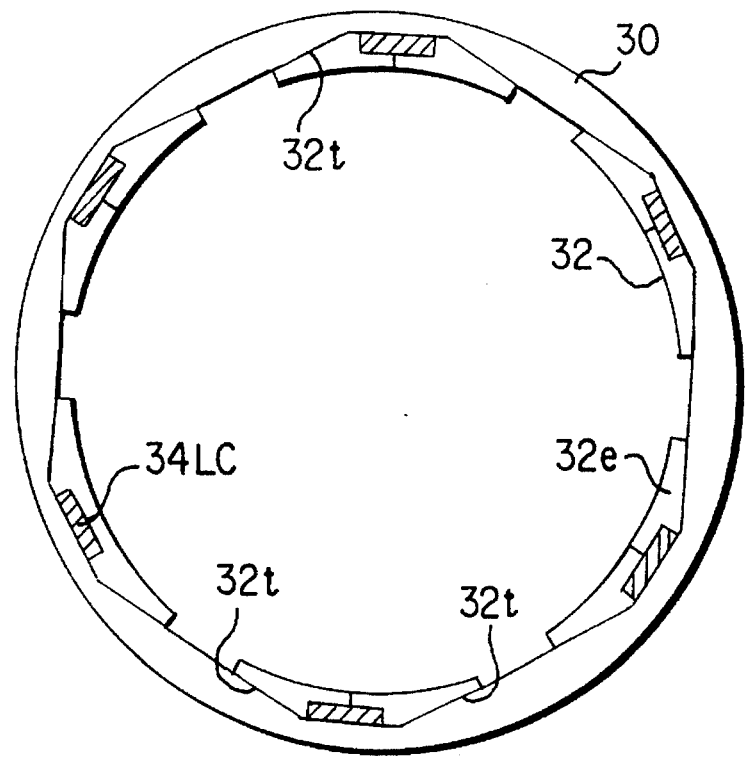
Figure 57B:
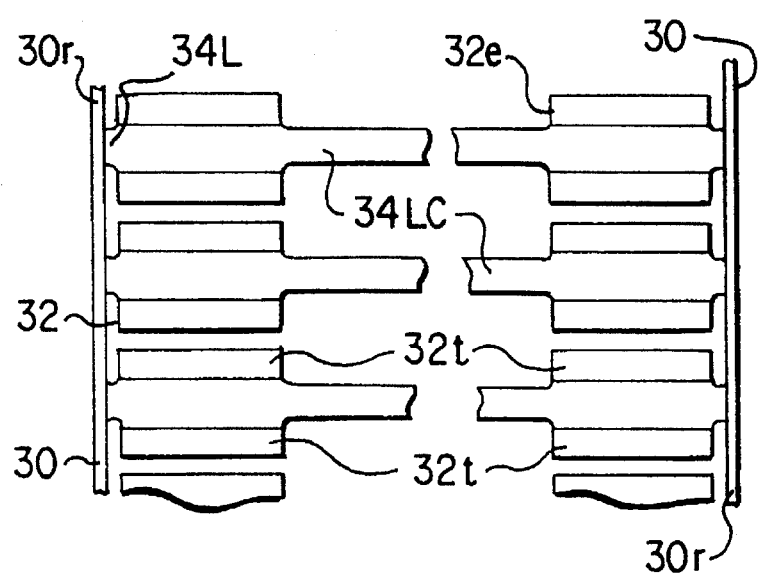

Another journal bearing construction is shown in FIGS. 56–57D. This bearing construction is very similar to that shown in FIGS. 55–55C except that it includes two sets of circumferentially spaced bearing pads spaced from each other by longitudinal connecting beams 34LC. In addition, the circular base rings 30 have radially extending rails 30r formed thereon so that the longitudinal beams 34L, 34LC and the pads 32 can move radially outward to give the bearing additional flexibility. As with the bearing of FIGS. 55–55C, the longitudinal beams 34L, 34LC are connected to the pads at axial ends 32e of the pads 32. Thus, the beams act as torsional stabilizers and supports for the pads 32. Naturally, if desired the rails 30r provided on the base rings 30 can be eliminated so that the support acts as a simple tilt support as with the embodiment of FIGS. 55–55C.

An advantage of the construction shown in FIGS. 57–57D is that a shaft can be supported at two separate locations along the shaft by a single bearing. Moreover, the two locations of support are readily and permanently aligned because of the longitudinal connecting beams 34lc.

The bearing construction shown in FIGS. 57–57D is particularly well suited for supporting a high speed shaft, which must be supported in a very small radial envelope. One such application is a turbocharger of the type commonly used in connection with automobiles. When used in such applications, the bearing is preferably formed of a high temperature polymer such as CELEDYNE™. An example of such an application is discussed below in connection with FIGS. 58 and 58A.

Figure 58:
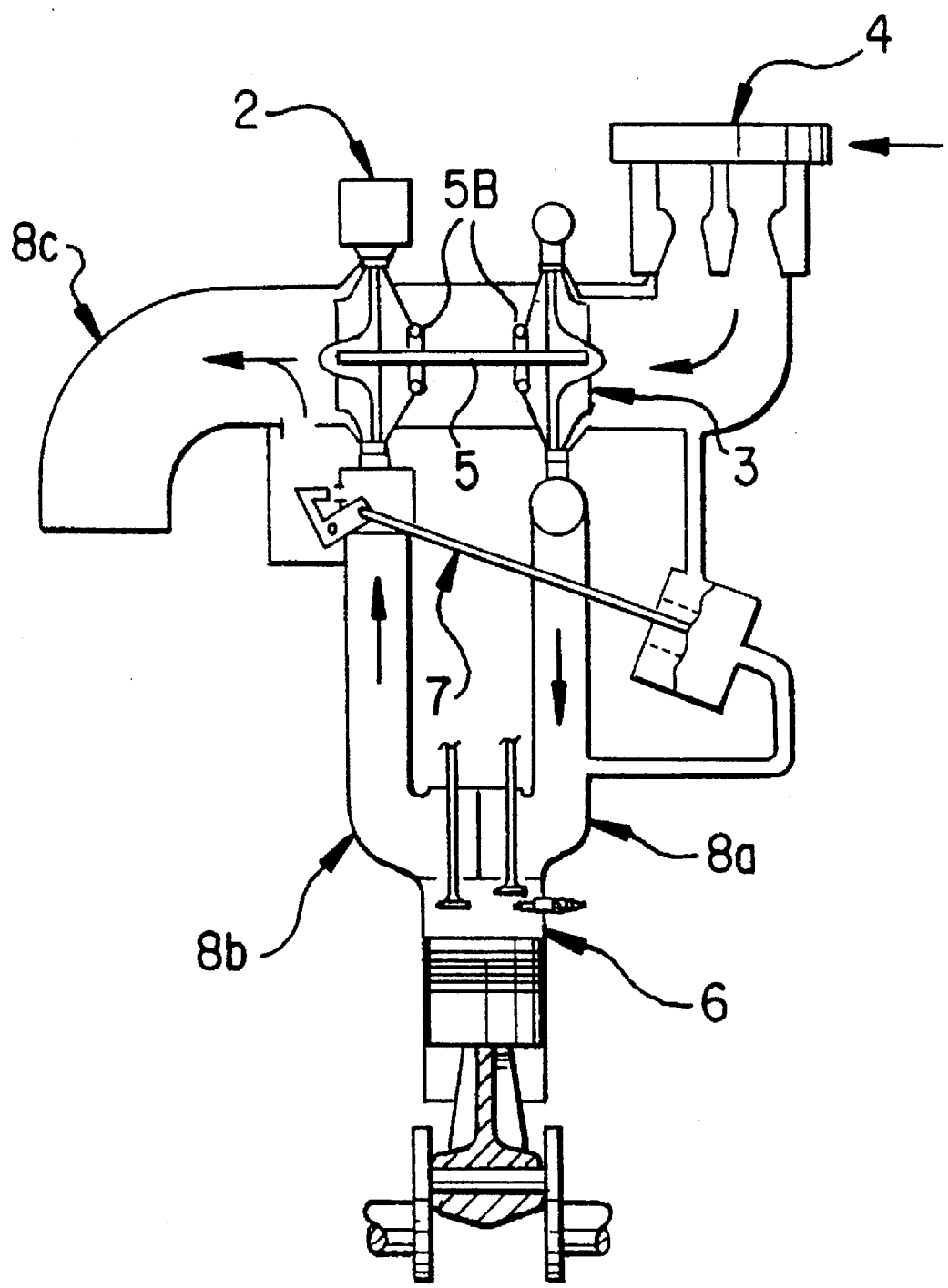

FIG. 58 schematically illustrates a conventional turbocharging arrangement for use in internal combustion engines. The simple system includes a turbine wheel 2 and a compressor wheel 3 both of which are supported on a shaft 5 supported on shaft bearings 5b. The shaft and wheels are mounted in the air passages of the engine that also includes a carburetor 4, a combustion chamber 6 that includes a piston, spark plug and valves and an actuator 7.

The operation of such a conventional system is well known. Specifically, the exhaust gas pressure and heat energy causes the turbine wheel 2 to rotate. This causes the compressor wheel 3 to rotate. Air is mixed with fuel by the carburetor 4. The rotating compressor wheel 3 compresses the air fuel mixture it receives from the carburetor and delivers it under pressure to the intake manifold 8a. As a result, a denser charge enters the combustion chamber 6. The denser charge and the combustion chamber 6 develops more horsepower during the combustion cycle. Exhaust gas from the exhaust manifold 8b flows into the turbine 2. When the manifold pressure reaches a set value, the actuator 7 opens the waste gate to bypass some exhaust gas. The cooled expanded exhaust gas is directed by the turbine housing to the exhaust system via a passage 8c.

One of the most common problems with conventional systems of this type is that the bearings fail as a result of the extreme temperatures and high speeds of the shaft rotation.

Figure 58A:
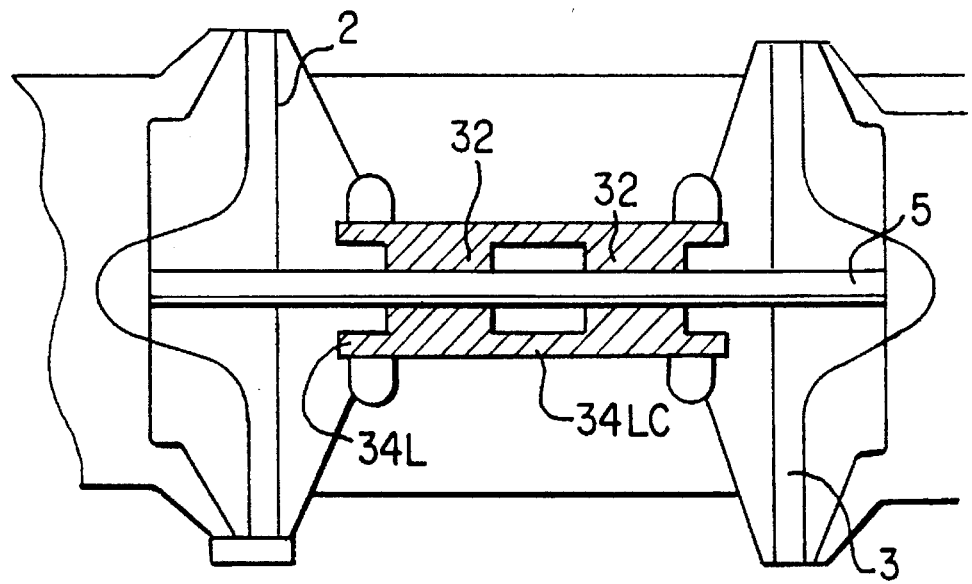

FIG. 58A schematically illustrates how a bearing of the type shown in FIGS. 57–57D can be incorporated into an otherwise conventional turbocharging system. Specifically, the two pad bearing is mounted in the housing so as to support the shaft 5 that carries the turbine wheel 2 and the compressor wheel 3. Tests have shown that the simple one-piece bearing of the type shown in FIGS. 57–57D provides dramatically improved results over conventional rolling element or tilt pad bearing constructions.

FIGS. 59–60A illustrate embodiments of a low profile thrust bearing construction having some conceptual similarity to the journal bearings discussed above in connection with FIGS. 55–57D.

The currently preferred embodiment is shown in FIGS. 59–59F. As shown in FIG. 59, the bearing includes a plurality of spaced bearing pads 132. Each of the bearing pads 132 includes a pad surface 132ps that is planar as can be appreciated from FIGS. 59, 59B, 59C and 59A. The bearing further includes a radially inner support or base ring 130I and a radially outer support or base ring 130O. In the currently preferred embodiment shown in FIG. 59, the inner and outer support rings 130I, 130O have a circular configuration and are concentrically arranged.

In the preferred embodiment, a plurality of circumferentially spaced support spokes 136 extend between the radially inner support ring 130I and the radially outer support ring 130O. These support spokes 136 provide rigidity to the bearing structure and maintain the alignment of the various portions of the thrust bearing. It will be appreciated by those skilled in the art, however, that the support spokes 136 are not essential in an embodiment such as that shown in FIG. 59 in which the radially extending beams 134 (discussed in greater detail below) extend between the inner and outer support rings. Thus, while the currently preferred embodiment shown in FIGS. 59–59F includes such support spokes 136, they are not essential and could be eliminated if desired.

As best shown in FIGS. 59A, 59C, 59D and 59F each of the bearing pads 132 is supported on a radially extending beam 134. In the preferred embodiment of FIGS. 59–59F, the radially extending beam 134 extends between the inner support ring 130I and the outer support ring 130O. Moreover, the support beam 134 extends continuously between the inner and outer support rings. Thus, the support beam 134 has the appearance of a single beam extending radially across the entire bearing pad 132 and connecting the bearing pad 132 to both the inner support ring 130I and the outer support ring 130O. From a functional point of view, however, each of the beams 134 includes two radial beam portions: a radially inner beam portion 134I that extends between the radially inner edge of the pad 132 and the inner support ring 130I and a radially outer radial beam 134O that extends between the radially outermost edge of the pad 132 and the outer support ring 130O. It should be understood, however, that it is not necessary that the radial beam 134 connect the pad 132 to both of the support rings 130I and 130O. For example, the pad 132 could be connected only to the outer support ring 130O by a radially outer beam portion such as 134O so that the radially inner edge of the pads 132 is not rigidly connected to the support structure whereby the inner edge of the pad 132 may deflect downward to retain lubricant as previously discussed in connection with FIGS. 15–18, for example.

As best shown in FIGS. 59A and 59D, the radial beam 134 of the preferred embodiment has a planar bottom surface which is adapted to be supported on a bearing support or similar rigid structure. By virtue of this configuration, the radial beam 134 provides an essentially rigid support for those portions of the pad 132 that it supports. As can be readily appreciated from both FIGS. 59 and 59A, the radial beams 134 support a central region of the pads 132 that is spaced from either circumferential edge of the pads 132. Alternatively, the radial beams could have a triangular cross-section similar to the beams 34L of the embodiment of FIGS. 56–56C. The rectangular cross-section shown is preferred, however.

In the preferred embodiment, shown best in FIG. 59A, the radial beams 134 are spaced closer to one circumferential edge than the other circumferential edge. As such, the bearing has different deflection characteristics depending on the direction of rotation and is intended to be a unidirectional bearing. Naturally, if it is desired to make a bidirectional bearing, the radial beam 134 should be spaced evenly between the circumferential edges so as to provide a symmetrical support as discussed above in connection with other embodiments.

Those portions of the pad 132 not supported on the substantially rigid radial beam 134 have flexibility that allows the pads to deflect under heavy loading to form a fluid film wedge. By virtue of the relatively rigid construction of the embodiment shown in FIGS. 59–59F, this particular thrust bearing construction is intended for heavy load applications. The currently preferred applications are for use as a replacement for tapered land or similar bearings used in compressors and the like. Initial testing has shown that this bearing, although quite rigid, provides acceptable performance in such applications.

The bearing may be made of a wide variety of plastic or metal materials although the currently preferred embodiment is formed of bronze. To the extent the bearing can be formed of moldable materials, however, it should be noted that the bearing configuration shown in FIGS. 59–59F includes no hidden openings. Thus, as discussed below, the bearing has a configuration that could be considered easily moldable, i.e., it can be molded in a simple two-piece mold not requiring any cam action.

One important aspect of the bearing construction shown in FIGS. 59–59F is that it can be constructed with an extremely narrow profile. This is somewhat evident from FIGS. 59B–59D, however, it should be understood that the bearing can be formed with even a narrower profile by reducing the thickness of the pads and/or the thickness of the support rings 130I, 130O and radial beams 134 and support spokes 136. Naturally, any change in the dimensions of the pads or the support structure will affect the rigidity of the overall bearing construction. Accordingly, the deflection characteristics of the preferred configuration shown in FIGS. 59–59F can be readily adjusted by changing the thickness of the various members and/or the material characteristics of the various members.

Other modifications to the pad shape and support structure are naturally possible. For example, the shape of the pad may be modified as discussed herein in connection with FIGS. 42A–52C to achieve various deflection characteristics. For instance, the lower edge of the pads 132 could be tapered to increase inlet bending formed with recesses to encourage lubricant channelling.

In addition, as alluded to earlier, it is possible to connect the pads 132 to the outer ring 134 only thus leaving the inner edge 132 of the pads unsupported. Such a construction is shown in FIGS. 61–61B discussed below.

Another possible modification of the preferred embodiment shown in FIGS. 59–59F is shown in FIGS. 60–60A. The low profile thrust bearings shown in these drawings is essentially the same as that shown in FIGS. 59–59F with one significant exception: the inner and outer support rings 130I and 130O extend below the beams 134 such that the support rings 130I and 130O support the beams 134 above the base on which the bearing is mounted. As such, the beams 134 are supported for downward deflection under heavy loading and are not as rigid as in the preferred embodiment of FIGS. 59–59F. This configuration provides yet another way to vary the deflection characteristics of the low profile thrust bearing of the present invention.

FIGS. 61–61B disclose an embodiment in which the radial beam 134 connects the pad 132 to the outer ring 130O, but does not connect the pad 132 to the inner ring 130I. The beam 134 extends only partially radially across the pads 132 such that an inner portion of the pads 132 is not rigidly supported by the beam 134. As such, the inner portion of the pad 132 is free to deflect downwardly. As mentioned previously, downward deflection of thrust bearing pads can be useful in retaining lubricant. Naturally, the radial extent of the beam 134 can be varied to alter the deflection characteristics of the bearing.

An important aspect of the present invention is the disclosure of machinable bearing shapes i.e., bearing shapes that can be produced by machining a piece of heavy walled tubing or similar cylindrical journal using standardly available machining techniques. Such bearings are characterized by the fact that they are formed from a piece of heavy walled tubing or similar cylindrical journal through the provision of bores, slits and grooves. The advantage of such bearings is that it is easy to manufacture prototypes and to modify these prototypes after testing. Naturally, when the bearings are to be mass produced, using, for example, molding or casting techniques, different manufacturing considerations may dictate different shapes. It is important to recognize that changes in shape affect bearing performance.

Another manufacturing consideration is ease of molding. Naturally, most of the bearing constructions of the present invention are capable of being molded by some molding technique. However, only certain shapes can be injection molded in a simple two-piece mold, i.e., a mold that does not include cams. Another advantage of the bearings of the present invention is that the bearings can be constructed with easily moldable shapes, i.e., shapes that can be injection molded using a simple two-piece mold. An easily moldable shape generally is characterized by the absence of "hidden" cavities that require cams for molding. For instance, with respect to radial bearings, an easily moldable shape includes no radially extending grooves in the inner and outer diameter and a continuous axial cross section. The bearing shown in FIGS. 32, 32A and 32B is an example of an easily moldable radial or journal bearing.

Similarly, easily moldable thrust bearings are characterized by the fact that they can be molded with a single seam line such that, for example, when viewed only from the top and bottom, all surfaces are visible.

Figure 38A:
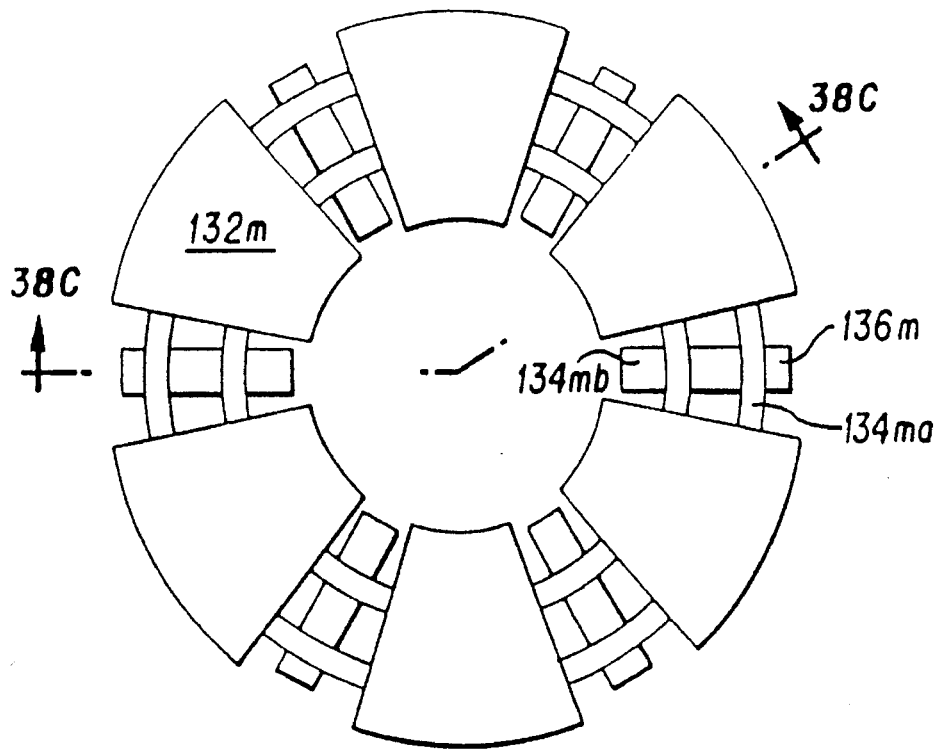
FIG. 38A is a top view of an easily moldable thrust bearing according to the present invention.
Figure 38B:
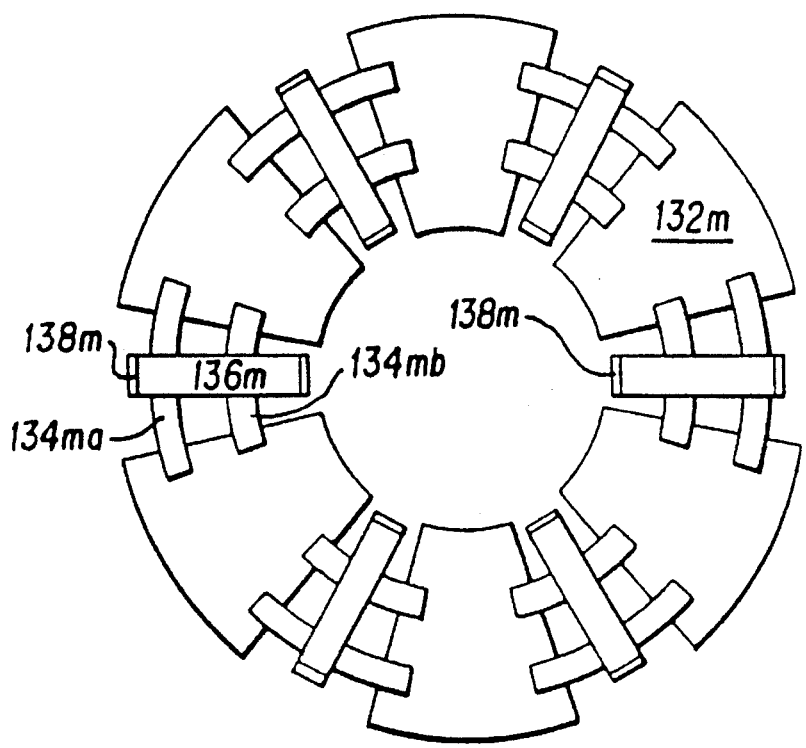
FIG. 38B is a bottom view of the bearing of FIG. 38A.
Figure 38C:
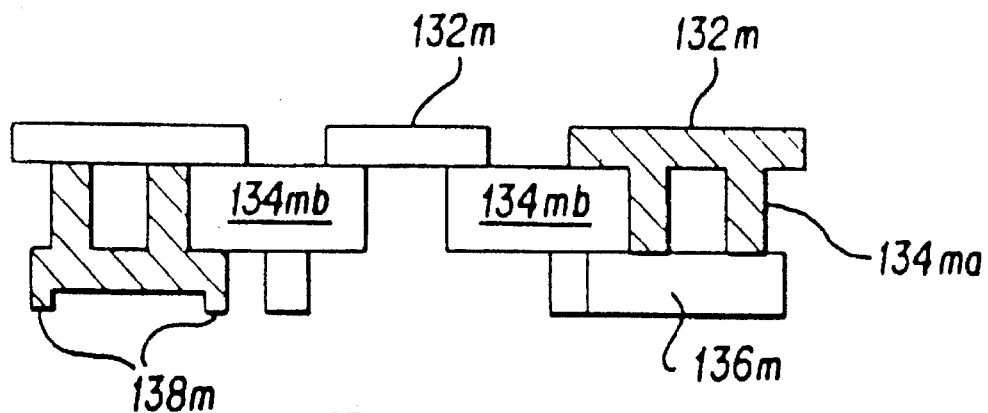
FIG. 38C is an exploded cross-section along the lines indicated in FIG. 38A.

FIGS. 38A–38C illustrate an easily moldable thrust bearing. The bearing includes a plurality of circumferentially spaced bearing pads 132m and a support structure supporting each of the bearing pads 132m. The support structure includes a primary support portion that includes circumferential beams 134mb and 134ma, a secondary support portion that includes radially extending beam 136m and a tertiary support portion that includes the stub-like pair of beams 138m. It should be noted that, in FIGS. 38A–38C, the dimensions of the support structure are somewhat distorted to provide clarity. For instance, as shown in FIG. 38C, the circumferential beams 134ma and 134mb are shown as extremely thick. Such the beam structure would provide a very rigid support for the bearing pads 132m and in practice, such a rigid support would probably not be necessary or desirable.

Variants of the specific moldable beam structure illustrated are possible. For instance, either or both of the spaced circumferential beam segments 134ma or 134mb could be formed as a continuous circumferential beam element. Additionally, the secondary support portion could include a plurality of radially extending beams between each bearing pad 132m. Further, the primary support structure could be modified to include three or more circumferential beam segments connecting each pair of adjacent bearing pads and/or circumferential beam segments; also, segments of different radial widths could be used. Further, the stub-like beam portions 138m could be provided along the radially extending edges of the beams 136 rather than the circumferentially extending ends. Finally, as with any bearing in accordance with the present invention, the structure could also be varied by varying the length or thickness of any of the elements in the support structure to modify the deflection characteristics of the support structure.

Figure 38D:
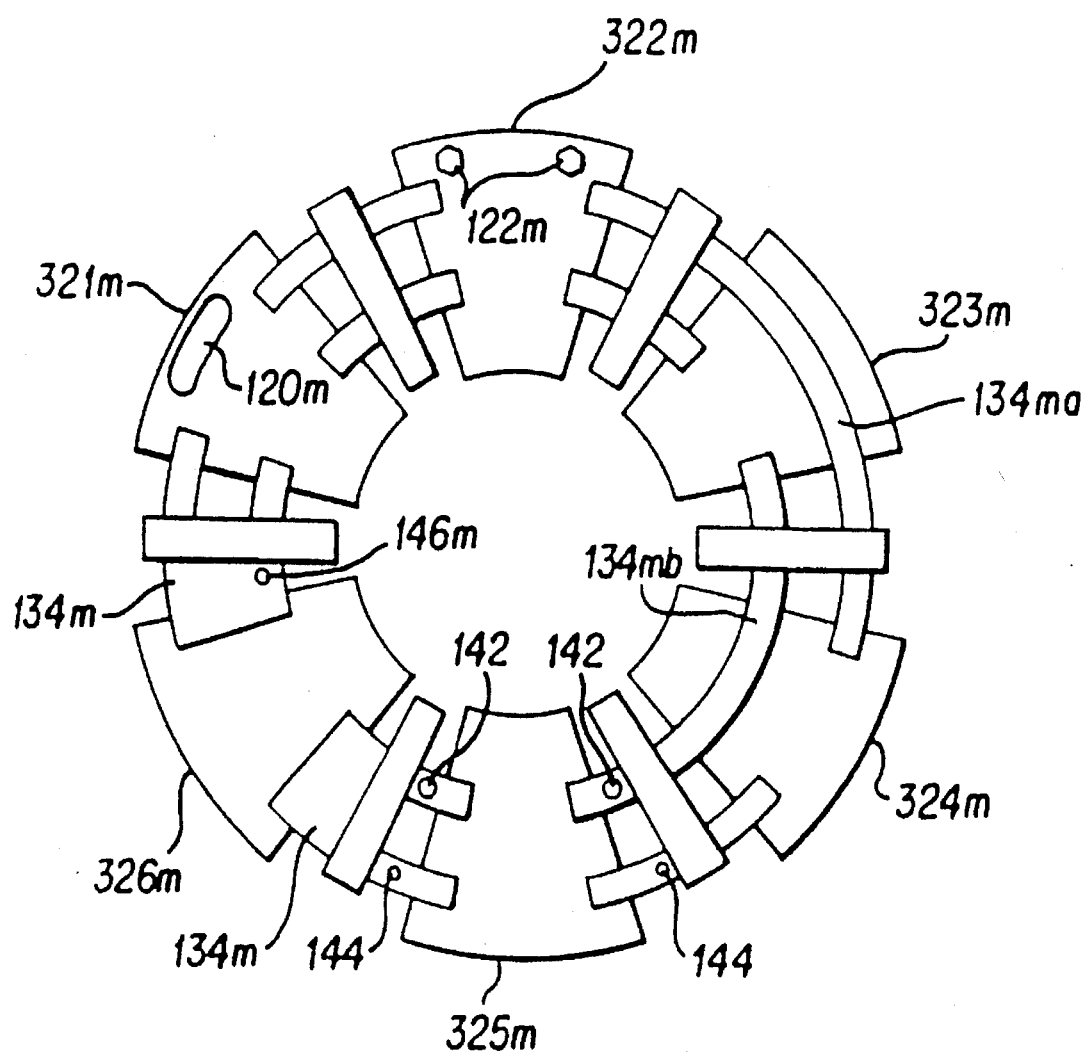
FIG. 38D is a bottom view illustrating modifications of the bearing illustrated in FIGS. 38A–C.

In order to illustrate a number of possible support structure constructions, FIG. 38D depicts a different support structure for each of the bearing pads 321m–326m. In particular, FIG. 38D is a bottom view with the modifications illustrated herein. It should be understood that these various support structures are shown in a single bearing for purposes of illustrating the present invention. In normal use, each of the bearing pads 321–326m would have a similar, though not necessarily identical, support structure to assure uniform performance.

The support for bearing pad 322m differs from that for the bearing pads 132m in that an oval shaped projection extends from the back of the bearing pad surface to provide a rigid support for the outer circumferential edge of the bearing pad 321m. By virtue of this construction, the bearing pad 321m would be extremely rigid at its outer circumferential end.

The support for bearing pad 322m is similar of that to 321m except that rather than a single large projection, two smaller projections 122m extend from the bottom of the bearing proximate the outer circumferential edge of the bearing pad. Like the projection 120m, these two projections 122m provide rigidity to the outer circumferential edge of the bearing pad 322m. However, this construction allows the bearing to deflect in the unsupported region between the projections.

The bearing pad 323m is supported by a modified support structure that includes a continuous circumferential beam 134ma in the primary support portion. Similarly, the bearing pad 324m includes a continuous inner circumferential beam 134mb. The provision of such continuous beams increases the rigidity of the bearing support structure.

The support structure for bearing pad 325 is modified by the provision of large openings 142m in the inner beam 134mb and smaller openings 144 in the outer beam 134ma. The provisions of these openings increase the flexibility of the beams. Naturally, the larger openings increase the flexibility of the beams to a greater extent than the small openings 144. Variants of this support structure include the use of different sized openings or a different number of openings to bias the bearing pad 325m in a predetermined direction.

The bearing pad 326m is supported by a modified structure in which the primary support portion includes a membrane 134m rather than a pair of beams. In the illustrated example, one of the membranes is provided with a opening 146 to bias the bearing pad 326m in a predetermined direction. Of course, the provision of the opening 146m is not necessary and if desired, a number of openings could be provided.

As is evident from these drawings, the moldable bearings do not include any hidden cavities that necessitate the use of a complex mold and/or a mold including a displaceable cam. In particular, since each surface of the bearing structure is directly visible in either the top view of FIG. 38A or the bottom view of FIG. 38B, the bearing can be simply molded using a two-piece mold. Specifically, a first mold piece defines those surfaces that are directly visible only in the top view of FIG. 38A. The second mold piece defines those surfaces that are only visible in the bottom view of FIG. 38B. Surfaces having edges visible in both FIGS. 38A and 38B can be molded using either or both molds. In the illustrated bearing, easy moldability is achieved because the secondary and tertiary support portions are circumferentially located in the space between bearing pads. The modifications illustrated in FIG. 38D do not alter the easy moldability of the bearing.

More complex variants of the moldable thrust bearing illustrated in FIGS. 38A–38D are possible. In particular, any of the previously discussed modifications of the bearing structure that can be adapted to easy molding could be employed. For instance, the primary support beams could be continuous. Thus, the provision of an easily moldable bearing does not necessarily require a simple bearing construction. An example of a more complex bearing structure is illustrated in FIGS. 39A–39C.

Figure 39A:
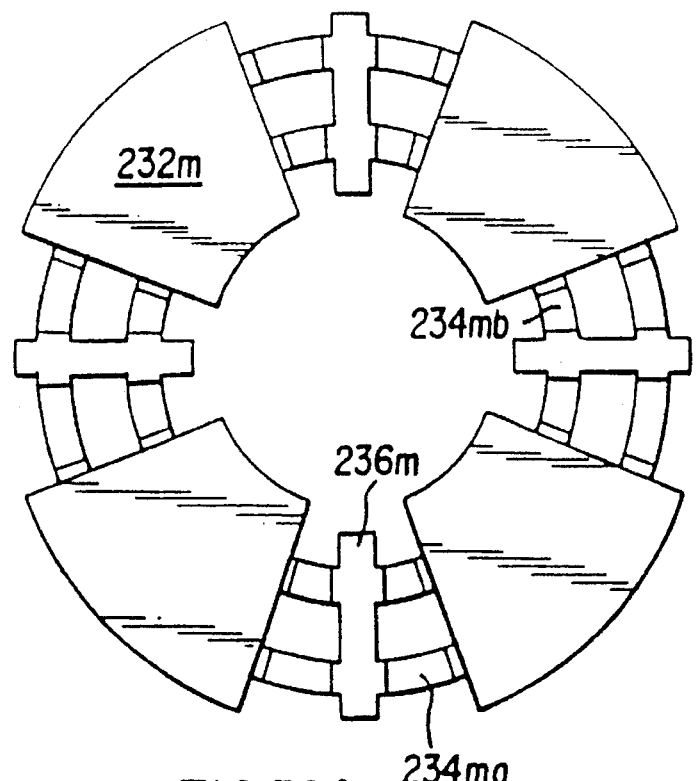
FIG. 39A is a top view of another easily moldable thrust bearing according to the present invention.
Figure 39B:
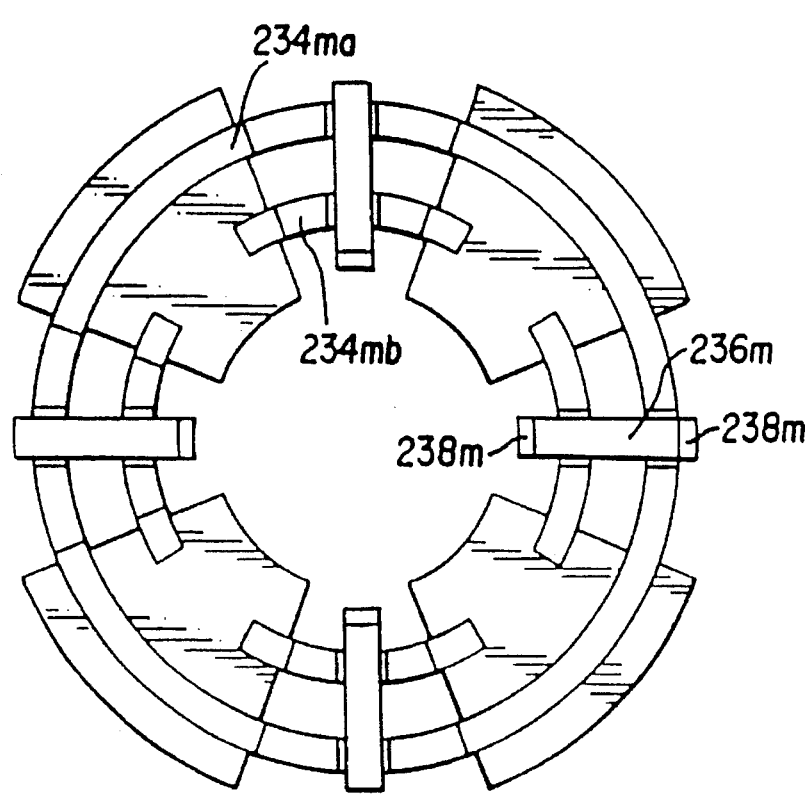
FIG. 39B is a bottom view of the bearing of FIG. 39A.
Figure 39C:
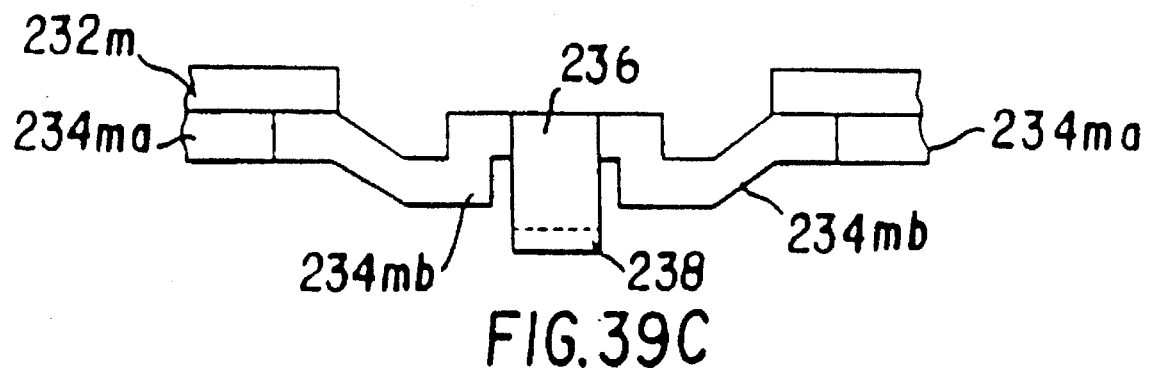
FIG. 39C is a partial cross-section showing the support structure for the bearing pads in the bearing of FIGS. 39A and 39B.

As illustrated in FIGS. 39A–C, the bearing includes a plurality of circumferentially spaced bearing pads 232m supported by a bearing pad support structure. The secondary and tertiary portions of the support structure are similar to corresponding portions of the bearing support structure of FIG. 38. However, the bearing of FIG. 39 differs from the bearing of FIG. 38 in that, in the bearing of FIG. 39, the primary support portion includes a plurality of complex beams 234. Specifically, each bearing pad is supported by a radially outer continuous complex circumferential beam 234ma. The pads are further supported by the plurality of spaced circumferential complex beams 234mb. The complex shapes of the continuous beam 234ma and the beam segments 234mb can be best appreciated with reference to FIG. 39C which shows, somewhat schematically, the profile of the complex beams 234. In operation, the beams 234ma and 234mb function as a beam network. Thus, it can be seen that numerous complex thrust bearing constructions can be provided while retaining the ability to mold the bearing with a simple two-piece mold, i.e., easy moldability. Naturally, each structure provides unique deflection characteristics that must be considered in designing the bearing for optimum wedge formation.

Finally, it should be noted that other bearing constructions disclosed herein have, or can be readily configured to have, easily moldable shapes. For example, the low profile thrust bearings in FIGS. 59–60A described above, have easily moldable configurations.

In certain gas or air lubricated deflection pad bearings, there are cases where loads or speeds exceed the capability of an air film. In these cases, it is necessary to introduce a liquid type lubricant into the converging wedge without providing a liquid reservoir or bath. FIGS. 40, 40A, 41 and 41A illustrate bearing constructions for achieving this purpose. In particular, these drawings illustrate a novel self-lubricating deflection pad bearing in accordance with another important aspect of the present invention. The bearing is essentially a deflection pad bearing of the type described herein which has been modified to include lubricating plastic in its various openings.

The plastic employed in the bearing is a conventional castable porous plastic capable of absorbing lubricating liquid when soaked in such a liquid. One such plastic is sold under the trade name POREX™. Generally, the porous plastic can be formed from various plastics by injecting air into the plastic material to form the pores. In particular, the liquid is absorbed into the porous plastic in a wick like manner and held in place by the plastic.

The lubricating deflection pad bearing is constructed by taking a conventional journal, thrust or combined radial and thrust deflection pad bearing of the type described above and casting or injecting the conventional porous plastic around and into the spaces between the deflection members. As a consequence of this construction, during operation, the movement of the shaft and the compression of the deflection members causes the lubricating liquid to leave the porous plastic and to be drawn into the leading edge of the converging wedge. The formation of the liquid filled wedge greatly increases the load and speed capability of the bearing. After the liquid passes over the pad surface, it is reabsorbed by the porous plastic after leaving the trailing edge.

An important aspect of the present invention is the composite structure combining a standard bearing material with the porous plastic. By virtue of this composite, it is possible to take advantage of the unique characteristics of both materials. More specifically, conventional porous plastics alone make poor deflection pad bearing materials because the pores in the plastic are actual voids that are detrimental to the development of the very thin fluid film. On the other hand, conventional plastic or metal bearing materials not having the pores are incapable of absorbing lubricant to any great extent. However, through the use of both materials in the manner described, an effective self-lubricating hydrodynamic bearing can be obtained. Further, there are synergistic results from the combined use of standard bearing material and lubricant absorbing porous plastic. For example, the deflections of the bearing surface assist in forcing the liquid lubricant into the leading edge. Moreover, channelling or lubricant retaining deformation of the bearing surface assists in containing the liquid.

Figure 40:
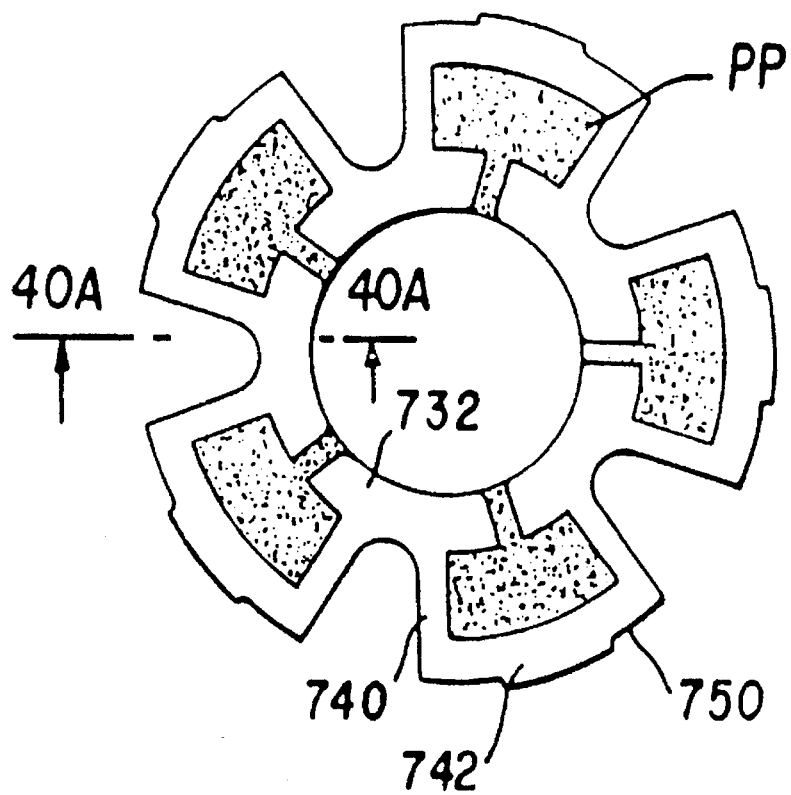
FIG. 40 is a side view of a self-lubricating bearing according to the present invention.
Figure 41:
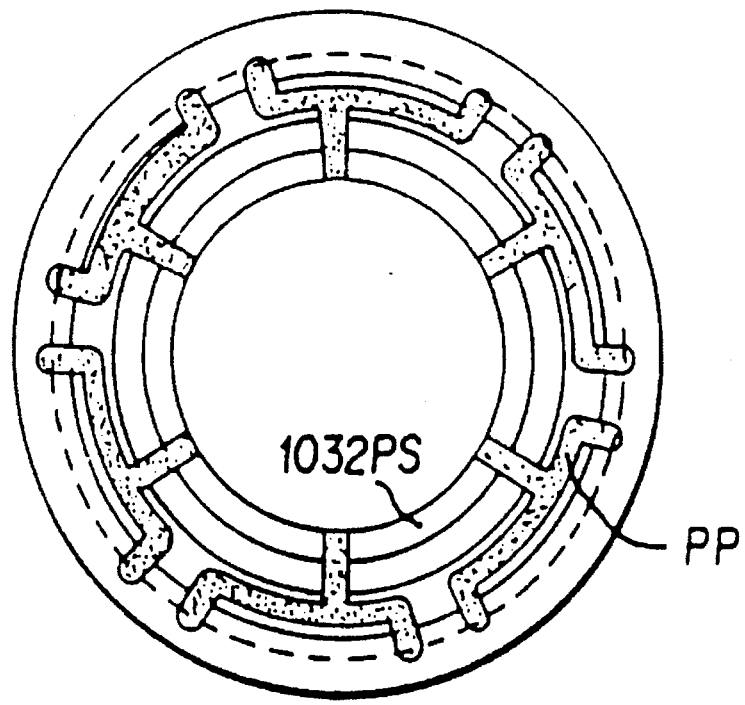
FIG. 41 is a side view of a self-lubricating combined radial and thrust bearing according to the present invention.

FIGS. 40 and 41 show two examples of the self-lubricating deflection pad bearing of the present invention. In particular, these drawings show bearings similar to bearings described previously which have been modified to include the liquid absorbing porous plastic filled into the spaces between the deflection members. To some extent, the bearing acts as a skeletal portion and the porous plastic portion acts as a lubricant retaining and releasing sponge.

Figure 40A:
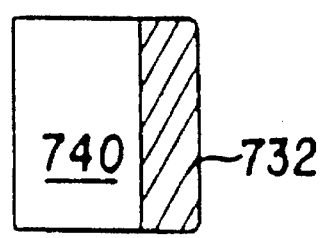
FIG. 40A is a cross-section of the bearing of FIG. 40.

In particular, FIGS. 40 and 40A show a self-lubricating bearing having an underlying bearing structure which is essentially identical to the bearing shown in FIGS. 32 and 32A. However, the bearing structure of FIG. 40 is modified such that porous plastic fills the openings between the bearings and the openings within the support structure, which are continuous with the spaces between the bearing pads 732. Naturally, the spaces under the bearing pads could be filled with porous plastic as well. However, unless there is communication between the porous plastic and the bearing pad surface, the provision of such porous plastic areas would be fruitless.

Figure 41A:
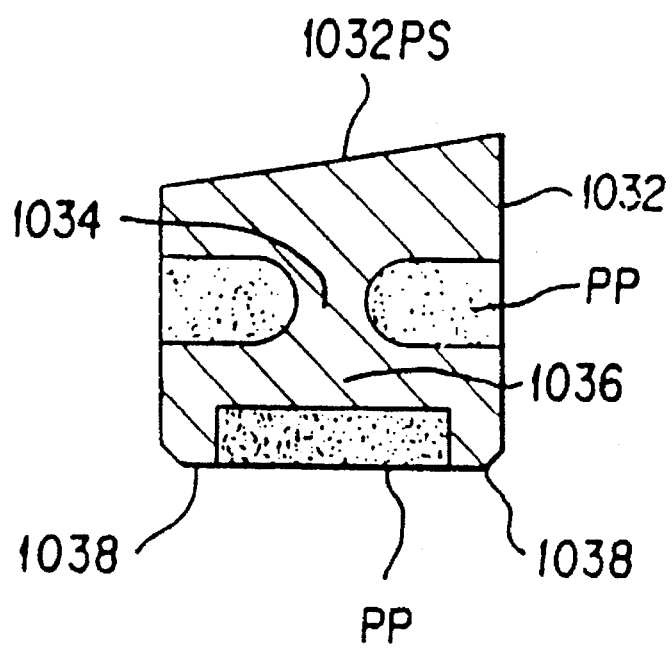
FIG. 41A is a cross-section of the bearing of FIG. 41.

Similarly, FIGS. 41 and 41A show a bearing having a construction virtually identical to the construction of the combined radial and thrust bearing shown in FIGS. 36 and 37. However, porous plastic is again injected into the interstices or spaces within the support structure between the pads. Again, the injection of the porous plastic as illustrated results in a bearing having a continuous inner diameter. However, like the bearing of FIG. 40, the material characteristics across the inner diameter vary significantly.

Specifically, like the bearing of FIG. 40, the inner diameter of the bearing of FIG. 41 includes wedge supporting bearing pad surfaces and circumferentially spaced lubricant releasing, absorbing and retaining portions. In operation, the movement of the shaft and the compression of the deflection members causes the lubricating liquid to leave the porous plastic and to be drawn into the leading edge of the converging wedge. The formation of the liquid filled wedge greatly increases the load and speed capability of the bearings.

The manufacture of the self-lubricating deflection pad bearing involves three general steps. First, the basic bearing or skeletal portion is formed of standard bearing material. Second, the porous plastic is injected into the desired spaces in the bearing structure. For purposes of manufacturing convenience, the plastic is injected into the bearing without lubricant. Finally, the bearing, with the porous plastic injected into the desired spaces, is loaded with liquid lubricant. To load the plastic with liquid lubricant properly, it is necessary to work the lubricant in from one side. The merging in the liquid results in an unfilled internal portion. This is caused by not allowing the pores to vent from one side. In FIG. 40, the basic bearing structure is combined radial and thrust structure similar to that shown in FIG. 36. However, porous plastic fills the interstices within the support structure. The provision of the porous plastic yields a composite bearing having a continuous inner diameter surface. However, the deflection characteristics across the surface vary greatly. Specifically, the deflection pads, which are formed of standard bearing materials such as metal or non-porous plastic, are suited for deflection and formation of a fluid wedge. On the other hand, the porous plastic portions are suited for compression so as to release lubricant at the leading edge of the bearing pads and absorbing lubricant at the trailing edge of the bearing pads.

As noted with respect to each of the illustrative examples described above, the bearings of the present invention can be formed to provide for a wedge ratio of 1:2 to 1:5, have a deformable bearing surface the shape of which can be modified, allow six degrees of freedom of the pad, and provide a dash pot type damping action. The bearings are typically of a unitary construction.

By virtue of the wedge formed by deflection of the bearing pad and the ability of the pad to move with six degrees of freedom, the bearing of the present invention exhibits exceptional performance characteristics. Specifically, the bearing dimensions and deflection variables including number, size, shape, location and material characteristics of the elements defined in the unitary bearing can be tailored for any specific application to support a wide variety of loads. Of these variables, the shape of the support members is particularly important. The impact of shape of the support members on the deflection characteristics of the support structure can be appreciated when the variable formula for moment of inertia $bh^3/12$ (English units) (the main component of sectional modulus for rectangular section, $z=I/c=bh^2/6$) is used as an example. Moreover, the ability of the pad to move with six degrees of freedom allows the bearing to compensate for and correct shaft misalignment. In this regard it is noted that the bearings of the present invention have a self-correcting characteristic resulting from the tendency of the bearing to return to its non-deflected state due to the stiffness of the bearing. Of course, the stiffness of the bearing is primarily a function of the shape of the support structure, and to a lesser extent the other deflection variables, including number, size, location, and material characteristics of the elements defined by the grooves and cuts or slits formed in the unitary element. Stiffer bearings have a greater self-correcting tendency but are less able to adjust for shaft misalignment.

Tests have shown that bearings incorporating the features of the present invention exhibit dramatically improved performance even in comparison to the structure disclosed in the present inventor's prior U.S. Pat. No. 4,496,251. In a recent test, the journal bearings of the present invention were utilized in a radial bearing with a radial envelope of 0.091" (2.31 mm). Inward deflections of the bearing pad were 0.0003" (0.0076 mm) which provides exceptional stability and bearing performance. A comparable displacement using the arrangement shown in the present inventor's prior U.S. Pat. No. 4,496,251 would have required a radial space of 0.30" (7.6 mm).

In conventional hydrodynamic journal bearings, it is typically necessary to provide a fluid-film clearance between the bearing pad surface and the shaft portion to be supported. This requires extremely close manufacturing tolerances that can present an obstacle to high volume production.

The bearings of the present invention can be designed to obviate the need for such close manufacturing tolerances. Specifically, by providing appropriate bores, grooves and cuts or slits, it is possible to define a bearing having virtually any desired performance characteristic. One such characteristic is the stiffness or spring characteristic of the bearing pad in the direction of load, i.e., in the radial direction (radial stiffness) with respect to journal bearings and in the axial direction (axial stiffness) with respect to thrust bearings.

It is known in the bearing art that the fluid film between the shaft and the bearing may be modeled as a spring since it has a calculatable radial or axial fluid film stiffness or spring characteristic. This is true for both compressible and incompressible fluids but is particularly useful in regard to gas fluid lubricants. The fluid film stiffness and the bearing stiffness act in opposition to one another such that if the fluid film stiffness or spring characteristic exceeds the bearing stiffness or spring characteristic, the bearing will deflect in the direction of the fluid film stiffness (i.e., radial direction for journal bearings and axial direction for thrust bearings) until the stiffness of the fluid and the bearing are in equilibrium. Thus, it has been found that if a journal bearing is designed such that radial stiffness of the bearing is less than the radial stiffness of the fluid film, it is not necessary to provide a precise spacing between the shaft and the bearing because the radial stiffness of the fluid film will automatically and instantaneously, upon rotation of the shaft, cause appropriate radial deflection of the journal bearing. The virtually instantaneous wedge formation results in virtually instantaneous formation of the protective fluid film, thereby preventing damage to wedge forming surface that typically occurs at low speeds during the formation of the fluid film.

The radial stiffness of the bearing is, of course, primarily a function of the section or flexure modulus of the support structure, which depends on the shape of the support structure. The radial stiffness of the pad also depends on the length of the slits or cuts formed in the bearing. The same is true of thrust bearings except, naturally, the axial stiffness of the bearing is critical. Accordingly, with the present invention, it is possible to achieve high performance without the close manufacturing tolerances typically required of hydrodynamic bearings.

For example, the bearings of the present invention may be designed to have an interference fit when installed on the shaft such that as the bearing is forced on the shaft, the pads deflect slightly so as to form a converging wedge shape while in the stationary installed position. The trailing edge bearing pad contacts the shaft. At instantaneous start up, the fluid film enters the wedge and builds up fluid pressure causing separation of the shaft and pad. Thus, in accordance with another important aspect of this invention, the bearings of the present invention may be designed and dimensioned such that the trailing edge of the bearing is in contact with the shaft portion to be supported when the shaft is at rest.

The thrust bearings of the present invention can also be designed to provide a statically loaded wedge. In order to provide a statically loaded wedge, the support structure for the bearings is designed such that the bearing pads slope toward the shaft from the radially inner circumferential edge of the bearing pad to the radially outer circumferential edge of the bearing pad. Further, the support structure is designed such that the bearing pad slopes toward the shaft from the radially extending leading edge to the trailing edge. In this way, a statically loaded wedge approximating the optimum wedge is formed. Further, the pad slopes toward the shaft at the outer circumferential edge so as to provide the desired fluid retaining characteristic. The stiffness of the support structure can also be designed such that an appropriate space in between the pads and shaft is established instantaneously upon rotation of the shaft.

Alternatively, the bearing may be designed such that the entire bearing pad contacts the shaft portion to be supported when the shaft is at rest. This aspect of the present invention is particularly useful in high volume production of the bearings and with bearings using gas lubricating fluids because it allows a much larger variation of machining tolerances. In one example, a 0.003 inch variation can be designed to have an insignificant impact on the wedge whereas conventional machining of known gas bearings require 0.00000x tolerance that can only be attained through the use of sophisticated and expensive machining techniques such as micro inch machining via etching.

In accordance with another aspect of the present invention, the relationship between fluid stiffness and spring rate can be used to provide a self adjusting characteristic to a simple continuous conical combined radial/thrust bearing. Heretofore, the greatest difficulty in getting a simple continuous conical surface combined radial/thrust bearing to work has been the need for precise adjustment and tolerances. The present invention provides a self adjusting radial/thrust bearing that obviates these disadvantages.

The radial/thrust bearing arrangement includes a shaft having a conical runner. The runner may be formed as a part of the shaft or formed separately and rotatably secured to the shaft. The bearing has a continuous conical surface that is similar, but not complimentary to the runner's surface since a complimentary surface would tend to seize. Generally, the bearing surface has a slightly greater diameter than the runner.

The bearing is biased toward the runner by a spring having a predetermined spring characteristic. A hydrodynamic fluid is located between the surface of the shaft runner and the bearing pad surface. The fluid has a calculable fluid film stiffness or spring characteristic. This fluid film stiffness acts in opposition to the force applied by the spring.

When the shaft is at rest, the spring pushes the bearing into contact with the shaft runner. Because the bearing and runner have different shapes this contact occurs along a single line (if the cone angles are equal) or discrete points.

Fluid, preferably either air or liquid a lubricant such as oil, fills the remaining space between the runner and bearing. As the shaft begins to rotate, the pressure and stiffness of the fluid increases. Under normal operating conditions, the fluid film has a calculable stiffness when the shaft is at rest. By selecting a spring that has a constant stiffness that is greater than the stiffness of the fluid film when the shaft is at rest, but less than the fluid film stiffness under normal operating conditions, automatic adjustment is achieved. Specifically, when the shaft speed begins to approach normal operating conditions, the fluid film stiffness becomes greater than the spring stiffness, the bearing moves away from the shaft runner until an equilibrium position is reached. At equilibrium, the fluid stiffness is equal to the spring stiffness, the bearing is spaced from the shaft runner and the shaft is supported on a fluid film.

The spring force may be applied by separate washer or coil spring, a separate or integral elastic member or, in the deflecting support structure bearings of the present invention, an integral beam-like support structure.

In accordance with one aspect of the present invention, it is possible to provide a self adjusting bearing construction in which the bearing surface is in contact with the shaft surface when the shaft is at rest, but the two surfaces are forced apart by a pressurized fluid film when the shaft rotates under normal operating conditions. This is achieved by designing the bearings such that the force tending to push the shaft and bearing surfaces together is less than the counteracting stiffness of the fluid under normal operating conditions. This principle is applicable to multiple pad bearings or continuous surface bearings.

Figure 53:
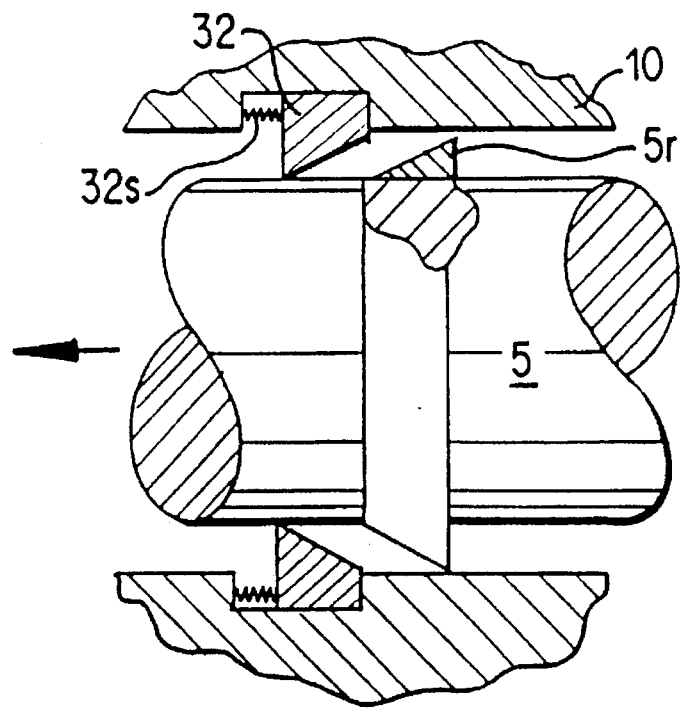
FIG. 53A is a side view, partially in section, of a self-adjusting continuous combined radial/thrust bearing arrangement according to the present invention.
FIG. 53B is a somewhat schematic perspective view showing the relationship of the bearing to the shaft and runner of the combined radial/thrust bearing arrangement of FIG. 53A.
FIG. 53C is a side view, partially in section, of another continuous self-adjusting combined radial/thrust bearing arrangement according to the present invention.
FIG. 53D is a somewhat schematic perspective view showing the relationship between the shaft and runner and the combined radial/thrust bearing of FIG. 53C.
Figure 53:
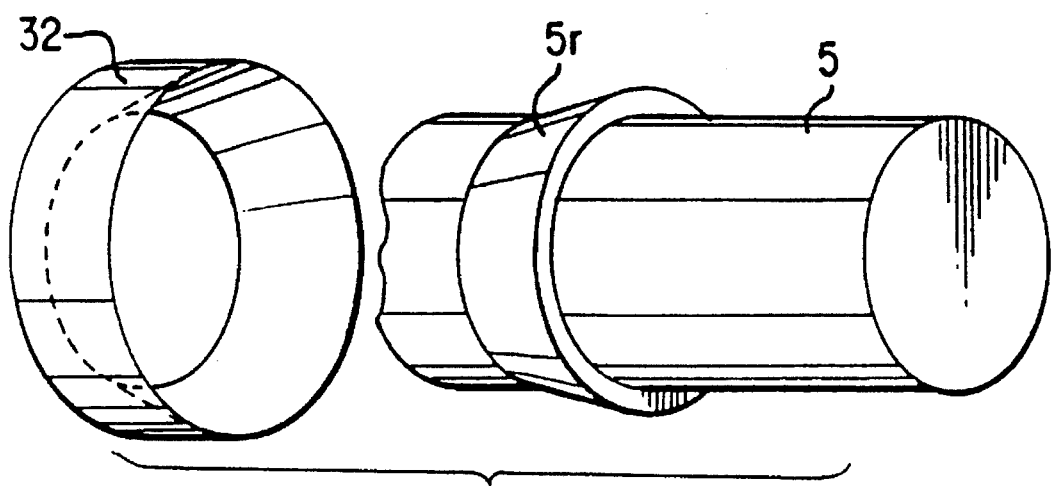

One useful embodiment of this aspect of the present invention is illustrated, somewhat schematically, in FIGS. 53A–53D. Specifically, FIGS. 53A and 53B show a simplified combined radial/thrust support arrangement in which a conically shaped runner $5r$ is secured to a shaft 5 and a bearing 32 having a conical face is mounted in a housing 10 to support the runner $5r$ and hence the shaft 5 in both the radial and thrust direction. The bearing 32, for purposes of the illustration, is a simple continuous conical surface. The bearing 32 is typically tapered at the same angle as the runner $5r$ but is slightly larger so that, at rest, the bearing and runner are eccentric and a wedge shaped space is formed between them. Moreover, when the surfaces contact, they contact along a single line with a converging wedge shaped space extending from each side of the line of contact. The bearing 32 is biased toward the runner $5r$ by spring $32s$. At rest, the surface of the bearing 32 is in contact with the conical surface of the shaft runner $5r$. The two surfaces are pressed against one another by the force of the spring $32s$ and any gravity force. As the shaft 5 begins to rotate, the stiffness of the hydrodynamic fluid increases until the stiffness of the fluid exceeds the force of the spring $32s$ acting to push the surface of the bearing 32 into contact with the surface of the shaft runner $5r$. At that point, the fluid forces the surfaces apart against the bias of the spring $32s$ and any additional forces until an equilibrium is reached and the shaft runner $5r$ and shaft 5 are supported on a film of pressurized fluid.

Figure 53C:
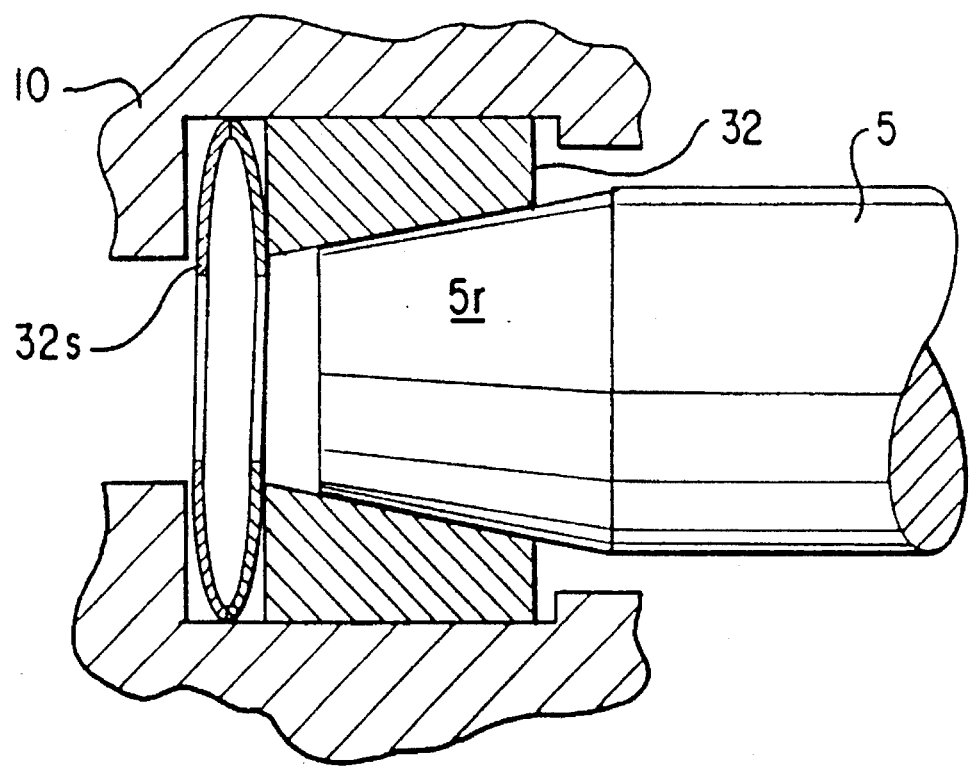
Figure 53D:
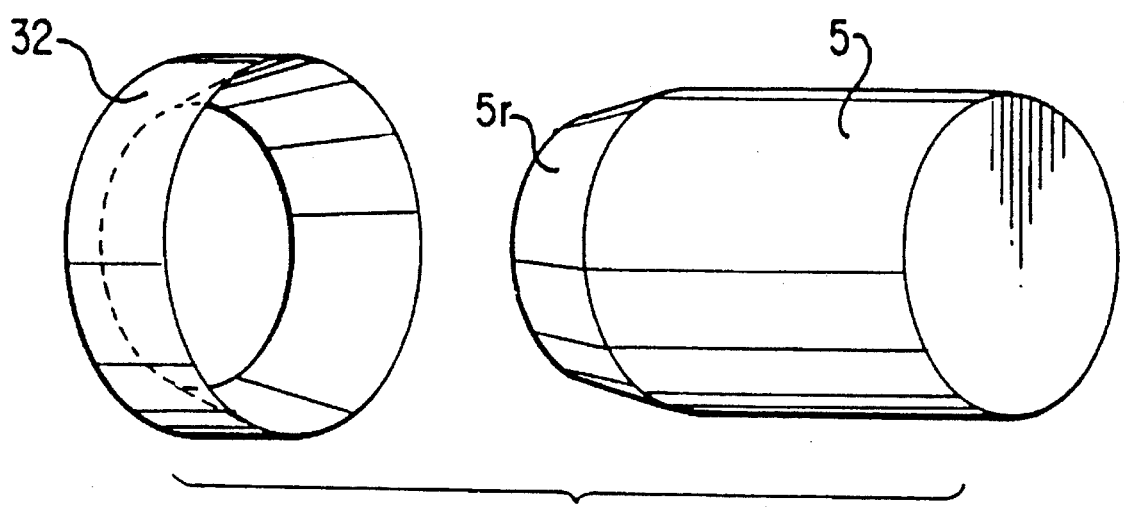

FIGS. 53C and 53D show a combined radial/thrust support arrangement that is similar to that of FIGS. 53A and 53B. However, in this arrangement, the runner $5r$ is formed at the end of the shaft 5 as shown in FIGS. 53C and 53D. Additionally, the spring in this case is a Belleville type spring washer. The operating principles are the same.

The advantage of such a self adjusting system is that there is no need to maintain close tolerances since the fluid itself balances with the spring force $32s$ and the other forces to assure proper spacing between the surface of the bearing 32 and the surface of the shaft runner $5r$. In arranging for a operable balance of spring force versus fluid film stiffness, there are several constraints. For instance, once the fluid to be used is known, the stiffness characteristics of that fluid are fixed since they are physical characteristics. In such a case, the balance must be provided for by selecting an appropriate spring stiffness. The spring force can be provided by any known spring such as a Belleville (initially coned) spring, a spring washer and an elastomeric cushion or, as discussed herein, a beam-like support structure. In FIG. 53A, the spring $32s$ is indicated schematically as a helical spring. In FIG. 53C, the spring is indicated as a Belleville or initially coned spring. Regardless of the specific type of spring selected, the spring can be designed using known principles to have the necessary spring characteristic to operate as described above. In this way, a very simple and reliable combined radial and thrust bearing arrangement can be provided. Naturally, these principles may be applied to more sophisticated bearing constructions as discussed below.

In small quantities, the bearings disclosed herein are preferably constructed by electrical discharge machining or laser cutting methods. The double lines shown in the drawings are the actual paths of the wire or beam that is typically 0.002–0.060" (0.50–1.52 mm) in diameter. The lubricant that flows into the electrical discharge machined paths acts as a fluid dampener that reduces any vibration or instability at resonant frequencies. In the situations described above where a continuous cylindrical membrane is formed, the damping takes the form of a dash pot that exhibits high damping characteristics. A significant consideration in the design is that the support structure length and direction be oriented to provide the inward deflection shown in FIG. 3. Also, minute deflections of the pads themselves in the direction of load, as shown in FIG. 9, result in eccentricity changes, which further improve bearing performance. It is noted that in Faires, Design of Machine Elements, the distance between the center of the bearing and the center of the shaft is called the eccentricity of the bearing. This terminology is well known to those skilled in bearing design. With the novel approach of tuning or modifying the stiffness of the bearing configuration or structure and particularly the beam to suit a particular bearing application, optimum performance is readily obtained. Recent computer analysis has demonstrated that virtually any stiffness or deflection may be accomplished.

As noted above, when manufacturing low volumes or prototypes of the bearings of the present invention, the bearings are preferably constructed by electrical discharge machining or laser cutting methods. Such small volumes or prototypes are usually constructed of metal. However, when higher volume production of a particular bearing is contemplated, other methods of manufacture such as injection molding, casting, powdered metal die casting and extrusion are more economical. In connection with such manufacturing methods, it may be more economical to employ plastics, ceramics, powdered metals or composites to form the bearings of the present invention. It is believed that methods such as injection molding, casting, powdered metal die casting with sintering and extrusion are sufficiently well known that the processes need not be detailed herein. It is also believed that once a prototype bearing is constructed, the method of producing a mold or the like for mass production of the bearing is well known to those skilled in the molding and casting art. Moreover, it is to be understood that only certain types of the bearings of the present invention are adapted to be made in high volumes through extrusion. Generally, these are the bearings that are formed only through the provision of circumferential grooves and radial and circumferential cuts or slits that extend axially throughout the bearing, i.e., those bearings having a constant or otherwise extrudable cross-section.

In accordance with another aspect of the present invention, a novel investment casting method has been found to be particularly useful in the manufacture of intermediate quantities, e.g., less than 5,000 bearings. In accordance with this method of manufacture, the first step of the investment casting procedure is manufacture of a prototype bearing. As discussed above and detailed below, the prototype can be manufactured in any number of ways, but is preferably manufactured by machining a piece of heavy walled tubing or similar cylindrical journal. In larger bearings, the cylindrical journal typically is machined using a lathe for forming face and circumferential grooves, and a mill for forming axial and radial bores. In machining smaller cylindrical journals, techniques such as water-jet cutting, laser and wire electrical discharge techniques are generally more suitable. However, in either application, the journals are typically turned and milled to form the larger grooves.

After the prototype bearing is formed, it may be desirable to test the prototype to confirm that the bearing functions in the predicted manner. As a result of such testing, it may be necessary to modify and refine the prototype to obtain the desired results.

Once a satisfactory prototype is obtained, a rubber mold of the prototype is formed. Typically, this step involves encasing the prototype in molten rubber and allowing the rubber to harden so as to form a rubber mold of the prototype. The rubber encasing the prototype is then split and the prototype is removed to yield an open rubber mold.

Once the rubber mold is obtained, it is used to form a wax casting. This step typically involves pouring molten wax into the rubber mold and allowing the wax to harden to form a wax casting of the bearing.

After the wax casting is obtained, it is used to form a plaster mold. This step typically involves encasing the wax casting and plaster, allowing the plaster to harden around the wax casting so as to form a plaster mold.

The plaster mold can then be used to form a bearing. Specifically, molten bearing material, such as bronze, is poured into the plaster mold so as to melt and displace the wax casting from the mold. Thus, the plaster mold is filled with molten bearing material and the melted wax is removed from the plaster mold.

After the molten bearing material is allowed to harden,- the plaster mold is removed from around the bearing and a bearing is obtained.

Because this method of manufacture involves the sacrifice of a wax casting, it is known as investment casting or sacrificial casting.

Despite the fact that the investment or sacrificial casting method described above involves sacrifice of a wax casting and the production of both rubber and plaster molds, and is quite labor intensive, it has proven to be cost effective when intermediate quantities, e.g., less than 5,000 units, of a particular bearing are required. The cost effectiveness of this procedure for lower quantity bearing requirements is due to the fact that the molds used in this method are far less expensive to produce than the complex mold required for injection molding or powdered metal casting.

As noted above, the first step in the investment casting method, indeed in any method, of producing bearings in accordance with the present invention is the production of a prototype bearing. In accordance with another aspect of the present invention, the relatively complex journal and thrust bearings of the present invention can be formed using simple manufacturing techniques. Similar techniques are used for both thrust and journal bearings.

With the foregoing in mind, it is believed sufficient to describe the method of making a single journal bearing through the use of electrical discharge manufacturing and machining. It is believed that a description of such manufacture demonstrates the ease with which the relatively complex bearing shapes of the present invention can be achieved.

Each bearing is initially in the form of a cylindrical blank having a cylindrical bore as shown in FIGS. 11A and 11B. The blank is then machined to provide a radial lubricating fluid groove as shown in FIGS. 12A and 12B. For certain applications, it is desirable to machine the blank further to include facing grooves that are preferably symmetrically disposed on the radial faces of the bearings as shown in FIGS. 13A and 13B. The provision of such facing grooves ultimately results in a bearing that is easily torsionally deflected. While the groove shown in FIGS. 13A and 13B are cylindrical, it is possible to provide tapered grooves as shown in FIGS. 14A and 14B. As will become evident below, this yields a bearing that exhibits improved deflection characteristics by virtue of the angled alignment of the support beams. In this context, it should be noted that it is preferable that the support beams as viewed in FIG. 14A are tapered along lines that converge at a point proximate the center line of the shaft. This ensures that flexibility occurs about the shaft center line by establishing a center of action for the entire system such that the pads may adjust to shaft misalignment. In essence, the tapering of the support beams causes the bearing to act in a manner similar to a spherical bearing by concentrating the support forces on a single point about which the shaft may pivot in all directions to correct any misalignment. The arrows in FIG. 14A illustrate the lines of action of the deflection.

Bearings having cross sections of the type shown in FIGS. 12A and 14A are particularly effective at retaining the hydrodynamic fluid. This is because the bearing pad is supported proximate the axial ends of the bearing pad and the central portion of the bearing pad is not directly supported. By virtue of this construction, the bearing pad is supported so as to deform under load to form a fluid retaining concave pocket, i.e. the central portion of the bearing pad deflects radially outward. This greatly decreases fluid leakage. Naturally, the degree of pocket formation depends of the relative dimensions of the bearing pad and support structure. A larger fluid retaining pocket could be obtained by providing a thinner bearing pad surface and supporting the pad surface at the extreme axial ends of the bearing pad.

After the cylindrical blank is properly machined as shown in FIGS. 12A and 12B, FIGS. 13A and 13B, or FIGS. 14A and 14B radial and/or circumferential slits or grooves are formed along the radial face of the machined blank to define the bearing pads, the beam supports and the housing. FIGS. 14C and 14D illustrate such grooves formed in the machined blank of FIGS. 14A and 14B. When manufacturing low volumes of the bearings or prototypes of the bearings for use in the construction of a mold, the cuts or slits are preferably formed through electrical discharge manufacturing or through the use of a laser. The machining of the cylindrical blanks to achieve the configurations illustrated in FIGS. 12A and 12B, FIGS. 13A and 13B, FIGS. 14A and 14B or a similar shape can be done through conventional machine tools such as a lathe or the like.

Although the foregoing discussion is specifically directed to journal bearings, the principles apply just as well to thrust bearings. For instance, the thrust bearing shown in FIGS. 15–18 can be formed by machining a section of heavy walled tubing to provide radially inner and outer grooves, facing grooves, axial bores, radial cuts and chamfers so as to define bearing pads and support structure.

The performance characteristics of the bearings of the present invention result from the relative shape, size, location and material characteristics of the bearing pads and the beam supports defined by the bores and cuts or slits formed in the machined blank. These parameters are largely defined by the dimensions and location of the radial circumferential bores, cuts or slits formed in the bearing in conjunction with the shape of the machined blank in which the bores or slits are formed to yield the bearing.

As noted above, while the construction of the bearings of the present invention is most easily understood by reference to the machining process, larger quantities are preferably manufactured through the investment casting method of the present invention, and even larger scale production of the bearings contemplated by the present invention could be more economically performed through injection molding, casting, powdered metal, die casting, extrusion or the like.

In extruding a large number of bearings from a pipe-like cylindrical blank, radial lubricating fluid grooves, as shown in FIGS. 12A and 12B can be provided along the length of the pipe-like cylindrical blank prior to extrusion. However, if facing grooves were desired in the bearing, these can be individually defined after slicing the individual bearings from the extruded and machined blank. For this reason, extrusion might not be a preferred method of producing bearings that require facing grooves to enhance torsional flexibility.

What is claimed is:

1. A hydrodynamic fluid film bearing for pressurizing a liquid so as to support a shaft for rotation about an axis on a pressurized liquid film, the bearing comprising: a plurality of substantially circumferential bearing pads each having a pad face, a leading edge and a trailing edge and being spaced evenly about the circumference of the shaft, the pad face being inclined between 0° to 45° relative to the axis of the shaft, a bearing housing extending radially outside the bearing pads and encircling the bearing pads and a plurality of support members arranged such that a support member extends radially between each one of the pads and the bearing housing so as to support the pads on the bearing housing for pivoting movement, each of the support member having a radial length and a circumferential width, whereby under load, the support members deflect relative to the shaft so as to form a converging wedge between the shaft and pad surfaces, the converging wedge causing pressurization of the liquid so as to form a pressurized liquid film between the shaft and pad.

2. The bearing of claim 1, wherein at least two bearing pads of the plurality of bearing pads extends circumferentially between the leading edge and the trailing edge across an arc of at least 60° so that each such pad supports a substantial section of the entire circumference of the shaft.

3. The bearing of claim 1, wherein the housing includes a plurality of circumferentially spaced radially inward extending protrusions that extend toward the bearing pads and are spaced from the bearing pads by a predetermined distance.

4. The bearing of claim 3, wherein each of the support members has a first end connected to the bearing pad and a second end spaced from the bearing pads and connected to the housing and wherein the second end of the support member is spaced from the bearing pads by a distance which is greater than the predetermined distance by which the radially inward extending protrusions of the housing are spaced from the bearing pads.

5. The bearing of claim 4, wherein the support member is connected to the pad at a location spaced from every edge of the pad.

6. The bearing of claim 1, wherein the bearing is a combined radial thrust bearing having a pad face inclined at 10° to 45° relative to the shaft axis.

7. A hydrodynamic bearing comprising a housing, a plurality of bearing pads supported on the housing for deflection under load and a supply of porous plastic contained within the housing, the porous plastic being loaded with lubricant.

8. The bearing of claim 7, wherein the support member comprises a primary support portion that is mounted on a secondary support portion that is mounted on a tertiary support portion.

* * * * *